United States Patent
Bross et al.

(10) Patent No.: US 12,407,852 B2
(45) Date of Patent: *Sep. 2, 2025

(54) ENCODERS, DECODERS, METHODS, AND VIDEO BIT STREAMS, AND COMPUTER PROGRAMS FOR HYBRID VIDEO CODING

(71) Applicant: Fraunhofer-Gesellschaft zur Förderung der angewandten Forschung e.V., Munich (DE)

(72) Inventors: Benjamin Bross, Berlin (DE); Martin Winken, Berlin (DE); Anastasia Henkel, Berlin (DE); Paul Keydel, Berlin (DE); Ivan Zupancic, Berlin (DE); Heiko Schwarz, Berlin (DE); Detlev Marpe, Berlin (DE); Thomas Wiegand, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,189

(22) Filed: May 6, 2024

(65) Prior Publication Data
US 2024/0292019 A1    Aug. 29, 2024

Related U.S. Application Data

(63) Continuation of application No. 17/469,137, filed on Sep. 8, 2021, now Pat. No. 12,010,337, which is a (Continued)

(30) Foreign Application Priority Data

Mar. 12, 2019    (EP) .................................... 19162403

(51) Int. Cl.
*H04N 19/82* (2014.01)
*H04N 19/117* (2014.01)
(Continued)

(52) U.S. Cl.
CPC ............ *H04N 19/52* (2014.11); *H04N 19/117* (2014.11); *H04N 19/186* (2014.11); *H04N 19/70* (2014.11)

(58) Field of Classification Search
CPC .... H04N 19/52; H04N 19/117; H04N 19/186; H04N 19/70
See application file for complete search history.

(56) References Cited

U.S. PATENT DOCUMENTS

| | | | |
|---|---|---|---|
| 2012/0230407 A1 | 9/2012 | Minoo et al. | |
| 2012/0314771 A1* | 12/2012 | Lim | H04N 19/463 382/233 |
| 2020/0084443 A1* | 3/2020 | Zhao | H04N 19/117 |

FOREIGN PATENT DOCUMENTS

| | | |
|---|---|---|
| EP | 2373036 A1 | 10/2011 |
| JP | 2018530244 A | 10/2018 |

(Continued)

OTHER PUBLICATIONS

"ITU-T T-REC-H .265-201911-High efficiency video coding".
(Continued)

*Primary Examiner* — Patrick E Demosky
(74) *Attorney, Agent, or Firm* — Andrew M. Metrailer; William H. Dietrich; Conley Rose, P.C.

(57) ABSTRACT

An encoder for hybrid video coding, the encoder for providing an encoded representation of a video sequence on the basis of an input video content, and the encoder configured to: determine one or more syntax elements related to a portion of the video sequence; select a processing scheme to be applied to the portion of the video sequence based a
(Continued)

- integer samples (shaded blocks with upper-case letters) and fractional sample positions (un-shaded blocks with lower-case letters) for quarter sample luma interpolation property described by on the one or more syntax elements, the processing scheme for acquiring a sample for a motion-compensated prediction at an integer and/or fractional location within the portion of the video sequence; encode an index indicating the selected processing scheme such that a given encoded index value represents different processing schemes depending on the property described by the one or more syntax elements; and provide, as the encoded representation of the video sequence, a bit stream including the one or more syntax elements and the encoded index.

20 Claims, 19 Drawing Sheets

Related U.S. Application Data continuation of application No. PCT/EP2020/056730, filed on Mar. 12, 2020.

(51) Int. Cl.
*H04N 19/186* (2014.01)
*H04N 19/52* (2014.01)
*H04N 19/70* (2014.01)

(56) References Cited

FOREIGN PATENT DOCUMENTS

| KR | 20110020212 A | 3/2011 |
|---|---|---|
| WO | 2012071643 A1 | 6/2012 |
| WO | 2017052409 A1 | 3/2017 |
| WO | WO-2018002021 A1 * | 1/2018 ........... H04N 19/139 |
| WO | 2018067848 A1 | 4/2018 |
| WO | WO-2020050752 A1 * | 3/2020 ........... H04N 19/105 |

OTHER PUBLICATIONS

Bross, B., et al., "Versatile Video Coding", Document COM16-C464, ITU-T, Apr. 2008.
Chen, J., et al., "JVET-G1001-Algorithm description of Joint Exploration Test Model 7 (JEM7)", JVET of ITU-T SG 16 WP 3 and 1SO-IEC JTC 1/SC29/WG11, 7th meeting, Jul. 13, 2017-Jul. 21, 2017 , Torino, XP030150980.
Henkel, A., et al., "NON-CE4: Switched half-pel interpolation filter", JVET Meeting, Mar. 2019 Geneva, JVET-N0309, KP030202955.
Karczewicz, M., et al., "Switched interpolation filter with offset", Document COM16-C463, ITU-T, Apr. 2008.
Karczewicz, M., et al., "Video coding technology proposal by Qualcomm", JCT-VC Meeting Apr. 15, 2010-Apr. 23, 2010, Dresden JTC1/SC29/WG11 and ITU-TSG16-WP3, JCTVC-A121, XP030007567.
Vatis, Yuri, et al., "Two-dimensional non-separable Adaptive Wiener Interpolation Filter for H.264/AVC", ITU-T SG 16/Q.6 Doc. VCEG-Z17, Busan, South Korea, Apr. 2005.
Wedi, T. , et al., "Results of core experiment on Adaptive Motion Accuracy {AMA) with 1/2, 1/4 and 1/8-pel accuracy", ITU Study Group 16, May 2000, XP002301984.
Wittmann, S., et al., "Separable Adaptive Interpolation Filter", Document COM16-C219, ITU-T, Jun. 2007.
Ye, Y., et al., "Enhanced Adaptive Interpolation Filter", Document COM16-C464, ITU-T, Apr. 2008.
Sakae Okubo (editorial supervisor), "Impress Hyoujun Kyokasho Series (Impress Standard Textbook Series) H.265/HEVC Textbook," First Edition, Oct. 21, 2013, Impress Corp. pp. 17, 18 and 58. ISBN: 978-4-8443-3468-2.

* cited by examiner

- integer samples (shaded blocks with upper-case letters) and fractional sample positions (un-shaded blocks with lower-case letters) for quarter sample luma interpolation

1310

Determining (1311) one or more syntax elements (520) related to a portion (585) of the video sequence — 1311

Selecting (1312) a processing scheme (540) to be applied to the portion (585) of the video sequence based on a property described by on the one or more syntax elements (520), wherein the processing scheme is completely specified by the property of the portion (585) and a fractional part of a motion vector, the processing scheme (540) for obtaining a sample (401;411;415;417) for a motion-compensated prediction at an integer and/or fractional location within the portion (585) of the video sequence — 1312

Providing (1313), as the encoded representation (1314) of the video sequence, a bit stream comprising the one or more syntax elements (520) — 1313

Fig. 17

ENCODERS, DECODERS, METHODS, AND VIDEO BIT STREAMS, AND COMPUTER PROGRAMS FOR HYBRID VIDEO CODING

CROSS-REFERENCE TO RELATED APPLICATION

This application is a continuation of U.S. application Ser. No. 17/469,137, filed on Sep. 8, 2021, which is continuation of and claims priority to International Application No. PCT/EP2020/056730, filed Mar. 12, 2020, and additionally claims priority from European Application No. EP 19162403.0, filed Mar. 12, 2019, all of which are incorporated herein by reference in their entirety.

Embodiments according to the invention are related to encoders and decoders for hybrid video coding. Further embodiments according to the invention are related to methods for hybrid video coding. Further embodiments according to the invention are related to video bit streams for hybrid video coding.

BACKGROUND OF THE INVENTION

All modern video coding standards employ motion-compensated prediction (MCP) with fractional-sample accuracy of the motion vectors (MVs). In order to obtain the sample values of the reference picture at fractional-sample positions, interpolation filtering is used.

In the High-Efficiency Video Coding (HEVC) standard, which uses a motion vector accuracy of a quarter luma sample, there are 15 fractional luma sample positions which are calculated using various 1-dimensional finite impulse response (FIR) filters. However, for each fractional-sample position the interpolation filter is fixed.

Instead of a having a fixed interpolation filter for each fractional-sample position, it is possible to select an interpolation filter for each fractional-sample position from a set of interpolation filters. Approaches which allow switching between different interpolation filters at slice level include Non-separable Adaptive Interpolation Filter (AIF) [1], Separable Adaptive Interpolation Filter (SAIF) [2], Switched Interpolation Filtering with Offset (SIFO) [3], and Enhanced Adaptive Interpolation Filter (EAIF) [4]. Either the interpolation filter coefficients are explicitly signaled per slice (as in AIF, SAIF, EAIF), or it is indicated which interpolation filters out of a set of pre-determined interpolation n filters is used (as in SIFO).

The current draft of the upcoming Versatile Video Coding (VVC) standard [5] supports so-called Adaptive Motion Vector Resolution (AMVR). Using AMVR, the accuracy of both the motion vector predictor (MVP) and the motion vector difference (MVD) can be selected jointly among the following possibilities:

Quarter-sample (QPEL): Motion vector accuracy of a quarter luma sample;

Full-sample (FPEL): Motion vector accuracy of a luma sample;

4-sample (4PEL): Motion vector accuracy of four luma samples.

For selecting the desired accuracy, an additional syntax element is transmitted in the bit stream. The indicated accuracy applies to both list0 and list1, in case of bi-prediction. AMVR is not available in skip and merge mode. Furthermore, AMVR is not available if all MVDs are equal to zero. In case any other accuracy than QPEL is used, the MVP is first rounded to the specified accuracy, before adding the MVD in order to obtain the MV.

Some embodiments of the present disclosure may implement one or more of the above mentioned concepts or may be usable in the context thereof. For example, embodiments may implement the HEVC or the VVC standard and may use AMVR and the above described MV accuracies.

There is a desire for a concept for encoding, decoding and transmitting video data, which provides an improved tradeoff between bit rate, complexity, and achievable quality of hybrid video coding.

SUMMARY

An embodiment may have an encoder for hybrid video coding, the encoder for providing an encoded representation of a video sequence on the basis of an input video content, the encoder configured to determine one or more syntax elements related to a portion of the video sequence; select a processing scheme to be applied to the portion of the video sequence based on a property described by the one or more syntax elements, the processing scheme for obtaining a sample for a motion-compensated prediction at an integer and/or fractional location within the portion of the video sequence; encode an index indicating the selected processing scheme such that a given encoded index value represents different processing schemes depending on the property described by the one or more syntax elements and provide, as the encoded representation of the video sequence, a bit stream including the one or more syntax elements and the encoded index.

Another embodiment may have a decoder for hybrid video coding, the decoder for providing an output video content on the basis of an encoded representation of a video sequence, the decoder configured to obtain a bit stream as the encoded representation of the video sequence; identify from the bit stream one or more syntax elements related to a portion of the video sequence; identify a processing scheme for the portion of the video sequence based on the one or more syntax elements and an index, the processing scheme for obtaining a sample for a motion-compensated prediction at an integer and/or fractional location within the portion of the video sequence, wherein the decoder is configured to assign different processing schemes to a given encoded index value depending on the one or more syntax elements and apply the identified processing scheme to the portion of the video sequence.

According to another embodiment, a method for hybrid video coding, the method for providing an encoded representation of a video sequence on the basis of an input video content, may have the steps of: determining one or more syntax elements related to a portion of the video sequence; selecting a processing scheme to be applied to the portion of the video sequence based a property described by on the one or more syntax elements, the processing scheme for obtaining a sample for a motion-compensated prediction at an integer and/or fractional location within the portion of the video sequence; encoding an index indicating the selected processing scheme such that a given encoded index value represents different processing schemes depending on the property described by the one or more syntax elements and providing, as the encoded representation of the video sequence, a bit stream including the one or more syntax elements and the encoded index.

According to yet another embodiment, a method for hybrid video coding, the method for providing an output video content on the basis of an encoded representation of a video sequence, may have the steps of: obtaining a bit stream as the encoded representation of the video sequence;

identifying from the bit stream one or more syntax elements related to a portion of the video sequence; identifying a processing scheme for the portion of the video sequence based on the one or more syntax elements and an index, the processing scheme for obtaining a sample for a motion-compensated prediction at an integer and/or fractional location within the portion of the video sequence, wherein the method assigns different processing schemes to a given encoded index value depending on the one or more syntax elements and applying the identified processing scheme to the portion of the video sequence.

According to yet another embodiment, a non-transitory digital storage medium may have a computer program stored thereon to perform the inventive methods, when said computer program is run by a computer.

An embodiment may have a decoder for hybrid video coding, the decoder for providing an output video content on the basis of an encoded representation of a video sequence, the decoder configured to obtain a bit stream as the encoded representation of the video sequence; identify from the bit stream one or more syntax elements related to a portion of the video sequence; determine, with a PU granularity or a CU granularity and depending on the one or more syntax elements, a processing scheme for the portion of the video sequence, the processing scheme for obtaining a sample for a motion-compensated prediction at an integer and/or fractional location within the portion of the video sequence; apply the identified processing scheme to the portion of the video sequence.

An embodiment may have an encoder for hybrid video coding, the encoder for providing an encoded representation of a video sequence on the basis of an input video content, the encoder configured to determine one or more syntax elements related to a portion of the video sequence; select, with a PU granularity or a CU granularity, a processing scheme to be applied to the portion of the video sequence based on a property described by the one or more syntax elements, the processing scheme for obtaining a sample for a motion-compensated prediction at an integer and/or fractional location within the portion of the video sequence; provide, as the encoded representation of the video sequence, a bit stream including the one or more syntax elements.

According to yet another embodiment, a method for hybrid video coding, the method for providing an output video content on the basis of an encoded representation of a video sequence, may have the steps of: obtaining a bit stream as the encoded representation of the video sequence; identifying from the bit stream one or more syntax elements related to a portion of the video sequence; determining, with a PU granularity or a CU granularity and depending on the one or more syntax elements, a processing scheme for the portion of the video sequence, the processing scheme for obtaining a sample for a motion-compensated prediction at an integer and/or fractional location within the portion of the video sequence; apply the identified processing scheme to the portion of the video sequence.

According to yet another embodiment, a method for hybrid video coding, the method for providing an encoded representation of a video sequence on the basis of an input video content, may have the steps of: determining one or more syntax elements related to a portion of the video sequence; selecting, with a PU granularity or a CU granularity, a processing scheme to be applied to the portion of the video sequence based on a property described by the one or more syntax elements, the processing scheme for obtaining a sample for a motion-compensated prediction at an integer and/or fractional location within the portion of the video sequence; providing, as the encoded representation of the video sequence, a bit stream including the one or more syntax elements.

According to yet another embodiment, a non-transitory digital storage medium may have a computer program stored thereon to perform the inventive methods, when said computer program is run by a computer.

An aspect of the present disclosure relates to an encoder for hybrid video coding (e.g., video coding with prediction and transform coding of the prediction error), the encoder for providing an encoded representation of a video sequence on the basis of an input video content, and the encoder configured to: determine one or more syntax elements (e.g., a motion vector accuracy syntax element) related to a portion (e.g., a block) of the video sequence; select a processing scheme (e.g., an interpolation filter) to be applied (e.g., by a decoder) to the portion of the video sequence based a property (e.g. a decoder setting signaled by one or more syntax elements or a characteristic of a portion of the video sequence signaled by the one or more syntax elements) described by on the one or more syntax elements, the processing scheme for obtaining a sample for a motion-compensated prediction (e.g., related to the video sequence, e.g. a sample, e.g., a fractional sample) at an integer and/or fractional location within the portion of the video sequence; encode an index indicating the selected processing scheme (e.g., in dependence on the one or more syntax elements) such that a given encoded index value represents (e.g., is associated with) different processing schemes depending on the property described by the one or more syntax elements (e.g., depending on values of the one or more syntax elements); and provide (e.g., transmit, upload, save as a file), as the encoded representation of the video sequence, a bit stream comprising the one or more syntax elements and the encoded index.

Selecting the processing scheme to be applied to the portion based on the property of the portion, allows for adapting the applied processing scheme to the portion, for example according to characteristics of the portion. For example, different processing schemes may be selected for different portions of the video sequence. For example, a specific processing scheme may be particularly beneficial for encoding a portion with a given property, as the specific processing scheme may be adapted for facilitating a particularly efficient encoding and/or for facilitating a particularly high quality of the encoded representation of the portion with the given property. Thus, selecting the processing scheme in dependence on the property of the portion (wherein, for example, a set of possible processing schemes may be adapted to the property of the portion) may simultaneously enhance the overall efficiency and quality of the encoding of the video sequence. An efficiency of the encoding may refer to a low computational effort of the encoding or may refer to a high compression rate of the encoded information.

By providing the encoded index that indicates the selected processing scheme, a proper decoding of the portion may be ensured. As a given value of the encoded index may, in dependence on the property of the portion, represent different processing schemes, the encoder may adapt the encoding of the index according to the property. For example, a number of possible values of the encoded index may be limited to a number of processing schemes that are applicable to the portion having the property. Thus, the encoded index may involve a low number of bits (which may, for example, be adapted to a number of processing schemes selectable in view of an actual property of the currently considered portion), even if a total number of selectable processing schemes (e.g. associated with different properties) is large. Thus, the encoder may exploit the knowledge about the property of the portion, which is available to the encoder by determining the one or more syntax elements, for efficiently encoding the index. The combination of selecting the processing scheme according to the property (wherein the property may reduce the number of possible processing schemes for a currently considered portion when compared to a total number of different processing schemes available) and encoding the index in dependence on the property may therefore enhance an overall efficiency of the encoding although the selected processing scheme may be indicated in the bit stream.

According to an embodiment, the encoder is configured to adapt a mapping rule mapping an index value onto an encoded index value in dependence on the property described by the one or more syntax elements. Adapting the mapping rule in dependence on the property may ensure, that the index may be encoded so that a given encoded index value represents different processing schemes depending on the property.

According to an embodiment, the encoder is configured to adapt a number of bins used for providing the encoded index indicating the selected processing scheme depending on the property described by the one or more syntax elements. Thus, the encoder may adapt the number of bins to a number of processing schemes that are allowable for the property, so that the encoder may use a small number of bins, if a small number of processing schemes is allowable for the property, thus reducing the size of the bit stream.

According to an embodiment, the encoder is configured to determine a set of processing schemes allowable in view of the property described by the one or more syntax elements and select a processing scheme from the determined set. By determining the set of allowable processing schemes in view of the property, the encoder may infer information about the selectable processing schemes from the one or more syntax elements. Thus, the encoder uses information that is already available from determining the one or more syntay elements for selecting the processing scheme, therefore increasing an efficiency of the encoding. Further, relying on the set of processing schemes for selecting the processing scheme may limit the number of allowable processing schemes to the set of processing schemes, such enabling an encoding of the index into a small sized of the encoded index.

According to an embodiment, the encoder is configured to determine whether a single processing scheme is allowable for the portion of the video sequence and selectively omit the inclusion of an encoded index in response to the finding that only a single processing scheme (e.g. spatial filter or interpolation filter) is allowable for the portion of the video sequence. Thus, the encoder may infer, e.g. from the property of the portion, that a single processing scheme is allowable for the portion and select the single processing scheme as the processing scheme to be applied to the portion. Omitting the inclusion of the encoded index in the bit stream may reduce a size of the bit stream.

According to an embodiment, the encoder is configured to select a mapping rule mapping an index value onto an encoded index value such that a number of bins representing the encoded index value is adapted to a number of processing schemes allowable for the portion of the video sequence. Thus, the encoder may adapt the number of bins to a number of processing schemes that are allowable for the portion, so that the encoded index may have a small number of bins, if a small number of processing schemes is allowable for the portion, thus reducing the size of the bit stream.

According to an embodiment, in the encoder, the processing scheme is a filter (e.g., an interpolation filter) or a set of filters (e.g., interpolation filters) (e.g. parameterized by fractional part of motion vector).

According to an embodiment, in the encoder, the filters in the set of filters are separably applicable (e.g., one-dimensional filters which are sequentially applicable in the spatial directions, e.g., an x direction and/or a y direction) to the portion of the video sequence. Thus, the filters may be selected individually, increasing the flexibility for selecting the filters, so that the set of filters may be adapted very accurately to the property of the portion.

According to an embodiment, the encoder is configured to select different processing schemes (e.g., different interpolation filters) for different blocks (e.g., different prediction unit PU and/or coding unit CU and/or a coding tree unit CTU) within a video frame or picture (different interpolation filters for same fractional sample positions in different parts of a video sequence or in different parts of a single video frame or picture). Thus, the selection of the processing scheme may consider the individual properties of the different blocks, therefore facilitating an enhancement of an encoding of the block, or a coding efficiency, or a reduction of a size of the bit stream.

According to an embodiment, the encoder is configured to encode the index indicating the selected processing scheme (e.g., in dependence on the one or more syntax elements) such that a given encoded index value represents (e.g., is associated with) different processing schemes depending on a motion vector accuracy (which may, for example, be signaled using a syntax element in the bit stream and which may, for example, take one out of the following values: QPEL, HPEL, FPEL, 4PEL). Thus, the encoding of the index may depend on the MV accuracy, for example on the number of processing schemes that are allowable for the MV accuracy. As for some setting of the MV accuracy the number of allowable processing schemes may be smaller than for others, this is an efficient way to reduce a size of the bit stream.

According to an embodiment, in the encoder, the one or more syntax elements comprise at least one of a motion vector accuracy (e.g., quarter-sample, half-sample, full-sample), a fractional sample position, a block size, a block shape, a number of prediction hypotheses (e.g., one hypothesis for an uni-prediction, two hypotheses for a bi-prediction), a prediction mode (e.g., translational inter, affine inter, translational merge, affine merge, combined inter/intra), an availability of a coded residual signal (e.g., a coded block flag), spectral properties of the coded residual signal, a reference picture signal (e.g., a reference block defined by motion data, block edges from collocated prediction units PUs inside a reference block, high or low frequency characteristics of the reference signal), loop filter data (e.g., an edge offset or band offset classification from a sample adaptive offset filter SAO, a deblocking filter decisions and boundary strengths), motion vector lengths (e.g. only enable additional smoothing filters for long motion vectors or for a specific direction), or an adaptive motion vector resolution mode.

According to an embodiment, the encoder is configured to encode the index indicating the selected processing scheme (e.g., in dependence on the one or more syntax elements) such that a given encoded index value represents (e.g., is associated with) different processing schemes depending on a fractional part (or fractional parts) of motion vector (wherein, for example, different encoding schemes are used in dependence on whether all motion vectors of a considered portion point to integer sample positions, e.g. luma sample positions, or not). Thus, the encoder may adapt the encoding of the index to a number of processing schemes that are allowable for the fractional part of the motion vector. As the fractional part of the motion vector may be determined from the portion, this is an efficient way to reduce a size of the bit stream.

According to an embodiment, the encoder is configured to selectively determine a set of processing schemes (e.g. "multi-possibility encoding") for a motion vector accuracy (e.g. a sub-sample motion vector accuracy, e.g. HPEL) which is between a maximum motion vector accuracy (e.g. a sub-sample motion vector resolution which is finer than the motion vector accuracy mentioned before; e.g. QPEL) and a minimum motion vector accuracy (e.g. 4PEL) or for a motion vector accuracy (e.g. HPEL) which is between a maximum motion vector accuracy (e.g. QPEL) and a full-sample motion vector accuracy (e.g. FPEL) and select processing scheme from the determined set. For example, for the maximum MV accuracy, there may be one particularly efficient processing scheme, so that it may be beneficial not to determine a set of processing schemes, while for the maximum or the full-sample MV accuracy, selecting a processing scheme may be unnecessary, as possibly none of the selectable processing schemes may be applied. In contrast, for a MV accuracy between the maximum MV accuracy and the a full-sample or minimum MV accuracy, it may be particularly beneficial to adapt the processing scheme to the property of the portion.

According to an embodiment, the encoder is configured to encode an index (processing scheme index, if_idx) for selecting between a first FIR filtering (e.g., an HEVC filtering) (e.g. HEVC 8-tap filtering), a second FIR filtering and a third FIR filtering.

According to an embodiment, the encoder is configured to encode an index (processing scheme index, if_idx) for selecting between a first FIR filtering (e.g., an HEVC filtering) (e.g., HEVC 8-tap filtering) and a second FIR filtering.

According to an embodiment, the encoder is configured to select (e.g., switch) between processing schemes (e.g., interpolation filters) having different characteristics (e.g. stronger low-pass characteristic vs. weaker low-pass characteristic). For example, a processing scheme or filter with a strong low-pass characteristic may attenuate high-frequency noise components, so that a quality of the encoded representation of the video sequence may be enhanced.

According to an embodiment, the encoder is configured to select the mapping rule in dependence on a motion vector accuracy and a fractional sample position or fractional part (or fractional parts) of motion vector. Thus, the encoder may adapt the encoding of the index to a number of processing schemes that are allowable for the MV accuracy and a fractional part of the motion vector. As the MV accuracy and the fractional part of the motion vector may be determined from the one or more syntax elements, it may be very efficient to use these properties for determining a number of allowable processing schemes and for selecting the mapping rule accordingly.

According to an embodiment, the encoder is configured to determine available sets of processing schemes (e.g. interpolation filters) in dependence on motion vector accuracy.

According to an embodiment, the encoder is configured to select between a quarter-sample motion vector resolution, a half-sample motion vector resolution, a full-sample motion vector resolution and a four-sample motion vector resolution (wherein, for example, the index element describing a processing scheme or an interpolation filter is selectively included in case a half-sample motion vector resolution is selected and wherein the index element describing the processing scheme is, for example, omitted otherwise).

According to an embodiment, in the encoder, the processing scheme comprises one or more FIR filters. FIR filter are particularly stable filters for processing the video sequence.

Another aspect of the present disclosure relates to an encoder for hybrid video coding (e.g., video coding with prediction and transform coding of the prediction error), the encoder for providing an encoded representation of a video sequence on the basis of an input video content, the encoder configured to determine one or more syntax elements (e.g., a motion vector accuracy syntax element) related to a portion (e.g., a block) of the video sequence; select a processing scheme (e.g., an interpolation filter) to be applied (e.g., by a decoder) to the portion of the video sequence based on a property (e.g. a decoder setting signaled by one or more syntax elements or a characteristic of a portion of the video sequence signaled by the one or more syntax elements) described by the one or more syntax elements, the processing scheme for obtaining a sample for a motion-compensated prediction (e.g., related to the video sequence, e.g. a sample, e.g., a fractional sample) at an integer and/or fractional location within the portion of the video sequence; select an entropy coding scheme used for providing an encoded index indicating the selected processing scheme depending on the property described by the one or more syntax elements (e.g., depending on values of the one or more syntax elements), (wherein, for example, a number of bins prescribed by the entropy coding scheme may be equal to zero if only one processing scheme is allowable in view of the one or more considered syntax elements); and provide (e.g., transmit, upload, save as a file), as the encoded representation of the video sequence, a bit stream comprising the one or more syntax elements and comprising the encoded index (e.g., if the selected number of bins is larger than zero).

Selecting the processing scheme to be applied to the portion based on the property of the portion, provides equivalent functionalities and advantages as described with respect to the previous aspect. Further, selecting the entropy coding scheme depending on the property enables adapting the provision of the encoded index to the property. For example, a number of possible values of the encoded index may be limited to a number of processing schemes that are applicable to the portion having the property. Thus, the encoded index may involve a low number of bits or even no bit in the bit stream, even if an overall number of processing schemes that are selectable for different portions is large. Thus, selecting the entropy coding scheme based on a knowledge about the property of the portion, which is available to the encoder by determining the one or more syntax elements, may provide for an efficient providing of the encoded index. Selecting both the process scheme and the entropy encoding scheme according to the property therefore may therefore enhance an overall efficiency of the encoding although the selected processing scheme may be indicated in the bit stream.

According to an embodiment, in the encoder, the entropy coding scheme comprises a binarization scheme for providing the encoded index. As the entropy coding scheme is selected depending on the property, the binarization scheme may be adapted according to the property, so that the binarization scheme may provide for a particularly short representation of the encoded index.

According to an embodiment, in the encoder, the binarization scheme comprises a number of bins to be used for providing the encoded index. Thus, the number of bins used for providing the encoded index may be adapted according to the property, so that the encoder may be capable of selecting a low number of bins or even no bin for providing the encoded index, such providing an efficient encoding.

According to an embodiment, the encoder is configured to adapt a mapping rule mapping an index value onto an encoded index value in dependence on the property described by the one or more syntax elements.

According to an embodiment, the encoder is configured to adapt a number of bins used for providing the encoded index indicating the selected processing scheme depending on the property described by the one or more syntax elements.

According to an embodiment, the encoder is configured to determine a set of processing schemes allowable in view of the property described by the one or more syntax elements and select a processing scheme from the determined set.

According to an embodiment, the encoder is configured to determine whether a single processing scheme is allowable for the portion of the video sequence and selectively omit the inclusion of an encoded index in response to the finding that only a single processing scheme (e.g. spatial filter or interpolation filter) is allowable for the portion of the video sequence.

According to an embodiment, the encoder is configured to select a mapping rule mapping an index value onto an encoded index value such that a number of bins representing the encoded index value is adapted to a number of processing schemes allowable for the portion of the video sequence.

According to an embodiment, in the encoder, the processing scheme is a filter (e.g., an interpolation filter) or a set of filters (e.g., interpolation filters) (e.g. parameterized by fractional part of motion vector).

According to an embodiment, in the encoder, the filters in the set of filters are separably applicable (e.g., one-dimensional filters which are sequentially applicable in the spatial directions, e.g., an x direction and/or a y direction) to the portion of the video sequence.

According to an embodiment, the encoder is configured to select different processing schemes (e.g., different interpolation filters) for different blocks (e.g., different prediction unit PU and/or coding unit CU and/or a coding tree unit CTU) within a video frame or picture (different interpolation filters for same fractional sample positions in different parts of a video sequence or in different parts of a single video frame or "picture").

According to an embodiment, the encoder is configured to encode the index indicating the selected processing scheme (e.g., in dependence on the one or more syntax elements) such that a given encoded index value represents (e.g., is associated with) different processing schemes depending on a motion vector accuracy (which may, for example, be signaled using a syntax element in the bit stream and which may, for example, take one out of the following values: QPEL, HPEL, FPEL, 4PEL).

According to an embodiment, in the encoder, the one or more syntax elements comprise at least one of a motion vector accuracy (e.g., quarter-sample, half-sample, full-sample), a fractional sample position, a block size, a block shape, a number of prediction hypotheses (e.g., one hypothesis for an uni-prediction, two hypotheses for a bi-prediction), a prediction mode (e.g., translational inter, affine inter, translational merge, affine merge, combined inter/intra), an availability of a coded residual signal (e.g., a coded block flag), spectral properties of the coded residual signal, a reference picture signal (e.g., a reference block defined by motion data, block edges from collocated prediction units PUs inside a reference block, high or low frequency characteristics of the reference signal), loop filter data (e.g., an edge offset or band offset classification from a sample adaptive offset filter SAO, a deblocking filter decisions and boundary strengths), motion vector lengths (e.g. only enable additional smoothing filters for long motion vectors or for a specific direction), or an adaptive motion vector resolution mode.

According to an embodiment, the encoder is configured to encode the index indicating the selected processing scheme (e.g., in dependence on the one or more syntax elements) such that a given encoded index value represents (e.g., is associated with) different processing schemes depending on a fractional part (or fractional parts) of motion vector (wherein, for example, different encoding schemes are used in dependence on whether all motion vectors of a considered portion point to integer sample positions, e.g. luma sample positions, or not).

According to an embodiment, the encoder is configured to selectively determine a set of processing schemes (e.g. "multi-possibility encoding") for a motion vector accuracy (e.g. a sub-sample motion vector accuracy, e.g. HPEL) which is between a maximum motion vector accuracy (e.g. a sub-sample motion vector resolution which is finer than the motion vector accuracy mentioned before; e.g. QPEL) and a minimum motion vector accuracy (e.g. 4PEL) or for a motion vector accuracy (e.g. HPEL) which is between a maximum motion vector accuracy (e.g. QPEL) and a full-sample motion vector accuracy (e.g. FPEL) and select processing scheme from the determined set.

According to an embodiment, the encoder is configured to encode an index (processing scheme index, if_idx) for selecting between a first FIR filtering (e.g., an HEVC filtering) (e.g. HEVC 8-tap filtering), a second FIR filtering and a third FIR filtering.

According to an embodiment, the encoder is configured to encode an index (processing scheme index, if_idx) for selecting between a first FIR filtering (e.g., an HEVC filtering) (e.g., HEVC 8-tap filtering) and a second FIR filtering.

According to an embodiment, the encoder is configured to select (e.g., switch) between processing schemes (e.g., interpolation filters) having different characteristics (e.g. stronger low-pass characteristic vs. weaker low-pass characteristic).

According to an embodiment, the encoder is configured to select the mapping rule in dependence on a motion vector accuracy and a fractional sample position or fractional part (or fractional parts) of motion vector.

According to an embodiment, the encoder is configured to determine available sets of processing schemes (e.g. interpolation filters) in dependence on motion vector accuracy.

According to an embodiment, the encoder is configured to select between a quarter-sample motion vector resolution, a half-sample motion vector resolution, a full-sample motion vector resolution and a four-sample motion vector resolution (wherein, for example, the index element describing a processing scheme or an interpolation filter is selectively included in case a half-sample motion vector resolution is selected and wherein the index element describing the processing scheme is, for example, omitted otherwise).

According to an embodiment, in the encoder, the processing scheme comprises one or more FIR filters.

Another aspect of the present disclosure relates to a decoder for hybrid video coding (e.g., video coding with prediction and transform coding of the prediction error), the decoder for providing an output video content on the basis of an encoded representation of a video sequence, the decoder configured to obtain (e.g., receive, download, open from a file) a bit stream as the encoded representation of the video sequence; identify from the bit stream one or more syntax elements (e.g., a motion vector accuracy syntax element) related to a portion (e.g. a block) of the video sequence (and an encoded index); identify a processing scheme (e.g., an interpolation filter, e.g., selected by an encoder) for the portion of the video sequence based on the one or more syntax elements and an index (which may be included in the bit stream in an encoded form), the processing scheme for obtaining a sample for a motion-compensated prediction (e.g., related to the video sequence, e.g. a sample, e.g., a fractional sample) at an integer and/or fractional location within the portion of the video sequence, wherein the decoder is configured to assign different processing schemes to a given encoded index value depending on the one or more syntax elements (e.g., depending on values of the one or more syntax elements); and apply the identified processing scheme to the portion of the video sequence.

The decoder is based on the idea, to identify a processing scheme for the portion based on the syntax elements and the index, although a given encoded index value representing a value of the index may be associated to various processing schemes. The identification of the processing scheme may be achieved by assigning a processing scheme to the encoded index value in dependence on the syntax element. Thus, the decoder may use information provided by the syntax elements for identifying the processing scheme from the different processing schemes that may be associated to the encoded index value. As a given encoded index value may be assigned to several processing schemes, the information density of the bit stream may be particularly high and still the decoder may identify the processing scheme.

According to an embodiment, in the decoder, the processing scheme is a filter (e.g., an interpolation filter) or a set of filters (e.g., interpolation filters) (e.g. parameterized by fractional part of motion vector).

According to an embodiment, in the decoder, the filters in the set of filters are separably applicable (e.g., one-dimensional filters which are sequentially applicable in the spatial directions, e.g., an x direction and/or a y direction) to the portion of the video sequence.

According to an embodiment, the decoder is configured to select (e.g., apply) filters (e.g., interpolation filters) depending on fractional part (or fractional parts) of motion vector (e.g. depending on a fractional part of one or more motion vectors) (e.g. by selecting, for example, applying, a first filter if a motion vector end point is at a full sample location or is at a full sample location in a direction under consideration, and by selecting, for example, applying, a second filter which is different from the first filter if a motion vector end point lies between full samples or lies between full samples in a direction under consideration).

According to an embodiment, the decoder is configured to select (e.g., apply) different filters (e.g., interpolation filters) for filtering in a first direction (e.g. x) and for filtering in a second direction (e.g. y) depending on fractional part (or fractional parts) of motion vector.

According to an embodiment, the decoder is configured to select (e.g., apply) different filters (e.g. interpolation filters) for filtering in a first direction and for filtering in a second direction such that a stronger low pass filtering is applied for a filtering in a direction in which (one or more or all) fractional part (or fractional parts) of motion vector lie on full samples (e.g. if half-sample accurate motion vector(s) point(s) to full sample location(s)) (when compared to a filtering applied in a direction in which fractional part (or fractional parts) of motion vector lie between full samples).

According to an embodiment, the decoder is configured to select (e.g., apply; e.g. individually per filtering direction) a filter (e.g., an interpolation filter) signaled by a syntax element (e.g. interpolation filter index if_idx) or a predetermined filter in dependence one or more fractional part (or fractional parts) of motion vector (wherein, for example, a filter signaled by a syntax element is selected for a filtering in a first direction, e.g. if one or more fractional part (or fractional parts) of motion vector lie between full samples, e.g. when considering position coordinates of the first direction, and wherein, for example, a predetermined filter is selected for a filtering in a second direction which is different from the first direction, e.g. if all fractional part (or fractional parts) of motion vector lie on full samples, e.g. when considering position coordinates of the second direction).

According to an embodiment, the decoder is configured to select (e.g., apply; e.g. individually per filtering direction) a first filter (e.g. interpolation filter) signaled by a filter syntax element (e.g. interpolation filter index if_idx) or a second filter signaled by the filter syntax element in dependence one or more fractional part (or fractional parts) of motion vector (wherein, for example, a first filter signaled by the filter syntax element is selected for a filtering in a first direction, e.g. if one or more fractional part (or fractional parts) of motion vector lie between full samples, e.g. when considering position coordinates of the first direction, and wherein, for example, a second filter signaled by the filter syntax element is selected for a filtering in a second direction which is different from the first direction, e.g. if all fractional part (or fractional parts) of motion vector lie on full samples, e.g. when considering position coordinates of the second direction).

According to an embodiment, the decoder is configured to take over a filter selection from a neighboring block in a merge mode (e.g. selectively in dependence on whether motion vectors are identical to the motion vectors of the neighboring block).

According to an embodiment, in the decoder, the selected (e.g. applied) processing scheme defines a (e.g. spatial) filtering of luma components and/or a (e.g. spatial) filtering of chroma components.

According to an embodiment, the decoder is configured to select (e.g. apply) a filter in dependence on prediction mode.

According to an embodiment, the decoder is configured to adapt a mapping rule mapping an encoded index value onto an indication (e.g., an index value) indicating a processing scheme in dependence on the one or more syntax elements.

According to an embodiment, the decoder is configured to adapt a number of bins used for identifying the encoded index indicating the selected processing scheme depending on the one or more syntax elements.

According to an embodiment, the decoder is configured to determine a set of processing schemes allowable in view of the one or more syntax elements from which a processing scheme to be applied is identified based on the one or more syntax elements and the index.

According to an embodiment, the decoder is configured to determine whether a single processing scheme is allowable for the portion of the video sequence and selectively omit the identification of an encoded index in response to the finding that only a single processing scheme (e.g. spatial filter or interpolation filter) is allowable for the portion of the video sequence.

According to an embodiment, the decoder is configured to select a mapping rule mapping an encoded index value onto an indication (e.g., an index value) indicating a processing scheme such that a number of bins representing the encoded index value is adapted to a number of processing schemes allowable for the portion of the video sequence.

According to an embodiment, the decoder is configured to select (e.g., apply) different processing schemes (e.g., different interpolation filters) for different blocks (e.g., different prediction unit PU and/or coding unit CU and/or a coding tree unit CTU) within a video frame or picture (different interpolation filters for same fractional sample positions in different parts of a video sequence or in different parts of a single video frame or "picture").

According to an embodiment, the decoder is configured to decode the index indicating the selected processing scheme (e.g., in dependence on the one or more syntax elements) such that a given encoded index value represents (e.g., is associated with) different processing schemes depending on a motion vector accuracy (which may, for example, be signaled using a syntax element in the bit stream and which may, for example, take one out of the following values: QPEL, HPEL, FPEL, 4PEL).

According to an embodiment, the one or more syntax elements comprise at least one of a motion vector accuracy (e.g., quarter-sample, half-sample, full-sample), a fractional sample position, a block size, a block shape, a number of prediction hypotheses (e.g., one hypothesis for an uni-prediction, two hypotheses for a bi-prediction), a prediction mode (e.g., translational inter, affine inter, translational merge, affine merge, combined inter/intra), an availability of a coded residual signal (e.g., a coded block flag), spectral properties of the coded residual signal, a reference picture signal (e.g., a reference block defined by motion data, block edges from collocated prediction units PUs inside a reference block, high or low frequency characteristics of the reference signal), loop filter data (e.g., an edge offset or band offset classification from a sample adaptive offset filter SAO, a deblocking filter decisions and boundary strengths), motion vector lengths (e.g. only enable additional smoothing filters for long motion vectors or for a specific direction), or an adaptive motion vector resolution mode.

According to an embodiment, the decoder is configured to decode the index indicating the selected processing scheme (e.g., in dependence on the one or more syntax elements) such that a given encoded index value represents (e.g., is associated with) different processing schemes depending on a fractional part (or fractional parts) of motion vector (wherein, for example, different encoding schemes are used in dependence on whether all motion vectors of a considered portion point to integer sample positions, e.g. luma sample positions, or not).

According to an embodiment, the decoder is configured to selectively determine a set of processing schemes (e.g. "multi-possibility encoding") for a motion vector accuracy (e.g. a sub-sample motion vector accuracy, e.g. HPEL) which is between a maximum motion vector accuracy (e.g. a sub-sample motion vector resolution which is finer than the motion vector accuracy mentioned before; e.g. QPEL) and a minimum motion vector accuracy (e.g. 4PEL) or for a motion vector accuracy (e.g. HPEL) which is between a maximum motion vector accuracy (e.g. QPEL) and a full-sample motion vector accuracy (e.g. FPEL) from which a processing scheme to be applied is identified.

According to an embodiment, the decoder is configured to decode the index (processing scheme index, if_idx) for selecting between a first FIR filtering (e.g., an HEVC filtering) (e.g. HEVC 8-tap filtering), a second FIR filtering and a third FIR.

According to an embodiment, the decoder is configured to decode the index (processing scheme index, if_idx) for selecting between a first FIR filtering (e.g., an HEVC filtering) (e.g., HEVC 8-tap filtering) and a second FIR filtering.

According to an embodiment, the decoder is configured to apply processing schemes (e.g., interpolation filters) having different characteristics (e.g. stronger low-pass characteristic vs. weaker low-pass characteristic).

According to an embodiment, the decoder is configured to select the mapping rule in dependence on a motion vector accuracy and a fractional sample position or fractional part (or fractional parts) of motion vector.

According to an embodiment, the decoder is configured to determine available sets of processing schemes (e.g. interpolation filters) in dependence on motion vector accuracy.

According to an embodiment, the decoder is configured to apply one of a quarter-sample motion vector resolution, a half-sample motion vector resolution, a full-sample motion vector resolution or a four-sample motion vector resolution (wherein, for example, the index element describing a processing scheme or an interpolation filter is selectively included in the bit stream in case a half-sample motion vector resolution is selected and wherein the index element describing the processing scheme is, for example, omitted otherwise).

According to an embodiment, in the decoder, the processing scheme comprises one or more FIR filters.

Another aspect of the present disclosure relates to a decoder for hybrid video coding (e.g., video coding with prediction and transform coding of the prediction error), the decoder for providing an output video content on the basis of an encoded representation of a video sequence, the decoder configured to obtain (e.g., receive, download, open from a file) a bit stream as the encoded representation of the video sequence; identify from the bit stream one or more syntax elements (e.g., a motion vector accuracy syntax element) related to a portion (e.g. a block) of the video sequence; determine, depending on the one or more syntax elements, an entropy coding scheme used in the bit stream for providing an encoded index indicating a processing scheme (e.g., an interpolation filter, e.g., selected by an encoder) for the portion of the video sequence, the processing scheme for obtaining a sample for a motion-compensated prediction (e.g., related to the video sequence, e.g. a sample, e.g., a fractional sample) at an integer and/or fractional location within the portion of the video sequence; identify, if the determined entropy coding scheme prescribes a number of bins being greater than zero, in the bit stream the encoded index and decode the index; identify (e.g. select) the processing scheme based on the one or more syntax elements and based on the decoded index if the number of bins prescribed by the determined coding scheme is greater than zero (or identify the processing scheme based on the one or more syntax elements only if the determined number of bins is zero); and apply the identified processing scheme to the portion of the video sequence.

The decoder is based on the idea, to identify a processing scheme for the portion by determining the entropy coding scheme based on the syntax elements. From the determined entropy coding scheme the decoder may infer how to identify the processing scheme. By identifying, if the number of bins prescribed by the entropy coding scheme is greater than zero, the decoder may infer an information encoded in the bit stream by the entropy coding scheme independently from the number of bins. In other words, the decoder may use the information, that the number of bins is zero, for identifying the processing scheme. Further, as the decoder may use the syntax elements and the index for identifying the processing scheme from, the decoder may identify the processing scheme even if a given encoded index value may be associated to various processing schemes. Therefore, the decoder may identify the processing scheme even if the number of bins in the bit stream for transmitting an information about the processing scheme is small or even zero.

According to an embodiment, in the decoder, the entropy coding scheme comprises a binarization scheme used for providing the encoded index.

According to an embodiment, in the decoder, the binarization scheme comprises a number of bins used for providing the encoded index.

According to an embodiment, in the decoder, the processing scheme is a filter (e.g., an interpolation filter) or a set of filters (e.g., interpolation filters) (e.g. parameterized by fractional part of motion vector).

According to an embodiment, in the decoder, the filters in the set of filters are separably applicable (e.g., one-dimensional filters which are sequentially applicable in the spatial directions, e.g., an x direction and/or a y direction) to the portion of the video sequence.

According to an embodiment, the decoder is configured to select (e.g., apply) filters (e.g., interpolation filters) depending on fractional part (or fractional parts) of motion vector (e.g. depending on a fractional part of one or more motion vectors) (e.g. by selecting, for example, applying, a first filter if a motion vector end point is at a full sample location or is at a full sample location in a direction under consideration, and by selecting, for example, applying, a second filter which is different from the first filter if a motion vector end point lies between full samples or lies between full samples in a direction under consideration).

According to an embodiment, the decoder is configured to select (e.g., apply) different filters (e.g., interpolation filters) for filtering in a first direction (e.g. x) and for filtering in a second direction (e.g. y) depending on fractional part (or fractional parts) of motion vector.

According to an embodiment, the decoder is configured to select (e.g., apply) different filters (e.g. interpolation filters) for filtering in a first direction and for filtering in a second direction such that a stronger low pass filtering is applied for a filtering in a direction in which (one or more or all) fractional part (or fractional parts) of motion vector lie on full samples (e.g. if half-sample accurate motion vector(s) point(s) to full sample location(s)) (when compared to a filtering applied in a direction in which fractional part (or fractional parts) of motion vector lie between full samples).

According to an embodiment, the decoder is configured to select (e.g., apply; e.g. individually per filtering direction) a filter (e.g., an interpolation filter) signaled by a syntax element (e.g. interpolation filter index if_idx) or a predetermined filter in dependence one or more fractional part (or fractional parts) of motion vector (wherein, for example, a filter signaled by a syntax element is selected for a filtering in a first direction, e.g. if one or more fractional part (or fractional parts) of motion vector lie between full samples, e.g. when considering position coordinates of the first direction, and wherein, for example, a predetermined filter is selected for a filtering in a second direction which is different from the first direction, e.g. if all fractional part (or fractional parts) of motion vector lie on full samples, e.g. when considering position coordinates of the second direction).

According to an embodiment, the decoder is configured to select (e.g., apply; e.g. individually per filtering direction) a first filter (e.g. interpolation filter) signaled by a filter syntax element (e.g. interpolation filter index if_idx) or a second filter signaled by the filter syntax element in dependence one or more fractional part (or fractional parts) of motion vector (wherein, for example, a first filter signaled by the filter syntax element is selected for a filtering in a first direction, e.g. if one or more fractional part (or fractional parts) of motion vector lie between full samples, e.g. when considering position coordinates of the first direction, and wherein, for example, a second filter signaled by the filter syntax element is selected for a filtering in a second direction which is different from the first direction, e.g. if all fractional part (or fractional parts) of motion vector lie on full samples, e.g. when considering position coordinates of the second direction).

According to an embodiment, the decoder is configured to take over a filter selection from a neighboring block in a merge mode (e.g. selectively in dependence on whether motion vectors are identical to the motion vectors of the neighboring block).

According to an embodiment, in the decoder, the selected (e.g. applied) processing scheme defines a (e.g. spatial) filtering of luma components and/or a (e.g. spatial) filtering of chroma components.

According to an embodiment, the decoder is configured to select (e.g. apply) a filter in dependence on prediction mode.

According to an embodiment, the decoder is configured to adapt a mapping rule mapping an encoded index value onto an indication (e.g., an index value) indicating a processing scheme in dependence on the one or more syntax elements.

According to an embodiment, the decoder is configured to adapt a number of bins used for identifying the encoded index indicating the selected processing scheme depending on the one or more syntax elements.

According to an embodiment, the decoder is configured to determine a set of processing schemes allowable in view of the one or more syntax elements from which a processing scheme to be applied is identified based on the one or more syntax elements and the index.

According to an embodiment, the decoder is configured to determine whether a single processing scheme is allowable for the portion of the video sequence and selectively omit the identification of an encoded index in response to the finding that only a single processing scheme (e.g. spatial filter or interpolation filter) is allowable for the portion of the video sequence.

According to an embodiment, the decoder is configured to select a mapping rule mapping an encoded index value onto an indication (e.g., an index value) indicating a processing scheme such that a number of bins representing the encoded index value is adapted to a number of processing schemes allowable for the portion of the video sequence.

According to an embodiment, the decoder is configured to select (e.g., apply) different processing schemes (e.g., different interpolation filters) for different blocks (e.g., different prediction unit PU and/or coding unit CU and/or a coding tree unit CTU) within a video frame or picture (different interpolation filters for same fractional sample positions in different parts of a video sequence or in different parts of a single video frame or "picture").

According to an embodiment, the decoder is configured to decode the index indicating the selected processing scheme (e.g., in dependence on the one or more syntax elements) such that a given encoded index value represents (e.g., is associated with) different processing schemes depending on a motion vector accuracy (which may, for example, be signaled using a syntax element in the bit stream and which may, for example, take one out of the following values: QPEL, HPEL, FPEL, 4PEL).

According to an embodiment, in the decoder, the one or more syntax elements comprise at least one of a motion vector accuracy (e.g., quarter-sample, half-sample, full-sample), a fractional sample position, a block size, a block shape, a number of prediction hypotheses (e.g., one hypothesis for an uni-prediction, two hypotheses for a bi-prediction), a prediction mode (e.g., translational inter, affine inter, translational merge, affine merge, combined inter/intra), an availability of a coded residual signal (e.g., a coded block flag), spectral properties of the coded residual signal, a reference picture signal (e.g., a reference block defined by motion data, block edges from collocated prediction units PUs inside a reference block, high or low frequency characteristics of the reference signal), loop filter data (e.g., an edge offset or band offset classification from a sample adaptive offset filter SAO, a deblocking filter decisions and boundary strengths), motion vector lengths (e.g. only enable additional smoothing filters for long motion vectors or for a specific direction), or an adaptive motion vector resolution mode.

According to an embodiment, the decoder is configured to decode the index indicating the selected processing scheme (e.g., in dependence on the one or more syntax elements) such that a given encoded index value represents (e.g., is associated with) different processing schemes depending on a fractional part (or fractional parts) of motion vector (wherein, for example, different encoding schemes are used in dependence on whether all motion vectors of a considered portion point to integer sample positions, e.g. luma sample positions, or not).

According to an embodiment, the decoder is configured to selectively determine a set of processing schemes (e.g. "multi-possibility encoding") for a motion vector accuracy (e.g. a sub-sample motion vector accuracy, e.g. HPEL) which is between a maximum motion vector accuracy (e.g. a sub-sample motion vector resolution which is finer than the motion vector accuracy mentioned before; e.g. QPEL) and a minimum motion vector accuracy (e.g. 4PEL) or for a motion vector accuracy (e.g. HPEL) which is between a maximum motion vector accuracy (e.g. QPEL) and a full-sample motion vector accuracy (e.g. FPEL) from which a processing scheme to be applied is identified.

According to an embodiment, the decoder is configured to decode the index (processing scheme index, if_idx) for selecting between a first FIR filtering (e.g., an HEVC filtering) (e.g. HEVC 8-tap filtering), a second FIR filtering and a third FIR.

According to an embodiment, the decoder is configured to decode the index (processing scheme index, if_idx) for selecting between a first FIR filtering (e.g., an HEVC filtering) (e.g., HEVC 8-tap filtering) and a second FIR filtering.

According to an embodiment, the decoder is configured to apply processing schemes (e.g., interpolation filters) having different characteristics (e.g. stronger low-pass characteristic vs. weaker low-pass characteristic).

According to an embodiment, the decoder is configured to select the mapping rule in dependence on a motion vector accuracy and a fractional sample position or fractional part (or fractional parts) of motion vector.

According to an embodiment, the decoder is configured to determine available sets of processing schemes (e.g. interpolation filters) in dependence on motion vector accuracy.

According to an embodiment, the decoder is configured to apply one of a quarter-sample motion vector resolution, a half-sample motion vector resolution, a full-sample motion vector resolution or a four-sample motion vector resolution (wherein, for example, the index element describing a processing scheme or an interpolation filter is selectively included in the bit stream in case a half-sample motion vector resolution is selected and wherein the index element describing the processing scheme is, for example, omitted otherwise).

According to an embodiment, the processing scheme comprises one or more FIR filters.

Another aspect of the present disclosure relates to a method for hybrid video coding (e.g., video coding with prediction and transform coding of the prediction error), the method for providing an encoded representation of a video sequence on the basis of an input video content, (e.g., the method performed by an encoder), the method comprising: determining one or more syntax elements (e.g., a motion vector accuracy syntax element) related to a portion (e.g., a block) of the video sequence; selecting a processing scheme (e.g., an interpolation filter) to be applied (e.g., by a decoder) to the portion of the video sequence based a property (e.g. a decoder setting signaled by one or more syntax elements or a characteristic of a portion of the video sequence signaled by the one or more syntax elements) described by on the one or more syntax elements, the processing scheme for obtaining a sample for a motion-compensated prediction (e.g., related to the video sequence, e.g. a sample, e.g., a fractional sample) at an integer and/or fractional location within the portion of the video sequence; encoding an index indicating the selected processing scheme (e.g., in dependence on the one or more syntax elements) such that a given encoded index value represents (e.g., is associated with) different processing schemes depending on the property described by the one or more syntax elements (e.g., depending on values of the one or more syntax elements); and providing (e.g., transmit, upload, save as a file), as the encoded representation of the video sequence, a bit stream comprising the one or more syntax elements and the encoded index.

Another aspect of the present disclosure relates to a method for hybrid video coding (e.g., video coding with prediction and transform coding of the prediction error), the method for providing an encoded representation of a video sequence on the basis of an input video content, (e.g., the method performed by an encoder), the method comprising: determining one or more syntax elements (e.g., a motion vector accuracy syntax element) related to a portion (e.g., a block) of the video sequence; selecting a processing scheme (e.g., an interpolation filter) to be applied (e.g., by a decoder) to the portion of the video sequence based on a property (e.g. a decoder setting signaled by one or more syntax elements or a characteristic of a portion of the video sequence signaled by the one or more syntax elements) described by the one or more syntax elements, the processing scheme for obtaining a sample for a motion-compensated prediction (e.g., related to the video sequence, e.g. a sample, e.g., a fractional sample) at an integer and/or fractional location within the portion of the video sequence; selecting an entropy coding scheme used for providing an encoded index indicating the selected processing scheme depending on the property described by the one or more syntax elements (e.g., depending on values of the one or more syntax elements), (wherein, for example, a number of bins prescribed by the entropy coding scheme may be equal to zero if only one processing scheme is allowable in view of the one or more considered syntax elements); and providing (e.g., transmit, upload, save as a file), as the encoded representation of the video sequence, a bit stream comprising the one or more syntax elements and comprising the encoded index (e.g., if the selected number of bins is larger than zero).

Another aspect of the present disclosure relates to a method for hybrid video coding (e.g., video coding with prediction and transform coding of the prediction error), the method for providing an output video content on the basis of an encoded representation of a video sequence, (e.g., the method performed by a decoder), the method comprising: obtaining (e.g., receive, download, open from a file) a bit stream as the encoded representation of the video sequence; identifying from the bit stream one or more syntax elements (e.g., a motion vector accuracy syntax element) related to a portion (e.g. a block) of the video sequence (and an encoded index); identifying a processing scheme (e.g., an interpolation filter, e.g., selected by an encoder) for the portion of the video sequence based on the one or more syntax elements and an index (which may be included in the bit stream in an encoded form), the processing scheme for obtaining a sample for a motion-compensated prediction (e.g., related to the video sequence, e.g. a sample, e.g., a fractional sample) at an integer and/or fractional location within the portion of the video sequence, wherein the method assigns different processing schemes to a given encoded index value depending on the one or more syntax elements (e.g., depending on values of the one or more syntax elements); and applying the identified processing scheme to the portion of the video sequence.

Another aspect of the present disclosure relates to a method for hybrid video coding (e.g., video coding with prediction and transform coding of the prediction error), the method for providing an output video content on the basis of an encoded representation of a video sequence, (e.g., the method performed by a decoder), the method comprising: obtaining (e.g., receive, download, open from a file) a bit stream as the encoded representation of the video sequence; identifying from the bit stream one or more syntax elements (e.g., a motion vector accuracy syntax element) related to a portion (e.g. a block) of the video sequence; determine, depending on the one or more syntax elements, an entropy coding scheme used in the bit stream for providing an encoded index indicating a processing scheme (e.g., an interpolation filter, e.g., selected by an encoder) for the portion of the video sequence, the processing scheme for obtaining a sample for a motion-compensated prediction (e.g., related to the video sequence, e.g. a sample, e.g., a fractional sample) at an integer and/or fractional location within the portion of the video sequence; identifying, if the determined entropy coding scheme prescribes a number of bins being greater than zero, in the bit stream the encoded index and decode the index; identifying (e.g. select) the processing scheme based on the one or more syntax elements and based on the decoded index if the number of bins prescribed by the determined entropy coding scheme is greater than zero (or identify the processing scheme based on the one or more syntax elements only if the determined number of bins is zero); and applying the identified processing scheme to the portion of the video sequence.

Another aspect of the present disclosure relates to a video bit stream for hybrid video coding (e.g., video coding with prediction and transform coding of the prediction error), the video bit stream describing a video sequence (for example, in the form of an encoded representation of the video sequence), wherein the video bit stream comprises one or more syntax elements (e.g., a motion vector accuracy syntax element) related to a portion (e.g., a block) of the video sequence; wherein the video bit stream comprises a processing scheme index bit stream element (e.g., describing an interpolation filter to be used by a video decoder; e.g., if_idx) at least for some of the portions of the video sequence; wherein a presence of the processing scheme index bit stream element, (which, for example, describes a filtering or interpolation filtering to be performed by a video decoder) varies in dependence on the one or more other syntax elements (such that, for example, the processing scheme index bit stream element is present for a first value of another syntax element or for a first combination of values of a plurality of other syntax elements, and such that, for example the processing scheme index bit stream element is omitted for a second value of another syntax element or for a second combination of values of a plurality of other syntax elements).

Another aspect of the present disclosure relates to a video bit stream for hybrid video coding (e.g., video coding with prediction and transform coding of the prediction error), the bit stream describing a video sequence (for example, in the form of an encoded representation of the video sequence), wherein the video bit stream comprises one or more syntax elements (e.g., a motion vector accuracy syntax element) related to a portion (e.g., a block) of the video sequence; wherein the video bit stream comprises a processing scheme index bit stream element (e.g., describing an interpolation filter to be used by a video decoder; e.g., if_idx) at least for some of the portions of the video sequence; wherein a number of bins of the processing scheme index bit stream element varies in dependence on the one or more syntax elements related to the portion of the video sequence (such that, for example, the number of bins of the processing scheme index bit stream element is adapted to a number of processing schemes allowable for the portion of the video sequence; such that, for example, the number of bins of the processing scheme index bit stream element is equal to zero, for example, the processing scheme index bit stream element is omitted, when only a single one processing scheme is allowable for the portion of the video sequence).

Another aspect of the present disclosure relates to a video bit stream for hybrid video coding (e.g., video coding with prediction and transform coding of the prediction error), the bit stream describing a video sequence (for example, in the form of an encoded representation of the video sequence), wherein the video bit stream comprises one or more syntax elements (e.g., a motion vector accuracy syntax element) related to a portion (e.g., a block) of the video sequence; wherein the video bit stream comprises a processing scheme index bit stream element (e.g., describing an interpolation filter to be used by a video decoder; e.g., if_idx) at least for some of the portions of the video sequence; wherein a meaning of codewords (e.g., encoded index values) of the processing scheme index bit stream element varies in dependence on the one or more syntax elements related to the portion of the video sequence (such that, for example, different processing schemes are assigned to a given encoded index value depending on the one or more syntax elements related to the portion of the video sequence).

Another aspect of the present disclosure relates to a decoder for hybrid video coding, the decoder for providing an output video content on the basis of an encoded representation of a video sequence, the decoder configured to: obtain a bit stream as the encoded representation of the video sequence; identify from the bit stream one or more syntax elements related to a portion of the video sequence; select, depending on the one or more syntax elements, a processing scheme for the portion of the video sequence, wherein the processing scheme is completely specified by a property of the portion and a fractional part of a motion vector (wherein the property is described by the one or more syntax elements), the processing scheme for obtaining a sample for a motion-compensated prediction at an integer and/or fractional location within the portion of the video sequence; apply the identified processing scheme to the portion of the video sequence.

As the decoder may select the processing scheme based on the one or more syntax elements, the decoder may select the processing scheme for the portion without the need for a syntax element that is specifically dedicated for the processing scheme. Thus, the decoder may select the processing scheme even if the processing scheme is not explicitly indicated in the bit stream, so that the bit stream may be particularly small. As the decoder uses the one or more syntax elements for obtaining the processing scheme, the decoder may select the processing scheme at a granularity provided by the one a more syntax elements. Thus, the decoder may efficiently use information already provided in the bit stream for selecting the processing scheme at a fine granularity without requiring additional bits in the bit stream. The fractional part of the motion vector may characterize the processing scheme to be used for obtaining the sample particularly precisely, as the motion vector may be used for the motion-compensated prediction. Thus, the processing scheme may be selected quickly and reliably based on the fractional part of the motion vector.

According to an embodiment, the property of the portion specifying the processing scheme relates to one or two or all of a motion vector accuracy, a fractional position of the sample (to be obtained by the processing scheme), and a prediction mode to be used for the portion. As the processing scheme may be for obtaining a sample for a motion-compensated prediction, the MV accuracy may provide a precise hint on a suitable processing scheme to be used for the portion. As different processing schemes may be used for full sample, half sample, and quarter sample positions, the fractional position of the sample may limit the number of allowable processing schemes allowable or even specify the processing scheme. One or more or all of the motion vector accuracy, the fractional position of the sample and the prediction mode may be indicated by the one or more syntax elements for decoding the portion of the video sequence. Thus, the decoder main infer the processing scheme from already available information.

According to an embodiment, the portion is a prediction unit (PU) or a coding unit (CU), and wherein the decoder is configured to select the processing scheme individually for different portions of the video sequence. Selecting the processing scheme individually for different prediction units or coding units enables an a adaption of the processing scheme to local characteristics of the video sequence at a particularly fine granularity. This precise adaption allows for a decoding of the portion from a particularly small sized bit stream and/or may enable a particularly fast decoding. As the processing scheme is selected depending on the one or more syntax elements, deter mining the processing scheme individually for different prediction units or coding units is possible without increasing the size of the bit stream.

According to an embodiment, the decoder is configured to use different processing schemes for the same fractional sample position in different portions of the video sequence.

According to an embodiment, the decoder is configured to switch the processing scheme at a PU or CU level for adapting to local image characteristics.

According to an embodiment, none of the one or more syntax elements is explicitly dedicated for indicating the processing scheme.

Another aspect of the present disclosure relates to a decoder for hybrid video coding, the decoder for providing an output video content on the basis of an encoded representation of a video sequence, the decoder configured to: obtain a bit stream as the encoded representation of the video sequence; identify from the bit stream one or more syntax elements related to a portion of the video sequence; select, depending on a motion vector accuracy, a processing scheme for the portion of the video sequence, the processing scheme for obtaining a sample for a motion-compensated prediction at an integer and/or fractional location within the portion of the video sequence; apply the identified processing scheme to the portion of the video sequence.

According to an embodiment, the decoder is configured to select the processing scheme in dependence on a motion vector accuracy and a fractional position of the sample (to be obtained by the processing scheme).

According to an embodiment, the decoder is configured to select the processing scheme additionally depending on a prediction mode to be used for the portion.

According to an embodiment, the portion is a prediction unit (PU) or a coding unit (CU), and wherein the decoder is configured to select the processing scheme individually for different portions of the video sequence. Selecting the processing scheme individually for different prediction units or coding units enables an a adaption of the processing scheme to local characteristics of the video sequence at a particularly fine granularity. This precise adaption allows for a decoding of the portion from a particularly small sized bit stream and/or may enable a particularly fast decoding. As the processing scheme is selected depending on the one or more syntax elements, deter mining the processing scheme individually for different prediction units or coding units is possible without increasing the size of the bit stream.

According to an embodiment, the decoder is configured to use different processing schemes for the same fractional sample position in different portions of the video sequence.

According to an embodiment, the decoder is configured to switch the processing scheme at a PU or CU level for adapting to local image characteristics.

According to an embodiment, none of the one or more syntax elements is explicitly dedicated for indicating the processing scheme.

Another aspect of the present disclosure relates to a decoder for hybrid video coding, the decoder for providing an output video content on the basis of an encoded representation of a video sequence, the decoder configured to: obtain a bit stream as the encoded representation of the video sequence; identify from the bit stream one or more syntax elements related to a portion of the video sequence; determine, with a PU granularity or a CU granularity and depending on the one or more syntax elements, a processing scheme for the portion of the video sequence, the processing scheme for obtaining a sample for a motion-compensated prediction at an integer and/or fractional location within the portion of the video sequence; apply the identified processing scheme to the portion of the video sequence.

According to an embodiment, the decoder is configured to use different processing schemes for the same fractional sample position in different portions of the video sequence.

According to an embodiment, the decoder is configured to switch the processing scheme at a PU or CU level for adapting to local image characteristics.

According to an embodiment, none of the one or more syntax elements is explicitly dedicated for indicating the processing scheme.

According to an embodiment, in the decoder, the processing scheme is a filter (e.g., an interpolation filter) or a set of filters (e.g., interpolation filters) (e.g. parameterized by fractional part of motion vector).

According to an embodiment, in the decoder, the filters in the set of filters are separably applicable (e.g., one-dimensional filters which are sequentially applicable in the spatial directions, e.g., an x direction and/or a y direction) to the portion of the video sequence.

According to an embodiment, the decoder is configured to select (e.g., apply) different filters (e.g., interpolation filters) for filtering in a first direction (e.g. x) and for filtering in a second direction (e.g. y) depending on fractional part (or fractional parts) of motion vector.

According to an embodiment, the decoder is configured to select (e.g., apply) different filters (e.g. interpolation filters) for filtering in a first direction and for filtering in a second direction such that a stronger low pass filtering is applied for a filtering in a direction in which (one or more or all) fractional part (or fractional parts) of motion vector lie on full samples (e.g. if half-sample accurate motion vector(s) point(s) to full sample location(s)) (when compared to a filtering applied in a direction in which fractional part (or fractional parts) of motion vector lie between full samples).

According to an embodiment, the decoder is configured to take over a filter selection from a neighboring block in a merge mode (e.g. selectively in dependence on whether motion vectors are identical to the motion vectors of the neighboring block).

According to an embodiment, in the decoder, the selected (e.g. applied) processing scheme defines a (e.g. spatial) filtering of luma components and/or a (e.g. spatial) filtering of chroma components.

According to an embodiment, the decoder is configured to select (e.g., apply) different processing schemes (e.g., different interpolation filters) for different blocks (e.g., different prediction unit PU and/or coding unit CU and/or a coding tree unit CTU) within a video frame or picture (different interpolation filters for same fractional sample positions in different parts of a video sequence or in different parts of a single video frame or "picture").

According to an embodiment, the one or more syntax elements comprise at least one of a motion vector accuracy (e.g., quarter-sample, half-sample, full-sample), a fractional sample position, a block size, a block shape, a number of prediction hypotheses (e.g., one hypothesis for an uni-prediction, two hypotheses for a bi-prediction), a prediction mode (e.g., translational inter, affine inter, translational merge, affine merge, combined inter/intra), an availability of a coded residual signal (e.g., a coded block flag), spectral properties of the coded residual signal, a reference picture signal (e.g., a reference block defined by motion data, block edges from collocated prediction units PUs inside a reference block, high or low frequency characteristics of the reference signal), loop filter data (e.g., an edge offset or band offset classification from a sample adaptive offset filter SAO, a deblocking filter decisions and boundary strengths), motion vector lengths (e.g. only enable additional smoothing filters for long motion vectors or for a specific direction), or an adaptive motion vector resolution mode.

According to an embodiment, the decoder is configured to selectively determine a set of processing schemes (e.g. "multi-possibility encoding") for a motion vector accuracy (e.g. a sub-sample motion vector accuracy, e.g. HPEL) which is between a maximum motion vector accuracy (e.g. a sub-sample motion vector resolution which is finer than the motion vector accuracy mentioned before; e.g. QPEL) and a minimum motion vector accuracy (e.g. 4PEL) or for a motion vector accuracy (e.g. HPEL) which is between a maximum motion vector accuracy (e.g. QPEL) and a full-sample motion vector accuracy (e.g. FPEL) from which a processing scheme to be applied is identified.

According to an embodiment, the decoder is configured to apply processing schemes (e.g., interpolation filters) having different characteristics (e.g. stronger low-pass characteristic vs. weaker low-pass characteristic).

According to an embodiment, the decoder is configured to apply one of a quarter-sample motion vector resolution, a half-sample motion vector resolution, a full-sample motion vector resolution or a four-sample motion vector resolution.

According to an embodiment, in the decoder, the processing scheme comprises one or more FIR filters.

Another aspect of the present disclosure relates to an encoder for hybrid video coding, the encoder for providing an encoded representation of a video sequence on the basis of an input video content, the encoder configured to: determine one or more syntax elements related to a portion of the video sequence; select a processing scheme to be applied to the portion of the video sequence based on a property described by the one or more syntax elements, wherein the processing scheme is completely specified by the property of the portion and a fractional part of a motion vector, the processing scheme for obtaining a sample for a motion-compensated prediction at an integer and/or fractional location within the portion of the video sequence; provide, as the encoded representation of the video sequence, a bit stream comprising the one or more syntax elements.

According to an embodiment, the property described by the one or more syntax elements relates to one or two or all of a motion vector accuracy, a fractional position of the sample (to be obtained by the processing scheme), and a prediction mode to be used for the portion.

According to an embodiment, the portion is a prediction unit (PU) or a coding unit (CU), and wherein the encoder is configured to select the processing scheme individually for different portions of the video sequence.

According to an embodiment, the encoder is configured to use different processing schemes for the same fractional sample position in different portions of the video sequence.

According to an embodiment, the encoder is configured to switch the processing scheme at a PU or CU level for adapting to local image characteristics.

According to an embodiment, none of the one or more syntax elements is explicitly dedicated for indicating the processing scheme.

Another aspect of the present disclosure relates to an encoder for hybrid video coding, the encoder for providing an encoded representation of a video sequence on the basis of an input video content, the encoder configured to: determine one or more syntax elements related to a portion of the video sequence; select a processing scheme to be applied to the portion of the video sequence based on a motion vector accuracy described by the one or more syntax elements, wherein the processing scheme is completely specified by the property of the portion and a fractional part of a motion vector; provide, as the encoded representation of the video sequence, a bit stream comprising the one or more syntax elements.

According to an embodiment, the encoder is configured to select the processing scheme based on the motion vector accuracy and a fractional position of the sample (to be obtained by the processing scheme).

According to an embodiment, the encoder is configured to select the processing scheme additionally depending on a prediction mode to be used for the portion.

According to an embodiment, the portion is a prediction unit (PU) or a coding unit (CU), and wherein the encoder is configured to select the processing scheme individually for different portions of the video sequence.

According to an embodiment, the encoder is configured to use different processing schemes for the same fractional sample position in different portions of the video sequence.

According to an embodiment, the encoder is configured to switch the processing scheme at a PU or CU level for adapting to local image characteristics.

According to an embodiment, none of the one or more syntax elements is explicitly dedicated for indicating the processing scheme.

Another aspect of the present disclosure relates to an encoder for hybrid video coding, the encoder for providing an encoded representation of a video sequence on the basis of an input video content, the encoder configured to: determine one or more syntax elements related to a portion of the video sequence; select, with a PU granularity or a CU granularity, a processing scheme to be applied to the portion of the video sequence based on a motion vector accuracy described by the one or more syntax elements, wherein the processing scheme is completely specified by the property of the portion and a fractional part of a motion vector; provide, as the encoded representation of the video sequence, a bit stream comprising the one or more syntax elements.

According to an embodiment, the encoder is configured to use different processing schemes for the same fractional sample position in different portions of the video sequence.

According to an embodiment, the encoder is configured to switch the processing scheme at a PU or CU level for adapting to local image characteristics.

According to an embodiment, none of the one or more syntax elements is explicitly dedicated for indicating the processing scheme.

According to an embodiment, the encoder is configured to determine a set of processing schemes allowable in view of the property described by the one or more syntax elements and select a processing scheme from the determined set.

According to an embodiment, in the encoder, the processing scheme is a filter (e.g., an interpolation filter) or a set of filters (e.g., interpolation filters) (e.g. parameterized by fractional part of motion vector).

According to an embodiment, in the encoder, the filters in the set of filters are separably applicable (e.g., one-dimensional filters which are sequentially applicable in the spatial directions, e.g., an x direction and/or a y direction) to the portion of the video sequence.

According to an embodiment, the encoder is configured to select different processing schemes (e.g., different interpolation filters) for different blocks (e.g., different prediction unit PU and/or coding unit CU and/or a coding tree unit CTU) within a video frame or picture (different interpolation filters for same fractional sample positions in different parts of a video sequence or in different parts of a single video frame or picture).

According to an embodiment, in the encoder, the one or more syntax elements comprise at least one of a motion vector accuracy (e.g., quarter-sample, half-sample, full-sample), a fractional sample position, a block size, a block shape, a number of prediction hypotheses (e.g., one hypothesis for an uni-prediction, two hypotheses for a bi-prediction), a prediction mode (e.g., translational inter, affine inter, translational merge, affine merge, combined inter/intra), an availability of a coded residual signal (e.g., a coded block flag), spectral properties of the coded residual signal, a reference picture signal (e.g., a reference block defined by motion data, block edges from collocated prediction units PUs inside a reference block, high or low frequency characteristics of the reference signal), loop filter data (e.g., an edge offset or band offset classification from a sample adaptive offset filter SAO, a deblocking filter decisions and boundary strengths), motion vector lengths (e.g. only enable additional smoothing filters for long motion vectors or for a specific direction), or an adaptive motion vector resolution mode.

According to an embodiment, the encoder is configured to selectively determine a set of processing schemes (e.g. "multi-possibility encoding") for a motion vector accuracy (e.g. a sub-sample motion vector accuracy, e.g. HPEL) which is between a maximum motion vector accuracy (e.g. a sub-sample motion vector resolution which is finer than the motion vector accuracy mentioned before; e.g. QPEL) and a minimum motion vector accuracy (e.g. 4PEL) or for a motion vector accuracy (e.g. HPEL) which is between a maximum motion vector accuracy (e.g. QPEL) and a full-sample motion vector accuracy (e.g. FPEL) and select processing scheme from the determined set.

Another aspect of the present disclosure relates to method for hybrid video coding, the method for providing an output video content on the basis of an encoded representation of a video sequence, the method comprising: obtaining a bit stream as the encoded representation of the video sequence; identifying from the bit stream one or more syntax elements related to a portion of the video sequence; selecting, depending on the one or more syntax elements, a processing scheme for the portion of the video sequence, wherein the processing scheme is completely specified by a property of the portion and a fractional part of a motion vector, the processing scheme for obtaining a sample for a motion-compensated prediction at an integer and/or fractional location within the portion of the video sequence; applying the identified processing scheme to the portion of the video sequence.

According to an embodiment, the encoder is configured to select between a quarter-sample motion vector resolution, a half-sample motion vector resolution, a full-sample motion vector resolution and a four-sample motion vector resolution.

According to an embodiment, in the encoder, the processing scheme comprises one or more FIR filters. FIR filter are particularly stable filters for processing the video sequence.

Another aspect of the present disclosure relates to a method for hybrid video coding, the method for providing an output video content on the basis of an encoded representation of a video sequence, the method comprising: obtaining a bit stream as the encoded representation of the video sequence; identifying from the bit stream one or more syntax elements related to a portion of the video sequence; selecting, depending on a motion vector accuracy, a processing scheme for the portion of the video sequence, the processing scheme for obtaining a sample for a motion-compensated prediction at an integer and/or fractional location within the portion of the video sequence; applying the identified processing scheme to the portion of the video sequence.

Another aspect of the present disclosure relates to a method for hybrid video coding, the method for providing an output video content on the basis of an encoded representation of a video sequence, the method comprising: obtaining a bit stream as the encoded representation of the video sequence; identifying from the bit stream one or more syntax elements related to a portion of the video sequence; determining, with a PU granularity or a CU granularity and depending on the one or more syntax elements, a processing scheme for the portion of the video sequence, the processing scheme for obtaining a sample for a motion-compensated prediction at an integer and/or fractional location within the portion of the video sequence; apply the identified processing scheme to the portion of the video sequence.

Another aspect of the present disclosure relates to a method for hybrid video coding, the method for providing an encoded representation of a video sequence on the basis of an input video content, the method comprising: determining one or more syntax elements related to a portion of the video sequence; selecting a processing scheme to be applied to the portion of the video sequence based on a property described by the one or more syntax elements, wherein the processing scheme is completely specified by the property of the portion and a fractional part of a motion vector, the processing scheme for obtaining a sample for a motion-compensated prediction at an integer and/or fractional location within the portion of the video sequence; providing, as the encoded representation of the video sequence, a bit stream comprising the one or more syntax elements.

Another aspect of the present disclosure relates to a method for hybrid video coding, the method for providing an encoded representation of a video sequence on the basis of an input video content, the method comprising: determining one or more syntax elements related to a portion of the video sequence; selecting a processing scheme to be applied to the portion of the video sequence based on a motion vector accuracy described by the one or more syntax elements, the processing scheme for obtaining a sample for a motion-compensated prediction at an integer and/or fractional location within the portion of the video sequence; providing, as the encoded representation of the video sequence, a bit stream comprising the one or more syntax elements.

Another aspect of the present disclosure relates to a method for hybrid video coding, the method for providing an encoded representation of a video sequence on the basis of an input video content, the method comprising: determining one or more syntax elements related to a portion of the video sequence; selecting, with a PU granularity or a CU granularity, a processing scheme to be applied to the portion of the video sequence based on a property described by the one or more syntax elements, the processing scheme for obtaining a sample for a motion-compensated prediction at an integer and/or fractional location within the portion of the video sequence; providing, as the encoded representation of the video sequence, a bit stream comprising the one or more syntax elements.

Another aspect of the present disclosure relates to a computer program for performing any of the described methods for hybrid video coding when the computer program runs on a computer.

The described decoders provide functionalities and advantages analog to those described with respect to the encoders, and vice versa, in a sense that functionalities and advantages of the encoders referring to features of the encoder equivalently apply to the corresponding features of the decoder, wherein the decoding replaces the encoding, and vice versa. For example, if a feature of the encoder enables an encoding of an information in a particularly small-sized bit stream or an efficient encoding, a corresponding feature of the decoder may enable deriving the information from the small-sized bit stream or an efficient decoding, respectively. In other words, any of the features, functionalities and details disclosed herein with respect to the encoders may optionally be included into the decoders, and vice versa, both individually and taken in combination.

The described methods for hybrid video coding rely on the same ideas as the encoders and decoders described above, providing equal or equivalent functionalities and advantages. The methods may optionally be combined with (or supplemented by) any of the features, functionalities and details described herein with respect to the corresponding encoders and decoders. The methods for hybrid video coding may optionally be combined with the mentioned features, functionalities and details both individually or in any combination of them.

BRIEF DESCRIPTION OF THE DRAWINGS

Embodiments of the present invention will be detailed subsequently referring to the appended drawings, in which:

FIG. 17 shows a flowchart of a method for hybrid video coding according to another embodiment.

DETAILED DESCRIPTION OF THE INVENTION

Figure 1:
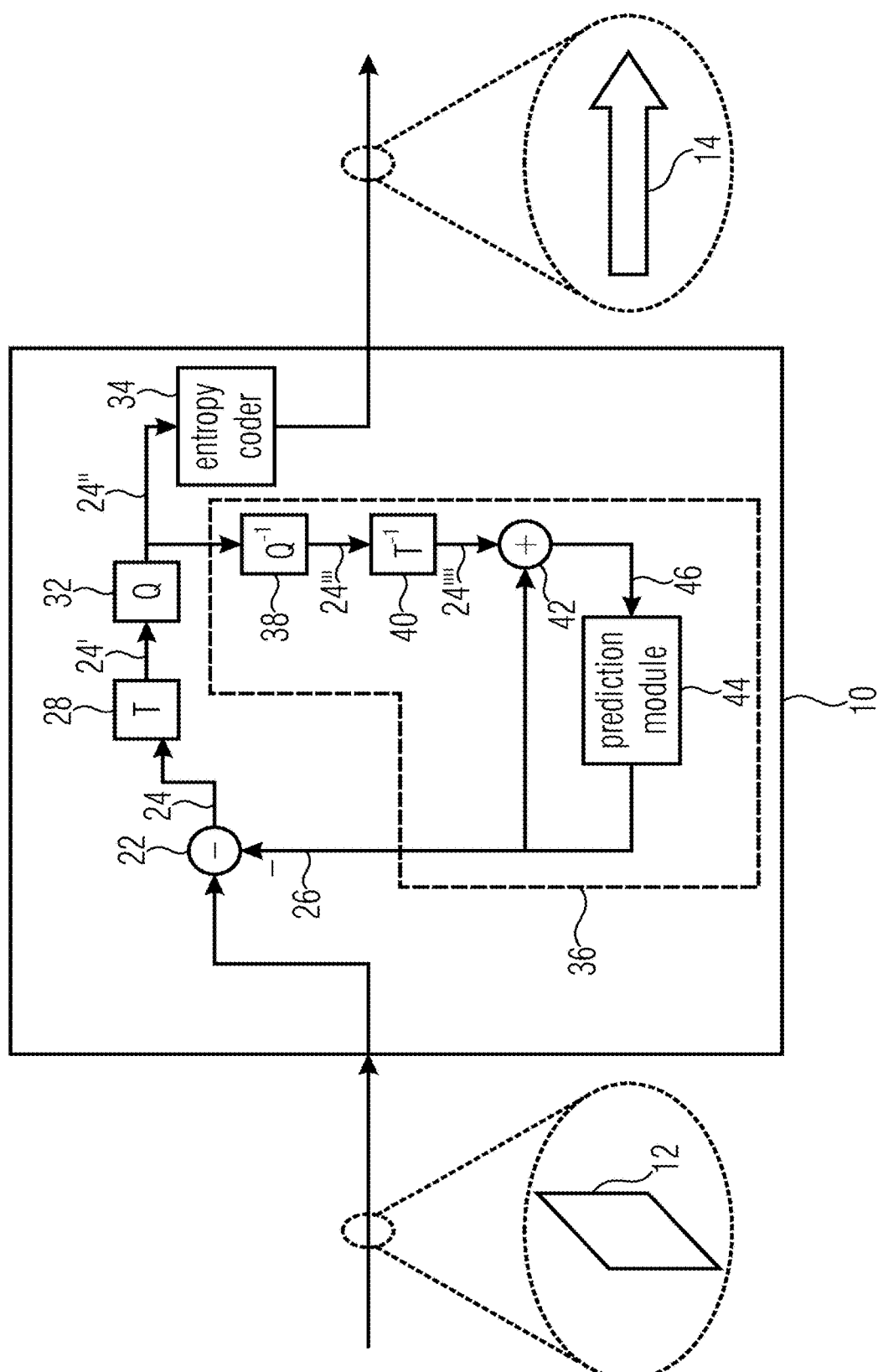
FIG. 1 shows a schematic representation of an encoder, which may implement the disclosed concept.

In the following, different inventive embodiments and aspects will be described.

Also, further embodiments will be defined by the enclosed claims.

It should be noted that any embodiments as defined by the claims can be supplemented by any of the details (features and functionalities) described herein.

Also, the embodiments described herein can be used individually, and can also be supplemented by any of the features included in the claims.

Also, it should be noted that individual aspects described herein can be used individually or in combination. Thus, details can be added to each of said individual aspects without adding details to another one of said aspects.

It should also be noted that the present disclosure describes, explicitly or implicitly, features usable in an video encoder (apparatus for providing an encoded representation of an input video signal) and in an video decoder (apparatus for providing a decoded representation of a video signal on the basis of an encoded representation). Thus, any of the features described herein can be used in the context of an video encoder and in the context of an video decoder.

Moreover, features and functionalities disclosed herein relating to a method can also be used in an apparatus (configured to perform such functionality). Furthermore, any features and functionalities disclosed herein with respect to an apparatus can also be used in a corresponding method. In other words, the methods disclosed herein can be supplemented by any of the features and functionalities described with respect to the apparatuses.

Also, any of the features and functionalities described herein can be implemented in hardware or in software, or using a combination of hardware and software, as will be described in the section "implementation alternatives".

Moreover, any of the features and syntax elements described herein can optionally be introduced into a video bit stream, both individually and taken in combination.

In the following description, embodiments are discussed in detail, however, it should be appreciated that the embodiments provide many applicable concepts that can be embodied in a wide variety of video encoders and video decoders. The specific embodiments discussed are merely illustrative of specific ways to implement and use the present concept, and do not limit the scope of the embodiments. In the following description of embodiments, the same or similar elements or elements that have the same functionality are provided with the same reference sign or are identified with the same name, and a repeated description of elements provided with the same reference number or being identified with the same name is typically omitted. Hence, descriptions provided for elements having the same or similar reference numbers or being identified with the same names are mutually exchangeable or may be applied to one another in the different embodiments. In the following description, a plurality of details is set forth to provide a more thorough explanation of embodiments of the disclosure. However, it will be apparent to one skilled it the art that other embodiments may be practiced without these specific details. In other instances, well-known structures and devices are shown in block diagram form rather than in detail in order to avoid obscuring examples described herein. In addition, features of the different embodiments described herein may be combined with each other, unless specifically noted otherwise.

1. Example of a Coding Framework

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIGS. 1 to 3. Thereinafter the description of embodiments of the concept of the present invention is presented along with a description as to how such concepts could be built into the encoder and decoder of FIGS. 1 and 2, respectively, although the embodiments described with the subsequent FIG. 4 and following, may also be used to form encoders and decoders not operating according to the coding framework underlying the encoder and decoder of FIGS. 1 and 2.

Figure 2:
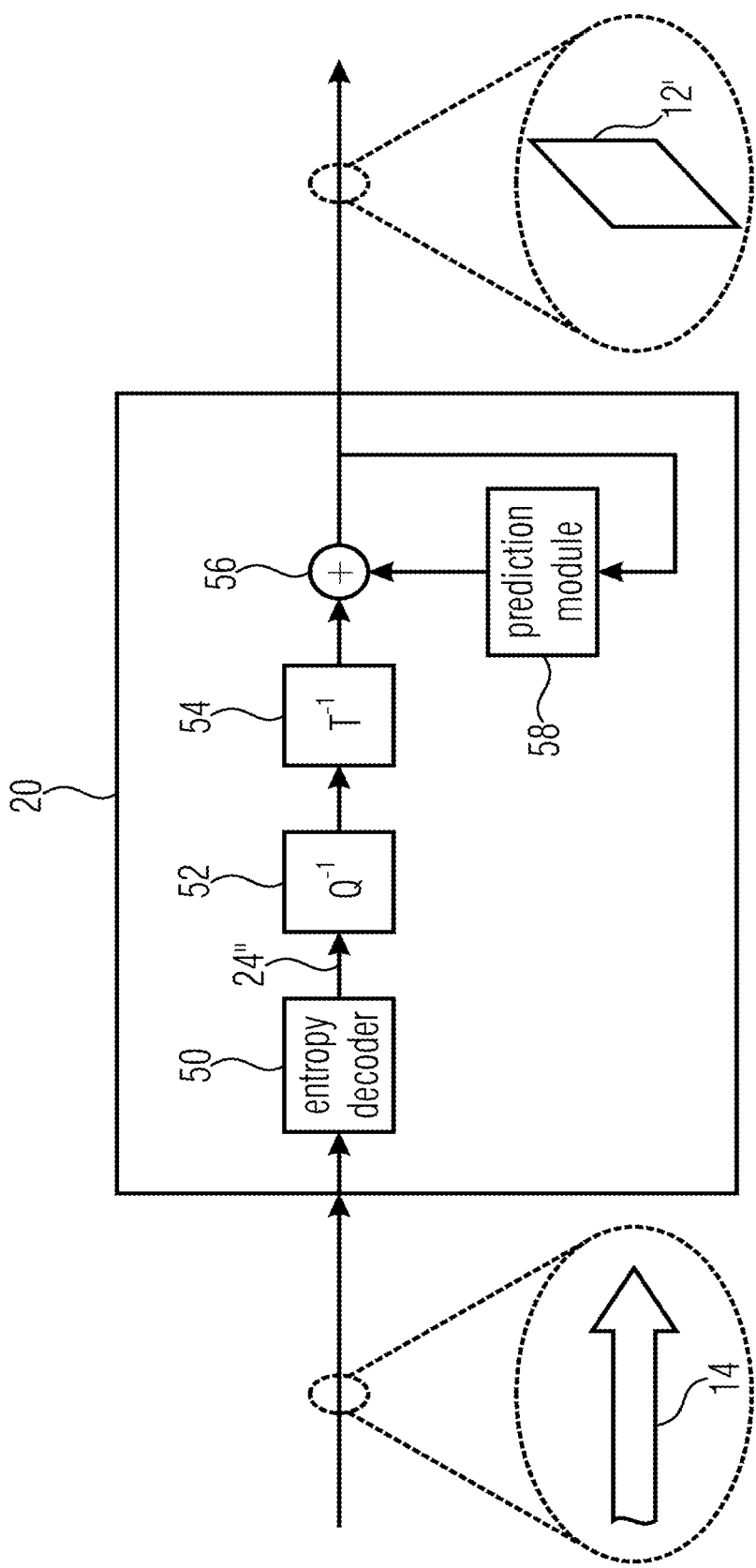
FIG. 2 shows a schematic representation of decoder, which may implement the disclosed concept.

FIG. 1 shows an apparatus for predictively coding a picture 12 into a data stream 14 exemplarily using transform-based residual coding. The apparatus, or encoder, is indicated using reference sign 10. FIG. 2 shows a corresponding decoder 20, i.e. an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. from the picture 12. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction signal 26 is generated by a prediction stage 36 of encoder 10 on the basis of the prediction residual signal 24" encoded into, and decodable from, data stream 14. To this end, the prediction stage 36 may internally, as is shown in FIG. 1, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24′′′′ so as to obtain a reconstructed signal 46, i.e. a reconstruction of the original signal 12. Reconstructed signal 46 may correspond to signal 12′. A prediction module 44 of prediction stage 36 then generates the prediction signal 26 on the basis of signal 46 by using, for instance, spatial prediction, i.e. intra-picture prediction, and/or temporal prediction, i.e. inter-picture prediction.

Likewise, decoder 20, as shown in FIG. 2, may be internally composed of components corresponding to, and interconnected in a manner corresponding to, prediction stage 36. In particular, entropy decoder 50 of decoder 20 may entropy decode the quantized spectral-domain prediction residual signal 24′′ from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24′′ so that, as shown in FIG. 2, the output of combiner 56 results in the reconstructed signal, namely picture 12′.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12′, respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24′′, data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12′, respectively, into the segments. The decoder 20 uses these parameters to subdivide the picture in the same manner as the encoder did, to assign the same prediction modes to the segments, and to perform the same prediction to result in the same prediction signal.

Figure 3:
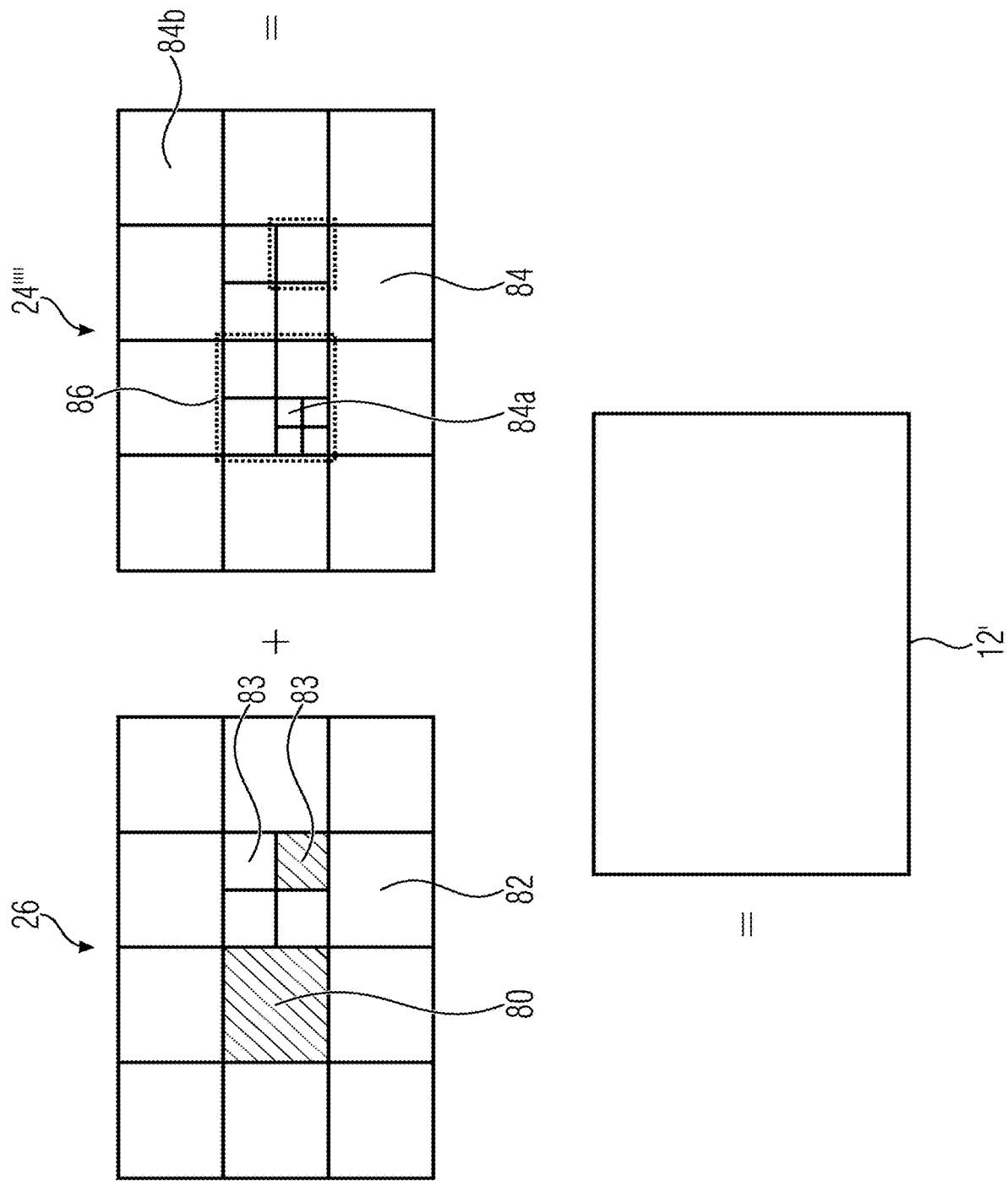
FIG. 3 illustrates signals used by encoders or decoders according to an embodiment.

FIG. 3 illustrates the relationship between the reconstructed signal, i.e. the reconstructed picture 12′, on the one hand, and the combination of the prediction residual signal 24′′′′ as signaled in the data stream 14, and the prediction signal 26, on the other hand. As already denoted above, the combination may be an addition. The prediction signal 26 is illustrated in FIG. 3 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 3 in which the picture area is first subdivided into rows and columns of tree root blocks which are then further subdivided in accordance with a recursive multi-tree subdivisioning into one or more leaf blocks. For example, the picture 12, 12′ may be subdivided into coding blocks 80, 82, which may, for example, represent coding tree blocks, and which may be further subdivided into smaller coding blocks 83.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24′′′′ in FIG. 3 is also illustrated as a subdivision of the picture area into blocks 84. These blocks might be called transform blocks in order to distinguish same from the coding blocks 80 and 82. In effect, FIG. 3 illustrates that encoder 10 and decoder 20 may use two different subdivisions of picture 12 and picture 12′, respectively, into blocks, namely one subdivisioning into coding blocks 80 and 82, respectively, and another subdivision into transform blocks 84. Both subdivisions might be the same, i.e. each coding block 80 and 82, may concurrently form a transform block 84, but FIG. 3 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, i.e. the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 3 further illustrates that the combination of the prediction signal 26 and the prediction residual signal 24'''' directly results in the reconstructed signal 12'. However, it should be noted that more than one prediction signal 26 may be combined with the prediction residual signal 24'''' to result into picture 12' in accordance with alternative embodiments.

As already outlined above, FIGS. 1 to 3 have been presented as an example where the inventive concept described further below may be implemented in order to form specific examples for encoders and decoders according to the present application. Insofar, the encoder and decoder of FIGS. 1 and 2, respectively, may represent possible implementations of the encoders and decoders described herein below. FIGS. 1 and 2 are, however, only examples. An encoder according to embodiments of the present application may, however, perform block-based encoding of a picture 12 using the concept outlined in more detail below. Likewise, decoders according to embodiments of the present application may perform block-based decoding of picture 12' from data stream 14 using the coding concept further outlined below, but may differ, for instance, from the decoder 20 of FIG. 2 in that same sub-divides picture 12' into blocks in a manner different than described with respect to FIG. 3 and/or in that same does not derive the prediction residual from the data stream 14 in transform domain, but in spatial domain, for instance.

2. Fractional-Samples According to FIG. 4

Embodiments of the present disclosure may be part of a concept for a motion-compensated prediction which may be an example of an inter-picture prediction as it may be applied by the prediction module 44, 58. MCP may be performed at fractional-sample accuracy. For example, a sample may refer to a pixel or a position of a picture or video sequence, wherein full-sample positions may refer to positions signaled in the picture or video sequence and fractional-sample positions may refer to positions between full-sample positions.

Figure 4:
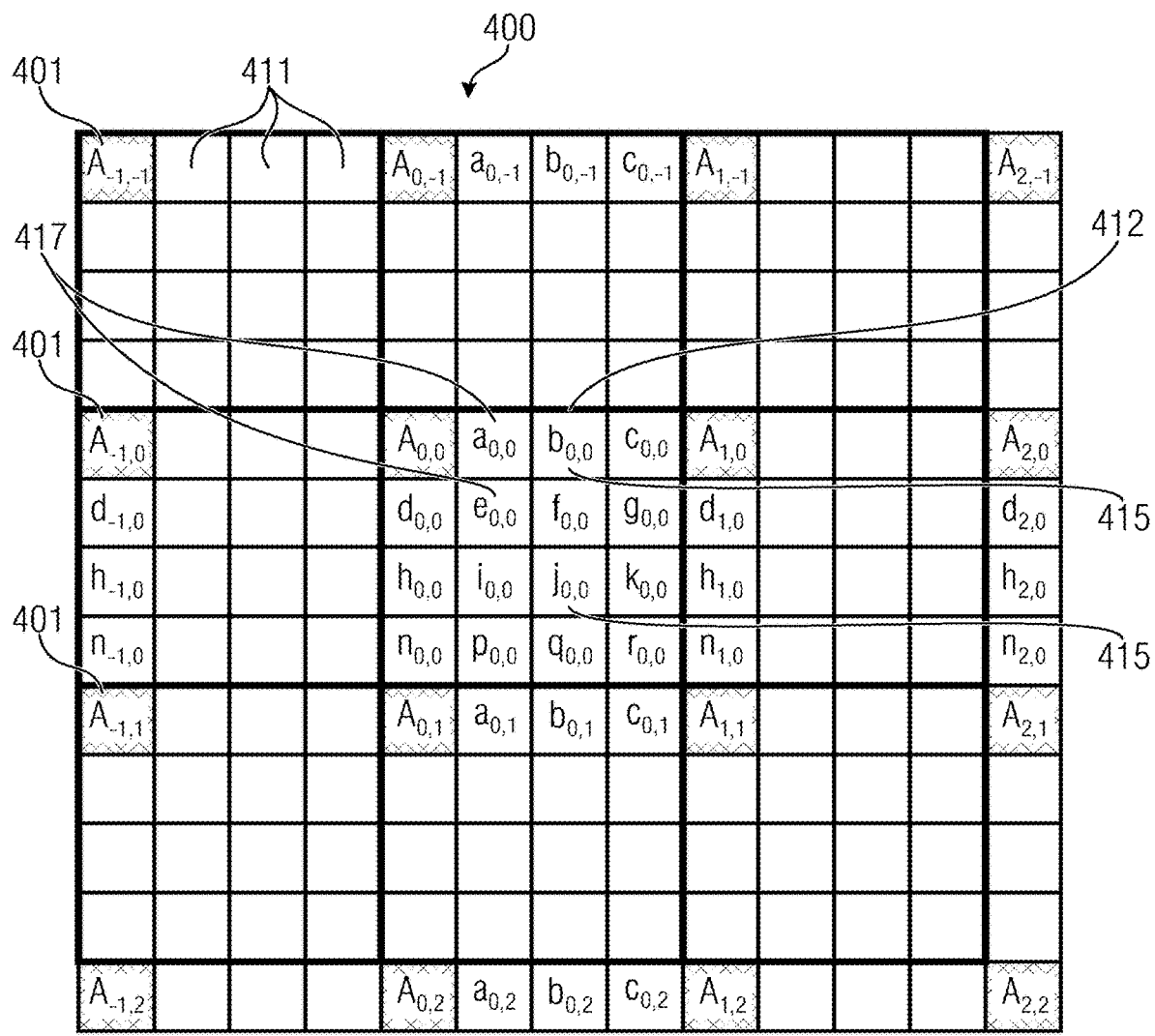
FIG. 4 illustrates fractional-sample positions which may be used in motion-compensated prediction according to an embodiment.

FIG. 4. shows integer samples 401 (shaded blocks with upper-case letters) and fractional sample positions 411 (un-shaded blocks with lower-case letters) for quarter sample luma interpolation. The samples shown in FIG. 4 may form or be part of a portion 400 of a video sequence. Further, fractional-sample positions 411 at quarter-sample resolution are indicated as un-shaded blocks and with lower-case letters. For example, the portion 400 may represent a luma coding block or may be part of same. Thus, FIG. 4 may represent a scheme for quarter sample luma interpolation. However, luma coding blocks are only one example of coding blocks, which may be used in the context of MCP. MCP may also be performed using chroma samples or samples of video sequences using other schemes of color planes, for example three color planes. For example, the fractional-sample positions 411 with quarter-sample resolution comprise half-sample positions 415 and quarter-sample positions 417.

The fractional-sample positions 411 may be obtained from the full-samples 401 by interpolation filtering. Different schemes for interpolation filtering may be possible. A scheme for interpolation filtering may provide a set of interpolation filters, each of the interpolation filters representing a rule for obtaining one or more specific fractional-sample positions.

As an example for interpolation filtering, the scheme used in HEVC for obtaining the 15 fractional luma sample positions, for example the un-shaded fractional-sample positions in block 412, is described with respect to FIG. 4. The HEVC scheme for interpolation filtering makes use of the FIR filters as listed in Tab. 1.

2.1 Interpolation Filtering in HEVC

In HEVC, which uses a motion vector accuracy of a quarter luma sample, there are 15 fractional luma sample positions (e.g. as shown in FIG. 4) which are calculated using various 1-dimensional FIR filters. However, for each fractional-sample position the interpolation filter is fixed.

TABLE 1

| Filter | Coefficients |
| --- | --- |
| HEVC (8-tap) | $h[i] = [-1\ 4\ -11\ 40\ 40\ -11\ 4\ -1]\ i = -3\ldots 4$ |
| HEVC (7-tap) | $q[i] = [-1\ 4\ -10\ 58\ 17\ -5\ 1]\ i = -3\ldots 3$ |

The scheme includes one symmetric 8-tap filter $h[i]$ for half-sample (HPEL) positions: Position $b_{0,0}$ is calculated by horizontally filtering integer sample positions $A_{-3,0}$ to $A_{4,0}$. Position $h_{0,0}$ is calculated by vertically filtering integer sample positions $A_{0,-3}$ to $A_{0,4}$ and Position $j_{0,0}$ is calculated by first calculating HPEL positions $b_{0,-3}$ to $b_{0,4}$ by horizontal filtering as described above followed by vertical filtering these using the same 8-tap filter:

$$b_{0,0} = \sum_{i=-3\ldots 4} A_{i,0} h[i],$$

$$h_{0,0} = \sum_{j=-3\ldots 4} A_{0,j} h[j],$$

$$j_{0,0} = \sum_{j=-3\ldots 4} b_{0,j} h[j]$$

One asymmetric 7-tap filter with coefficients $q[i]$ for quarter-sample (QPEL) positions: Here again, the positions with only one fractional-sample component are calculated by 1-D filtering of nearest integer-sample positions in vertical or horizontal direction:

$$a_{0,0} = \sum_{i=-3\ldots 3} A_{i,0} q[i],$$

$$c_{0,0} = \sum_{i=-2\ldots 4} A_{i,0} q[1-i]$$

$$d_{0,0} = \sum_{j=-3\ldots 3} A_{0,j} q[j],$$

$$n_{0,0} = \sum_{j=-2\ldots 4} A_{0,j} q[1-j]$$

All other QPEL positions are calculated by vertical filtering of nearest fractional-sample positions. For positions with vertical HPEL component the HPEL 8-tap filter is used:

$$j_{0,0} = \sum\nolimits_{j=-3\ldots 4} a_{0,j} h[j]$$

or $$i_{0,0} = \sum\nolimits_{j=-3\ldots 4} a_{0,j} h[j],$$

$$k_{0,0} = \sum\nolimits_{j=-3\ldots 4} c_{0,j} h[j]$$

For positions with vertical QPEL component the QPEL 7-tap filter is used:

$$e_{0,0} = \sum\nolimits_{j=-3\ldots 4} a_{0,j} h[j],$$

$$f_{0,0} = \sum\nolimits_{j=-3\ldots 4} b_{0,j} h[j],$$

$$g_{0,0} = \sum\nolimits_{j=-3\ldots 4} c_{0,j} h[j]$$

$$p_{0,0} = \sum\nolimits_{j=-2\ldots 4} a_{0,j} q[1-j],$$

$$p_{0,0} = \sum\nolimits_{j=-2\ldots 4} b_{0,j} q[1-j],$$

$$r_{0,0} = \sum\nolimits_{j=-2\ldots 4} c_{0,j} q[1-j]$$

This scheme may be applied to obtain the fractional-sample positions as shown in FIG. 4.

3. Encoders According to FIG. 5, FIG. 6 and FIG. 13

Figure 5:
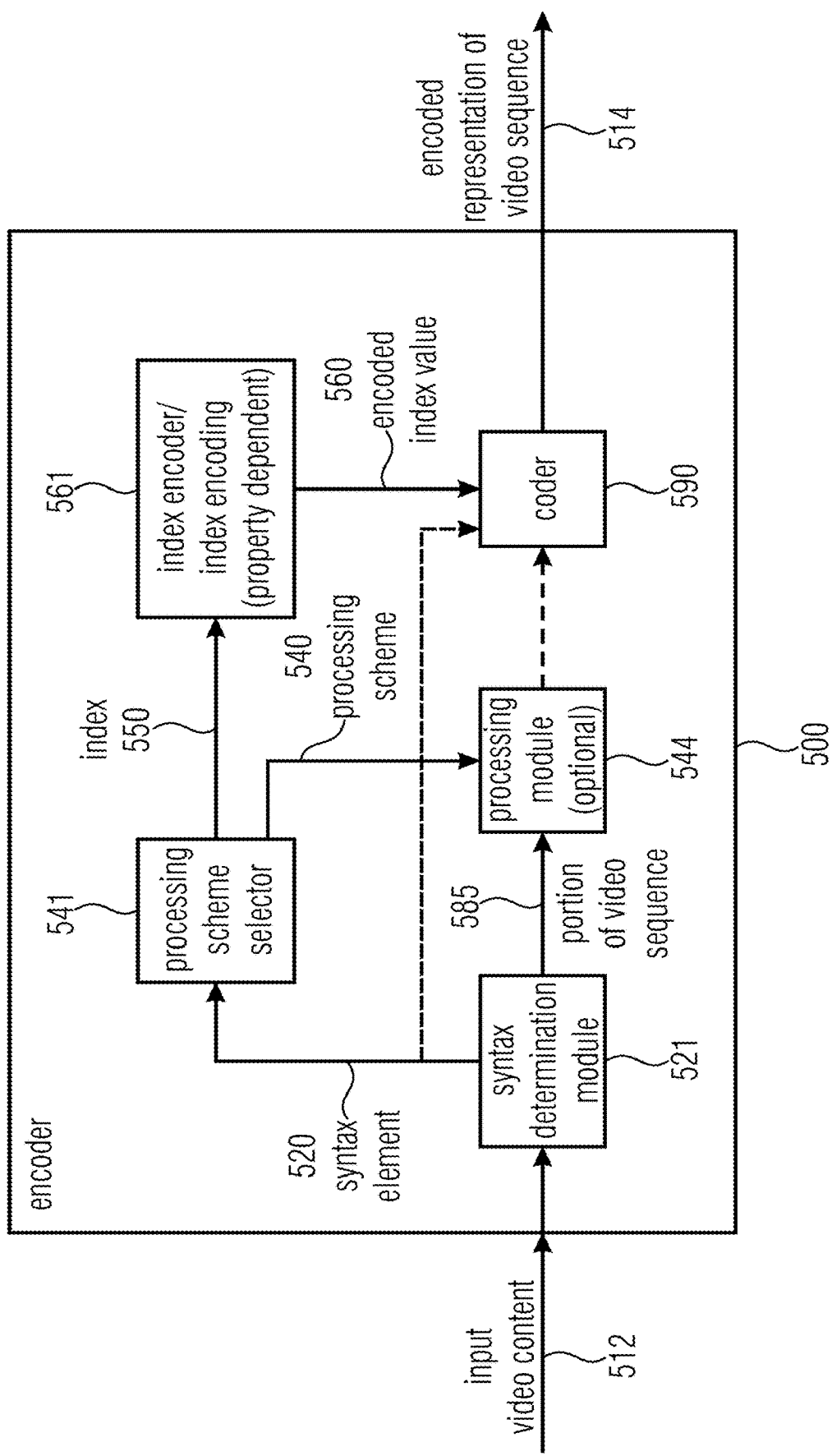
FIG. 5 illustrates an encoder according to an embodiment.

FIG. 5 illustrates an encoder 500 for hybrid video coding according to an embodiment. The encoder 500 is configured for providing an encoded representation 514 of a video sequence on the basis of an input video content 512. The encoder 500 is configured to determine one or more syntax elements 520 related to a portion 585 of the video sequence, for example by means of an syntax determination module 521. Further, the encoder 500 is configured to select a processing scheme 540 to be applied to the portion 585 of the video sequence based on a property described by the one or more syntax elements 520. For example, the encoder 500 comprises a processing scheme selector 541 for selecting the processing scheme 540. The processing scheme 540 is for obtaining a sample, e.g. the sample 401; 411; 415; 417, for a motion-compensated prediction at an integer and/or fractional location within the portion of the video sequence. The encoder is configured to encode an index 550, for example by means of an index encoder 561, wherein the index 550 indicates the selected processing scheme 540 such that a given encoded index value represents different processing schemes depending on the property described by the one or more syntax elements 520. Further, the encoder 500 is configured to provide, as the encoded representation 514 of the video sequence, a bit stream comprising the one or more syntax elements 520 and the encoded index 560. For example, the encoder 500 comprises a coder 590, for example an entropy coder, for providing the encoded representation 514. The index encoder 561 may be part of the coder 590 or may be separate.

Figure 6:
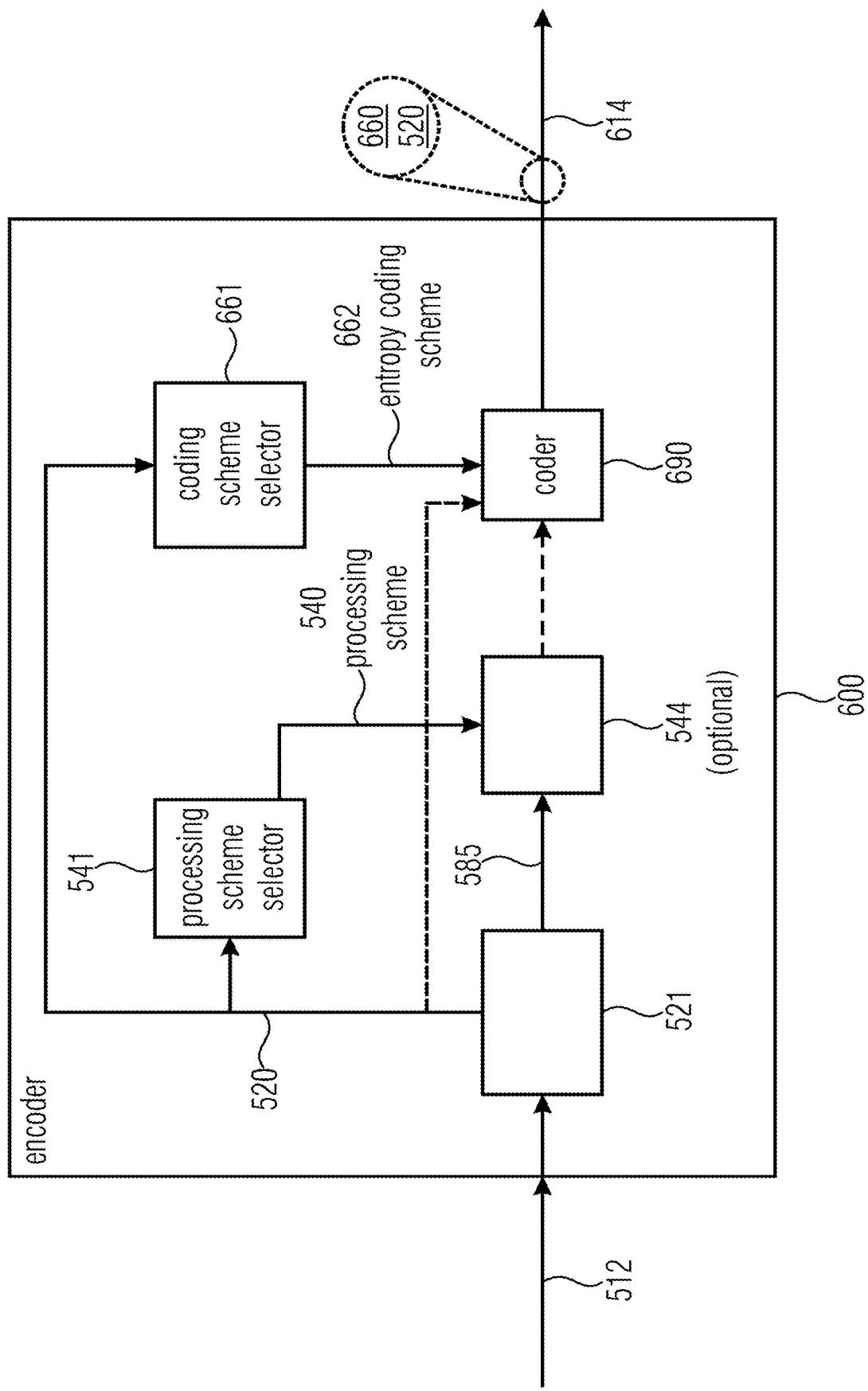
FIG. 6 illustrates an encoder according to another embodiment.

FIG. 6 illustrates an encoder 600 for hybrid video coding according to a further embodiment. The encoder 600 is configured for providing an encoded representation 614 of a video sequence on the basis of an input video content 512. The encoder 600 is configured to determine one or more syntax elements 520 related to a portion 585 of the video sequence, for example by means of a syntax determination module 521. Further, the encoder 500 is configured to select a processing scheme 540 to be applied to the portion 585 of the video sequence based on a property described by the one or more syntax elements 520. For example, the encoder 500 comprises a processing scheme selector 541 for selecting the processing scheme 540. The processing scheme 540 is for obtaining a sample, e.g. the sample 401; 411; 415, for a motion-compensated prediction at an integer and/or fractional location within the portion of the video sequence. The encoder 600 is configured to select an entropy coding scheme 662 used for providing an encoded index 660 indicating the selected processing scheme 540 depending on the property described by the one or more syntax elements 520. Further, the encoder 600 is configured to provide, as the encoded representation 614 of the video sequence, a bit stream comprising the one or more syntax elements 520 and comprising the encoded index 660. The encoded index value may represent a value of the encoded index 660.

Figure 13:
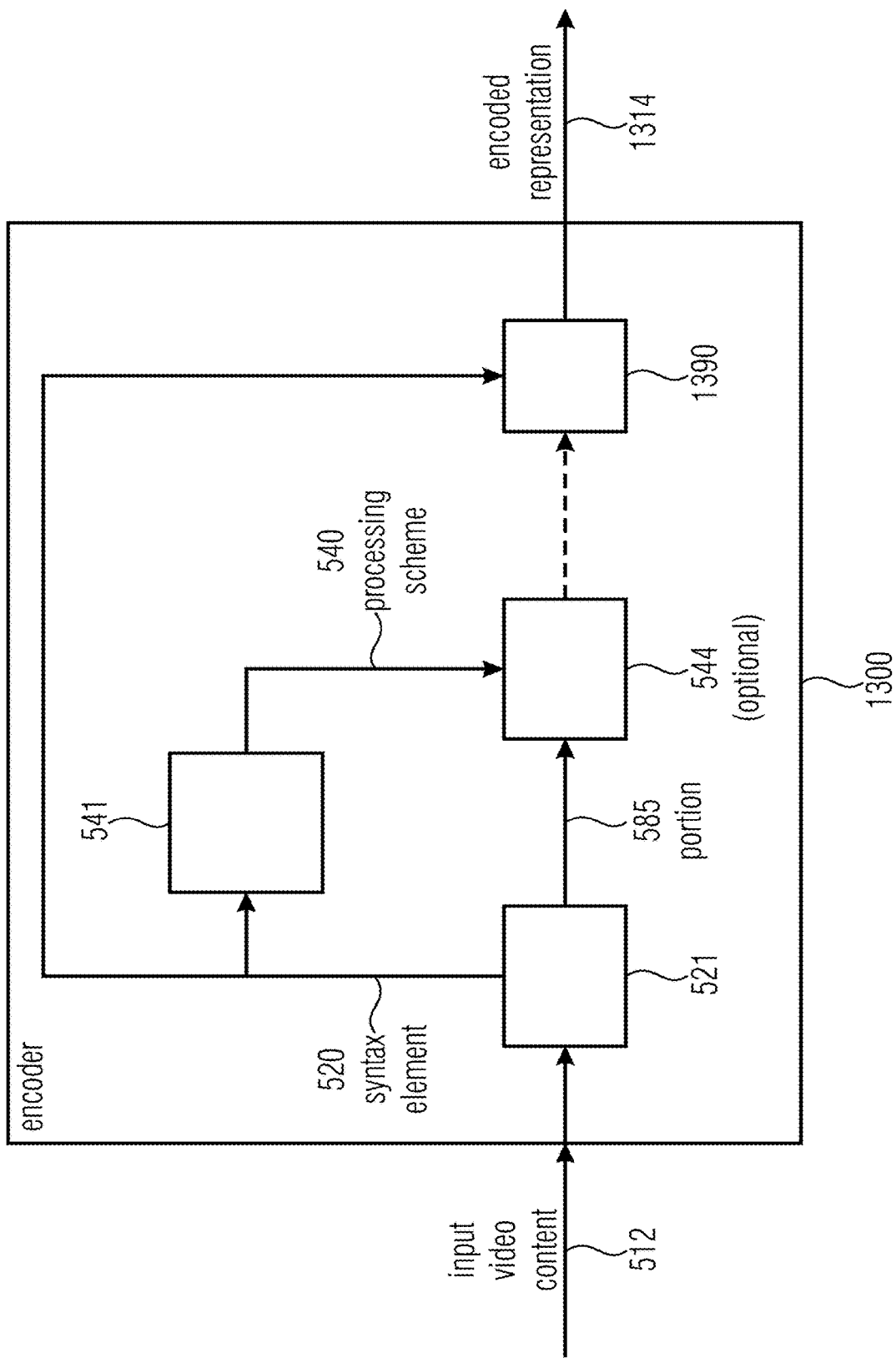
FIG. 13 illustrates an encoder according to another embodiment.

FIG. 13 illustrates an encoder 1300 for hybrid video coding according to further embodiments. The encoder 1300 is configured for providing an encoded representation 1314 of a video sequence on the basis of an input video content 512. The encoder 1300 is configured to determine one or more syntax elements 520 related to a portion 585 of the video sequence.

According to an embodiment, the encoder 1300 is configured to select a processing scheme 540 to be applied to the portion 585 of the video sequence based on a property described by the one or more syntax elements 520, wherein the processing scheme is completely specified by the property of the portion (585) and a fractional part of a motion vector, wherein the processing scheme 540 is for obtaining a sample 401, 411, 415, 417 for a motion-compensated prediction at an integer and/or fractional location within the portion 585 of the video sequence.

According to an alternative embodiment, the encoder 1300 is configured to select the processing scheme 540 to be applied to the portion 585 of the video sequence based on a motion vector accuracy described by the one or more syntax elements 520.

According to another alternative embodiment, the encoder 1300 is configured to select, with a PU granularity or a CU granularity, the processing scheme 540 to be applied to the portion 585 of the video sequence based on a property described by the one or more syntax elements 520.

Further, the encoder 1300 is configured to provide, as the encoded representation 1314 of the video sequence, a bit stream comprising the one or more syntax elements 520.

According to an embodiment, the encoder 1300 is configured to select another processing scheme than a standard processing scheme for HPEL positions of the sample to be obtained, if the determined one or more syntax elements 520 indicate a MV accuracy of HEPL, and if the prediction mode is one of translational-inter, translational merge, and combined inter/intra.

The following description equivalently applies to the encoders 500 according to FIG. 5, the encoder 600 according to FIG. 6 and the encoder 1300 according to FIG. 13, unless stated otherwise.

For example, the encoder 500, 600, 1300 receives the video sequence as the input video content and provides the encoded representation 514, 614, 1314 of the video sequence, which may comprise a plurality of video frames. The syntax determination module 521 may obtain the portion 585 of the video sequence, for example by splitting the video sequence or a video frame thereof, or by obtaining the portion 585 from a module for partitioning the video sequence. The portion 585 may be a result of a partitioning of the video sequence, for example into coding tree units or coding units or coding tree blocks or coding blocks, for example as described with respect to FIG. 3. For example, the portion 585 may result from a partitioning of the video sequence used for inter- or intra picture prediction, for example by the prediction module 44, 58 of FIG. 1 or FIG. 2. The syntax determination module 521 may further determine the one or more syntax elements 520 based on the portion 585 and optionally further parts of the video sequence.

The encoder 500, 600, 1300 optionally comprises a processing module 544 for applying the processing scheme 540 to the portion 585 for obtaining a prediction signal as indicated by the dashed arrow. For example, the prediction signal may be used for obtaining the encoded representation 514, 614, 1314 of the video sequence. For example, an encoding of the input video content 512 into the encoded representation 514, 614, 1314 may be performed according to the scheme described with respect to the encoder 10 in FIG. 1, wherein the picture 12 may represent the video content 512 and the bit stream 14 may comprise the encoded representation 514, 614, 1314. For example, the processing module 544 may comprise the prediction module 44 or may correspond to the prediction module 44, so that the processing scheme 540 may represent an input for the prediction module 44 which may use the processing scheme 540 for MCP for providing the prediction signal 26, for example using AMVR as introduced in the introductory part of the description.

According to an embodiment, the processing scheme 540 is a filter or a set of filters. For example, one or more filters may be a FIR filter, for example an interpolation filter.

For example, the processing scheme 540 may be an interpolation filter, such as the 8-tap filter and the 7-tap filter described in section 2.1, or similar interpolation filters, which may be used for obtaining fractional-sample positions, for example for MCP. In embodiments of the present invention, two additional 1D 6-tap low pass FIR filters may be supported, which may be applied instead of the HEVC 8-tap filter (with coefficients h[i] as described in Tab. 2). In the following, an interpolation filter may serve as an example of a processing scheme.

For example, the processing scheme 540 may have a spectral characteristic, such as low-pass or high-pass characteristic, so that the encoder 500, 600, 1300 may be configured to select between processing schemes having different characteristics.

According to an embodiment, the encoder 500, 600 is configured to select different processing schemes for different blocks within a video frame or picture.

For example, a video frame of the video sequence may be split into a plurality of blocks or portions, for example as indicated by the blocks 80, 82, 83 in FIG. 3, for example by the encoder 500, 600, 1300. For instance, the encoder 500, 600, 1300 may obtain the prediction signal 26 for each of the portions 80, 82, 83. The encoder 500, 600, 1300 may select the processing scheme 540 individually for different portions of the video frame. In this context, the portion or block of the video frame may refer to regular-sized blocks or first-level blocks resulting from a first recursion of a splitting of the video frame, such as coding tree blocks or coding tree units, for example the coding blocks 80 or 82. Also, the encoder 500, 600, 1300 may select different processing schemes for different sub-portions of such a portion or first-level block or coding tree unit, for example for the coding block 83. The encoder 500, 600, 1300 may even select different processing schemes for different portions or blocks of a coding block or coding unit.

Thus, the encoder 500, 600, 1300 may adapt an interpolation filter at a fine granularity of a picture or video frame of the video sequence, allowing of an adaptation to local characteristics within one slice, tile, or picture, i.e. at a granularity that is smaller than a size of a slice or tile or picture.

Thus, the encoder 500, 600, 1300 may determine an information about a size or a shape of the portion 585, such as a block size or a block shape and provide this information as the one or more syntax elements 520. Also, the encoder 500, 600, 1300 may determine or obtain further parameters, which may be used in the context of intra- or inter-picture prediction models. For example, the encoder 500, 600, 1300 may determine a MV accuracy to be applied for the portion 585, for example by the processing module 544 for obtaining a prediction signal for encoding the portion 585.

Accordingly, the one or more syntax elements 520 may comprise at least one of a motion vector accuracy, a fractional sample position, a block size, a block shape, a number of prediction hypotheses, a prediction mode, an availability of a coded residual signal, spectral properties of the coded residual signal, a reference picture signal, loop filter data, motion vector lengths, or an adaptive motion vector resolution mode.

For example, the encoder 500, 600, 1300 may deduce the processing scheme 540 from already determined properties or processing steps, which may be indicated by the one or more syntax elements 520. For example, in case of the merge mode of HEVC or VVC, the used interpolation filter may be inherited from the selected merging candidate. In another embodiment, it may be possible to override the inherited interpolation filter from the merging candidate by explicit signaling.

According to an embodiment, the encoder 500, 600, 1300 is configured to determine a set of processing schemes allowable in view of the property described by the one or more syntax elements and select a processing scheme 540 from the determined set. For example, the processing scheme selector 541 may infer from the one or more syntax elements 520, which processing schemes of an entity of processing schemes are compatible with the portion 585 or may be beneficially applied to the portion 585, so as to obtain an efficient encoding of the video sequence or in particular of the portion 585.

In other words, one or more processing schemes are available or allowable or selectable for the portion 585, depending on one or more properties of the portion 585 indicated by the one or more syntax elements 520. Thus, only one processing scheme may be allowable for the portion 585. In this case, the encoder 500, 600 may select the only allowable processing scheme as the processing scheme 540. As the processing scheme may, in this case, be uniquely identified from the one or more syntax elements 520, the encoder 500, 600 may skip the providing of the encoded index 550, 560 in the encoded representation 514, 614 to avoid redundant information and a signaling overhead in the bit stream. In case more than one processing schemes are allowable for the portion 585, the encoder may determine the allowable processing schemes as a set of processing schemes allowable for the portion 585 and may select the processing scheme 540 from this set of processing schemes. In the latter case, the encoder 500, 600 may encode the encoded index 560, 660 in the encoded representation 514, 614 for indicating the selected processing scheme 540. The embodiment described in section 6 may be an example of such an embodiment.

Thus, in some cases, the processing scheme or interpolation filter may be adapted for different portions of a video frame without a need of explicitly signaling the applied processing scheme or interpolation filter. Thus, no additional bit may be required in the bit stream comprising the encoded representation 514, 516.

If the if_idx is equal to 2, it indicates that the filter coefficients h[i] of the Gauss filter (see table below) are used for generating the HPEL positions When a CU is coded in merge mode and a merge candidate is generated by copying the motion vector(s) from a neighboring block without modifying the motion vector(s), the index if_idx is also copied. If if_idx is greater than 0, HPEL positions are filtered using the one of two non-HEVC filters (Flat Top or Gauss).

TABLE 2

| Filter | MV resolution | Coefficients h[i] | if_idx | Binarization |
|---|---|---|---|---|
| HEVC (8-tap) | HPEL | [−1 4 −11 40 40 −11 4 −1] | 0 | 0 |
| Flat Top (6-tap) | HPEL | [−3 4 31 31 4 −3] | 1 | 10 |
| Gauss (6-tap) | HPEL | [3 9 20 20 9 3] | 2 | 11 |

According to embodiments, which may correspond to the encoder 1300, the processing scheme is in all cases uniquely determined based on the properties described by the one or more syntax elements, so that no explicit indication of the processing scheme 540 in the encoded representation 1314 with an encoded index dedicated to the processing scheme 540 is required. Thus, according to embodiments, the encoder 1300 may not be required to determine whether to encode an encoded index or may not be required to select an encoding scheme.

According to an embodiment, the encoder 500, 600, 1300 is configured to determine available sets of processing schemes in dependence on a motion vector accuracy. For example, the available (or allowable) sets of interpolation filter may be determined by the motion vector accuracy chosen for a block (which is signaled using a dedicated syntax element).

For example, the one or more syntax elements 520 may indicate the MV accuracy selected for the portion 585, for example by using the scheme for signaling the MV accuracy described in section 6.1.2 with respect to Tab.3.

According to an embodiment, the encoder 500, 600, 1300 is configured to select between a quarter-sample motion vector resolution, a half-sample motion vector resolution, a full-sample motion vector resolution and a four-sample motion vector resolution.

According to an embodiment, the encoder 500, 600, 1300 is configured to selectively determine a set of processing schemes for a motion vector accuracy which is between a maximum motion vector accuracy and a minimum motion vector accuracy or for a motion vector accuracy which is between a maximum motion vector accuracy and a full-sample motion vector accuracy and select the processing scheme 540 from the determined set.

For example, in one embodiment, for an accuracy of half a luma sample, multiple sets of interpolation filter may be supported, while for all other possible motion vectors accuracies the default set of interpolation filters may be used.

According to one embodiment of the encoder 500, 600, in case the AMVR mode indicates HPEL accuracy (amvr mode=2), the interpolation filter may be explicitly signaled by one syntax element (if_idx) per CU:

If the if_idx is equal to 0, it indicates that the filter coefficients h[i] of the HEVC interpolation filter are used for generating the HPEL positions;

If the if_idx is equal to 1, it indicates that the filter coefficients h[i] of the Flat Top filter (see table below) are used for generating the HPEL positions For obtaining the encoded index 560, 660, the encoder 500, 600 may apply a mapping rule which maps the index 550 or an index indicating the selected processing scheme 540 onto the encoded index 560, 660. For example, the mapping rule may correspond to a binarization scheme. The encoder 500, 600 may adapt the encoded index 560, 660 in dependence on a number of allowable processing schemes, so that the encoded index 560, 660 involve a low number of bits.

For example, the encoder 500, 600 may select the processing scheme, and accordingly the mapping rule in dependence on a motion vector accuracy and/or a fractional sample position or fractional part of motion vector.

The encoder 500, 600 may further adapt a number of bins used for providing the encoded index 560, 660 depending on the property described by the one or more syntax elements 520, for example by adapting the mapping rule.

Thus, the encoder 500, 600 may select a mapping rule mapping an index value onto an encoded index value such that a number of bins representing the encoded index value is adapted to a number of processing schemes allowable for the portion 585 of the video sequence.

For example, the number of bins used for providing the encoded index 560 may depend on a number of processing schemes allowed in view of the property. For example, if only one processing scheme is allowed, the number of bins may be zero. Tab. 2 shows an example of three allowable processing schemes and a maximum number of three bins for the encoded index 560, 660 together with a corresponding mapping rule for mapping the index value onto an encoded index value.

For example, Tab. 2 shows an embodiment of a mapping rule for mapping the if_idx onto an encoded index value. The mapping rule may be different, for different MV accuracy.

In the embodiment described in Tab. 2, the interpolation filter may only be modified for HPEL positions. If the motion vectors points to an integer luma sample locations, no interpolation filter is used in all cases. If the motion vectors points to a reference picture location that represents a full-sample x (or y) position and a half-sample y (or x) position, the half-pel filter selected is only applied in vertical (or horizontal direction). Moreover, only the filtering of the luma component is affected, for the chroma components, the conventional chroma interpolation filters are used in all cases.

The if_idx index may correspond to the index 550 and the binarization values of the if_idx, e.g. as indicated in Tab. 2, may correspond to the encoded index 560, 660. Thus, the index encoder 561 may derive the encoded index 560 from the index 550 based on a binarization scheme, for instance the binarization scheme indicated in the last column of Tab. 2. In the context of the encoder 600, the binarization scheme indicated in the last column of Tab. 2 may correspond to the entropy coding scheme 662 or be part of the entropy coding scheme 662 selected by the coding scheme selector 661, based on which the coder 690 may provide the encoded index 660, which may, for example, correspond to the binarization values shown in Tab. 2 or to an encoded representation thereof. For example, the property, based on which the encoder 600 may select the entropy coding scheme 662 may correspond to the MV accuracy. Thus, Tab. 2 shows an example for a case, in which one or more of the syntax elements 520 indicate that the MV accuracy for the portion 585 is HPEL.

According to an embodiment, the encoder 500, 600 is configured to determine whether a single processing scheme 540 is allowable for the portion 585 of the video sequence and selectively omit the inclusion of an encoded index in response to the finding that only a single processing scheme 540 is allowable for the portion 585 of the video sequence. For example, the encoder 500 may omit the inclusion of the encoded index 560 into the encoded representation 514. The encoder 600 may, for example, select an entropy coding scheme 662 which indicates that no encoded index 660 is included into the encoded representation 614 or that the number bins or bits used for the encoded index 660 in the bit stream is zero.

According to an embodiment, the adaptive filter selection is extended to the chroma components. For example the encoder 500, 600 may select the processing scheme 540 in dependence on properties of the chroma components. The chroma components may be part of a chroma coding block which may be associated to a luma coding block. For example, the portion 585 may be part of a luma coding block and/or part of a chroma coding block.

4. Decoders According to FIG. 7 and FIG. 8

Figure 7:
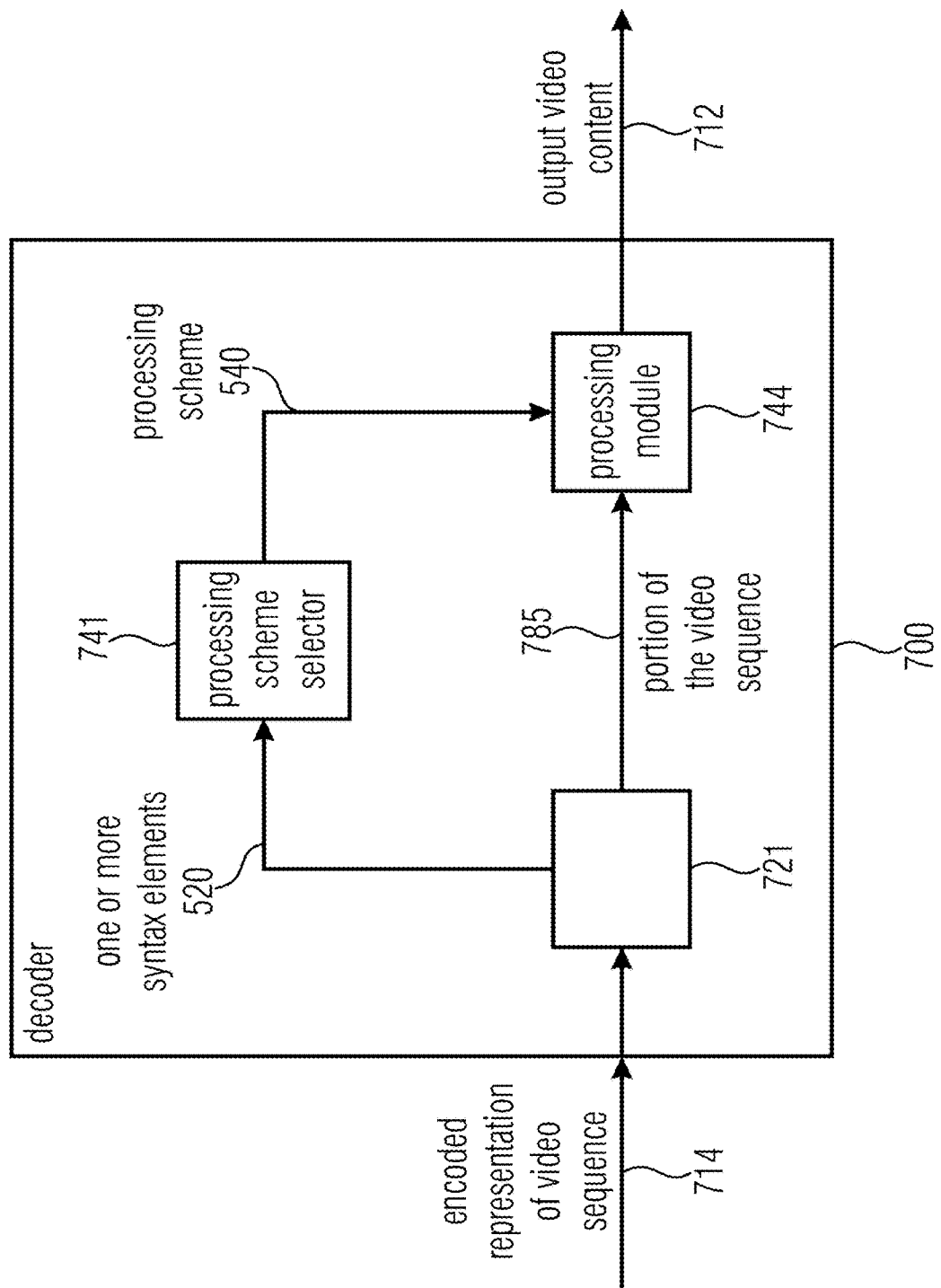
FIG. 7 illustrates a decoder according to an embodiment.

FIG. 7 illustrates a decoder 700 for hybrid video coding according to an embodiment. The decoder 700 is configured for providing an output video content 712 on the basis of an encoded representation 714 of a video sequence. The encoded representation 714 may correspond to the encoded representation 514, 614, 1314 as provided by the encoder 500, 600, 1300. The decoder 700 is configured to obtain a bit stream as the encoded representation 714 of the video sequence, and is configured to identify from the bit stream one or more syntax elements 520 related to a portion 785 of the video sequence, which may correspond to the portion 585 of the input video content 512.

According to an embodiment, the decoder 700 comprises a syntax identifier 721 for identifying the one or more syntax elements 520, which may have been encoded into the encoded representation 714 by the encoder 500, 600. Further, the decoder 700 is configured to identify a processing scheme 540 for the portion 785 of the video sequence based on the one or more syntax elements 520 and an index 550, the processing scheme 540 for obtaining a sample 401, 411, 415, 417 for a motion-compensated prediction at an integer 401 and/or fractional location 411, 415, 417 within the portion 785 of the video sequence, wherein the decoder 700 is configured to assign different processing schemes to a given encoded index value depending on the one or more syntax elements 520.

For example, the processing scheme selector 741 may determine the index 550 from the encoded representation 714 based on the one or more syntax elements 520 and may subsequently use the one or more syntax elements 520 and/or the index 550 for determining the processing scheme 540. Depending on the one or more syntax elements 520, the processing scheme selector 741 may also infer that the encoded representation 714 and the one or more syntax elements 520 do not include the index 550 and may deduce the index 550 from the one or more syntax elements 520.

According to an alternative embodiment, the decoder 700 is configured to select, depending on the one or more syntax elements 520, a processing scheme 540 for the portion 785 of the video sequence, wherein the processing scheme is completely specified by a property of the portion 785 and a fractional part of a motion vector, and wherein the processing scheme 540 is for obtaining a sample 401, 411, 415, 417 for a motion-compensated prediction at an integer and/or fractional location within the portion 785 of the video sequence.

According to another alternative embodiment, the decoder 700 is configured to select, depending on a motion vector accuracy, the processing scheme 540 for the portion 785 of the video sequence.

According to another alternative embodiment, the decoder 700 is configured to determine, with a PU granularity or a CU granularity and depending on the one or more syntax elements 520, the processing scheme 540 for the portion 785 of the video sequence.

Further, the decoder 700 is configured to apply the identified processing scheme 540 to the portion 785 of the video sequence, for example by means of a processing module 744.

Figure 8:
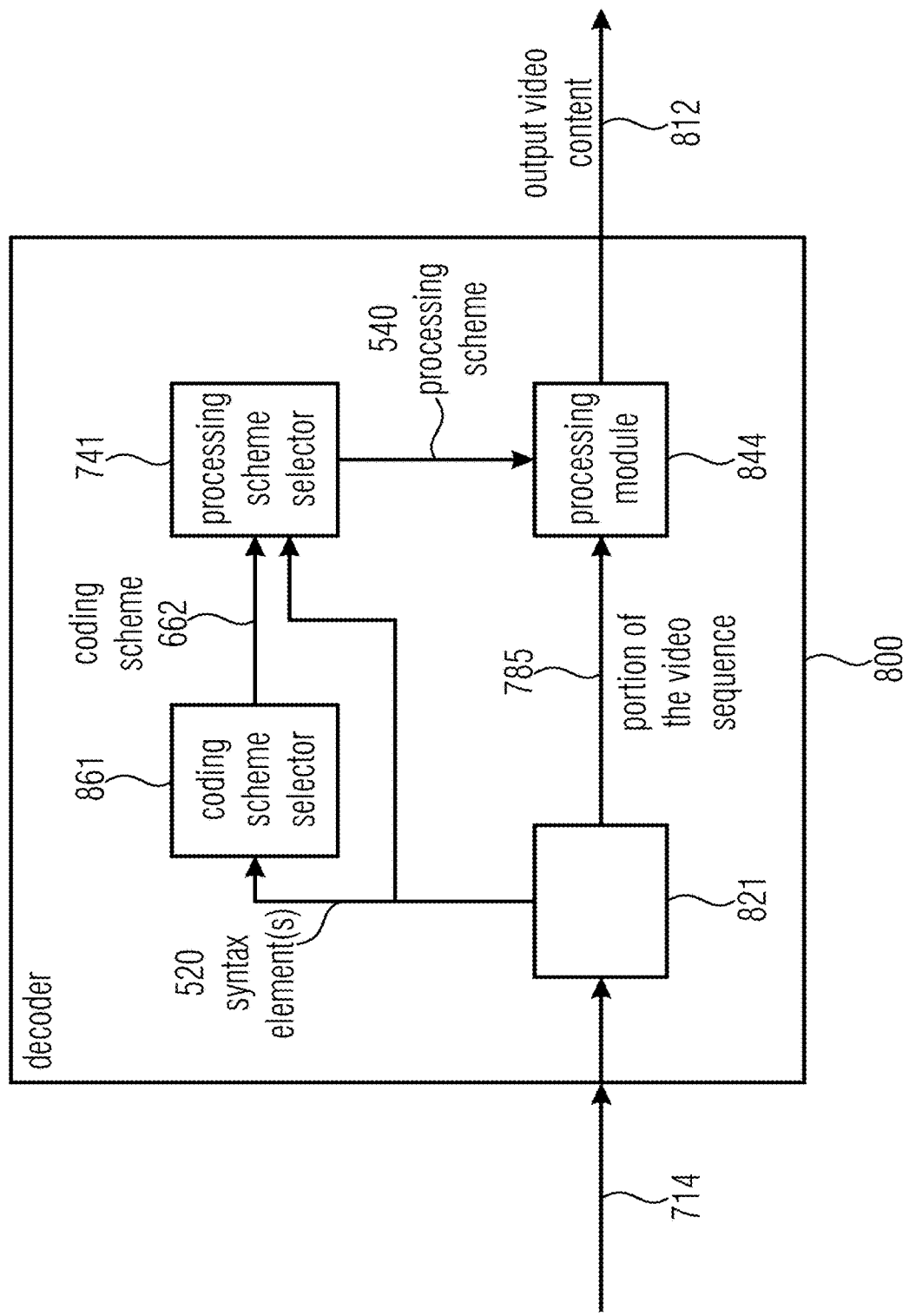
FIG. 8 illustrates a decoder according to another embodiment.

FIG. 8 illustrates a decoder 800 for hybrid video coding according to another embodiment. The decoder 800 is configured for providing an output video content 812 on the basis of an encoded representation 714 of a video sequence. The encoded representation 714 may correspond to the encoded representation 514, 614 as provided by the encoder 500, 600. The decoder 800 is configured to obtain a bit stream as the encoded representation 714 of the video sequence, and is configured to identify from the bit stream one or more syntax elements 520 related to a portion 785 of the video sequence, which may correspond to the portion 585 of the input video content 512. For example, the decoder 700 comprises a syntax identifier 821 for identifying the one or more syntax elements 520, which may have been encoded into the encoded representation 714 by the encoder 500, 600. Further, the decoder 800 is configured to determine, depending on the one or more syntax elements 520, an entropy coding scheme 662 used in the bit stream for providing an encoded index indicating a processing scheme 540 for the portion 785 of the video sequence, the processing scheme 540 for obtaining a sample 401; 411; 415; 417 for a motion-compensated prediction at an integer and/or fractional location within the portion 785 of the video sequence. For example, the decoder 800 comprises a coding scheme selector 861, which may correspond to the coding scheme selector 661 of the encoder 600, for determining the coding scheme 662 based on the one or more syntax elements 520. The decoder 800 is further configured to identify, if the determined entropy coding scheme 662 prescribes a number of bins being greater than zero, in the bit stream the encoded index and decode the index, for example by means of a processing scheme selector 841. The decoder 800 is further configured to identify the processing scheme 540 based on the one or more syntax elements 520 and based on the decoded index if the number of bins prescribed by the determined coding scheme is greater than zero. For example, the processing scheme selector 841 may identify the processing scheme 540. Further, the decoder 800 is configured to apply the identified processing scheme 540 to the portion 785 of the video sequence, for example by means of a processing module 844, which may correspond to the processing module 744.

The decoder 700, 800 may obtain the output video content 712, 812 from the encoded representation 514, 614, 1314 provided by the encoder 500, 600 based on the input video content 512 so that the output video content 712, 812 may correspond to the input video content 512 except for coding losses such as a quantization loss. Thus, the description of the encoders 500, 600, and features thereof, may equivalently apply to the decoder 700, 800, although some processes may be performed inverted. For example, features of the encoder 500, 600 referring to encoding may correspond to features of the decoder 700, 800 referring to decoding.

For example, the decoder 700, 800 may read or decode the one or more syntax elements 520 from the encoded representation 714, 814, 1314 as provided by the encoder 500, 600, 1300. Thus, the encoder 500, 600, 1300 and the decoder 700, 800, 1300 may apply equivalent assumptions or knowledge for determining the processing scheme 540 from the one or more syntax elements 520.

For example, the encoded index 560, 660 may indicate information which the decoder 700, 800 may not deduce from the one or more syntax elements 520, so that some embodiments of the decoder 700, 800 may determine the processing scheme 540 based on the encoded index 560, 660. For example, some embodiments of the decoder 700, 800 may decode the encoded index 560, 660 from the encoded representation 714, 814 for obtaining the index, e.g. the index 550, for example, if the decoder 700, 800 infers from the one or more syntax elements 520 that several processing schemes are allowable. However, it is pointed out, that not all embodiments of the decoder 700 are configured to deduce if several processing schemes are allowable. Some embodiments of the decoder 700 may be configured to infer the processing scheme 540 from the one or more syntax elements of the encoded representation 1314, for example in all cases or independently of the indication of the one or more syntax elements 520. Thus, embodiments of the decoder 700 may infer the processing scheme 540 from the one or more syntax elements 520 without decoding an index explicitly dedicated to the processing scheme 540.

Thus, features, functionalities, advantages, and examples of the one or more syntax elements 520, the processing scheme 540, the portion 585, the index 550, optionally the encoded index 560, 660 and further details of the encoders 500, 600, 1300 may equivalently apply to the decoders 700, 800, although the description of the elements is not explicitly repeated.

For example, the decoder 700, 800 may be implemented in the decoder 20 of FIG. 2. For example, the processing module 744, 844 may comprise the prediction module 58 or may correspond to the prediction module 58, so that the processing scheme 540 may represent an input for the prediction module 58 which may use the processing scheme 540 for MCP for providing the prediction signal 59. A relation between the encoder 500, 600 and the decoder 700, 800 may correspond to the relation between the encoder 10 and the decoder 20 as described in section 1.

According to an embodiment, the decoder 700, 800 is configured to determine whether a single processing scheme 540 is allowable for the portion 785 of the video sequence and selectively omit the identification of an encoded index in response to the finding that only a single processing scheme 540 is allowable for the portion 785 of the video sequence.

For example, the decoder 700 may determine whether a single processing scheme 540 is allowable for the portion 785 based on the one or more syntax elements 520. Depending on the outcome, the decoder 700 may either identify or decode the encoded index, which may correspond to the encoded index 560, 660, or the decoder 700 may omit or skip the identification of an encoded index and may select the single allowable processing scheme for the portion 785.

According to a further example, the decoder 800 may deduce from the entropy coding scheme 662 whether to decode an encoded index from the encoded representation 814. If an encoded index is to be decoded, the decoder 800 may decode the encoded index, which may correspond to the encoded index 560, 660, to determine an index, which may correspond to the index 550, and determine the processing scheme 540 based on the index. If no encoded index is to be decoded, the decoder 800 may omit or skip the decoding of the encoded index and determine the processing scheme 540 based on the one or more syntax elements 520.

According to an embodiment, the decoder 700, 800 is configured to select filters depending on a fractional part of a motion vector. For example, a motion vector may be represented by two components referring to two different directions. For example, a motion vector may be represented by a horizontal and a vertical component. Horizontal and vertical may represent two orthogonal directions in a plane of a picture or video frame. Thus, the fractional part of the motion vector may refer to a component of a MV having a fractional resolution.

According to an embodiment, the decoder 700, 800 is configured to select different filters for filtering in a first direction and for filtering in a second direction depending on a fractional part of a motion vector. For example, the decoder 700, 800 may select the different filters according to a first component of the MV, which describes a component of the MV in the first direction, and according to a second component of the MV, which describes a component of the MV in the second direction.

The encoded representation 514, 614, 714, 1314 may be part of a video bit stream provided by the encoder 500, 600, 1300, the video bit stream comprising an encoded representation of a plurality of portions of the video sequence of the input video content.

According to an embodiment, a video bit stream for hybrid video coding, the video bit stream describing a video sequence, comprises one or more syntax elements 520 related to a portion 585 of the video sequence. The video bit stream comprises a processing scheme 540 index bit stream element at least for some of the portions of the video sequence, wherein a presence of the processing scheme 540 index bit stream element, varies in dependence on the one or more other syntax elements 520. For example, the video bit stream may correspond to or may comprise the encoded representation 514, 614, 714.

According to an embodiment, a video bit stream for hybrid video coding, the video bit stream describing a video sequence, comprises one or more syntax elements 520 related to a portion 585 of the video sequence. The video bit stream comprises a processing scheme 540 index bit stream element at least for some of the portions of the video sequence, wherein a number of bins of the processing scheme 540 index bit stream element varies in dependence on the one or more syntax elements 520 related to the portion 585 of the video sequence. For example, the video bit stream may correspond to or may comprise the encoded representation 514, 614, 714.

According to an embodiment, a video bit stream for hybrid video coding, the video bit stream describing a video sequence, comprises one or more syntax elements 520 related to a portion 585 of the video sequence. The video bit stream comprises a processing scheme 540 index bit stream element at least for some of the portions of the video sequence, wherein a meaning of codewords of the processing scheme 540 index bit stream element varies in dependence on the one or more syntax elements 520 related to the portion 585 of the video sequence. For example, the video bit stream may correspond to or may comprise the encoded representation 514, 614, 714.

5. Methods for Hybrid Video Coding According to FIG. 9, FIG. 10, FIG. 11, and FIG. 12

Figure 9:
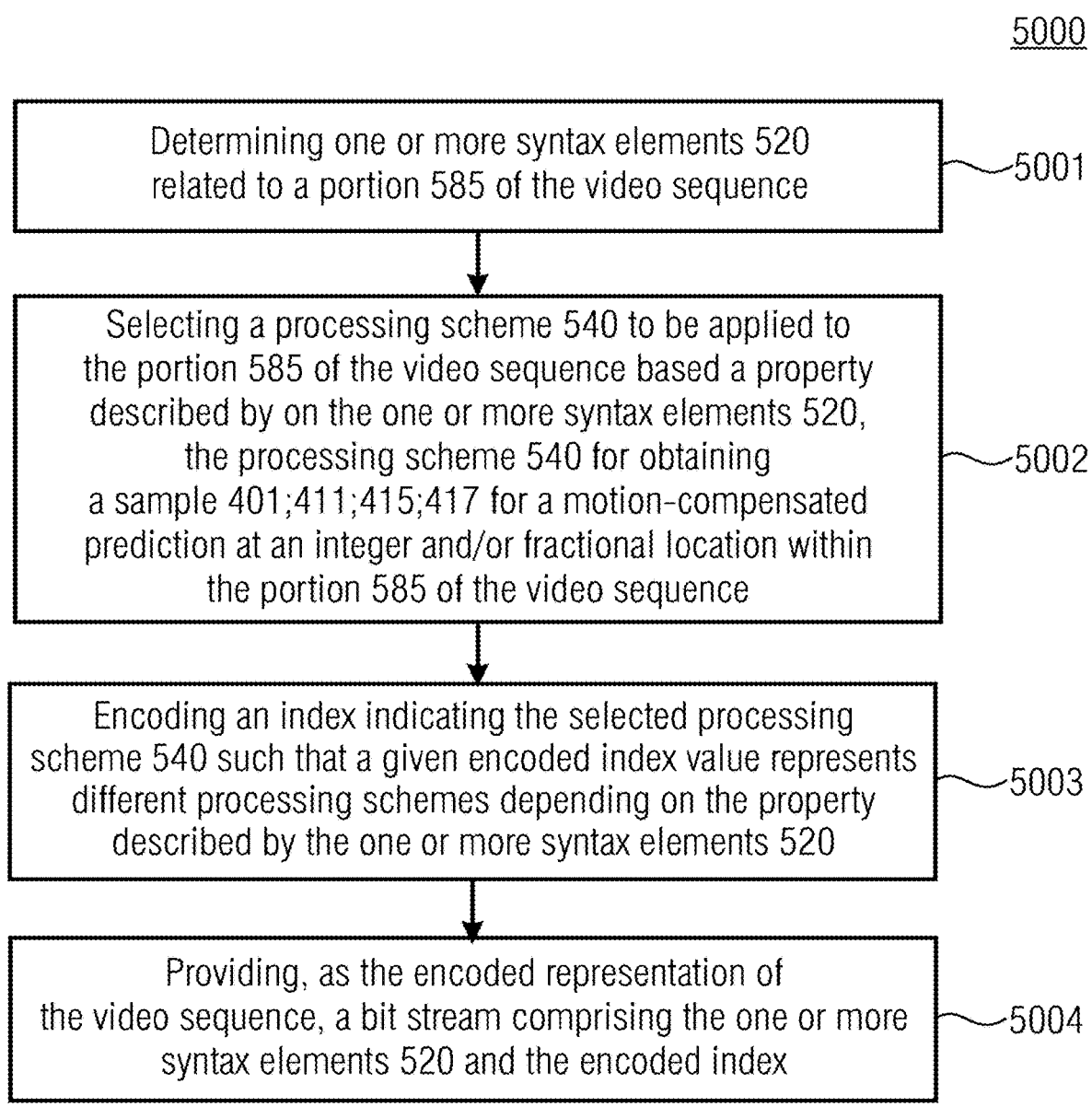
FIG. 9 shows a flowchart of a method for hybrid video coding according to an embodiment.

FIG. 9 shows a flow chart of a method 5000 for hybrid video coding according to an embodiment. The method 5000 for providing an encoded representation 514 of a video sequence on the basis of an input video content 512, the method 5000 comprises a step 5001 of determining one or more syntax elements 520 related to a portion 585 of the video sequence. Step 5002 comprises selecting a processing scheme 540 to be applied to the portion 585 of the video sequence based a property described by on the one or more syntax elements 520, the processing scheme 540 for obtaining a sample 401; 411; 415; 417 for a motion-compensated prediction at an integer and/or fractional location within the portion 585 of the video sequence. Step 5003 comprises encoding an index indicating the selected processing scheme 540 such that a given encoded index value represents different processing schemes depending on the property described by the one or more syntax elements 520. Step 5004 comprises providing, as the encoded representation of the video sequence, a bit stream comprising the one or more syntax elements 520 and the encoded index.

Figure 10:
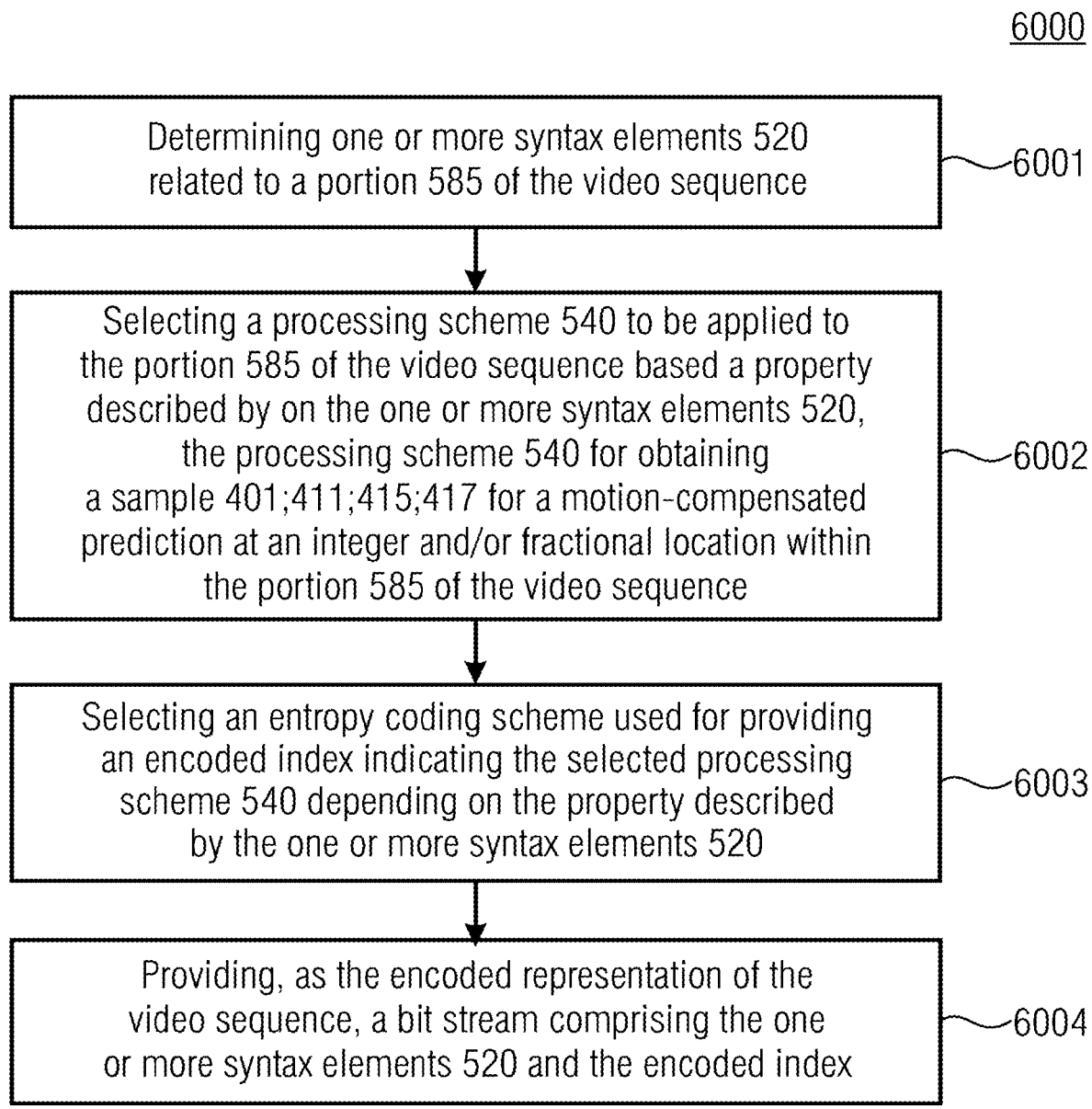
FIG. 10 shows a flowchart of a method for hybrid video coding according to another embodiment.

FIG. 10 shows a flow chart of a method 6000 for hybrid video coding according to an embodiment. The method 600 for providing an encoded representation of a video sequence on the basis of an input video content, the method 600 comprising a step 6001 of determining one or more syntax elements 520 related to a portion 585 of the video sequence. A step 6002 comprises selecting a processing scheme 540 to be applied to the portion 585 of the video sequence based on a property described by the one or more syntax elements 520, the processing scheme 540 for obtaining a sample 401; 411; 415; 417 for a motion-compensated prediction at an integer and/or fractional location within the portion 585 of the video sequence. A step 6003 comprises selecting an entropy coding scheme used for providing an encoded index indicating the selected processing scheme 540 depending on the property described by the one or more syntax elements 520. A step 6004 comprises providing, as the encoded representation of the video sequence, a bit stream comprising the one or more syntax elements 520 and comprising the encoded index.

Figure 11:
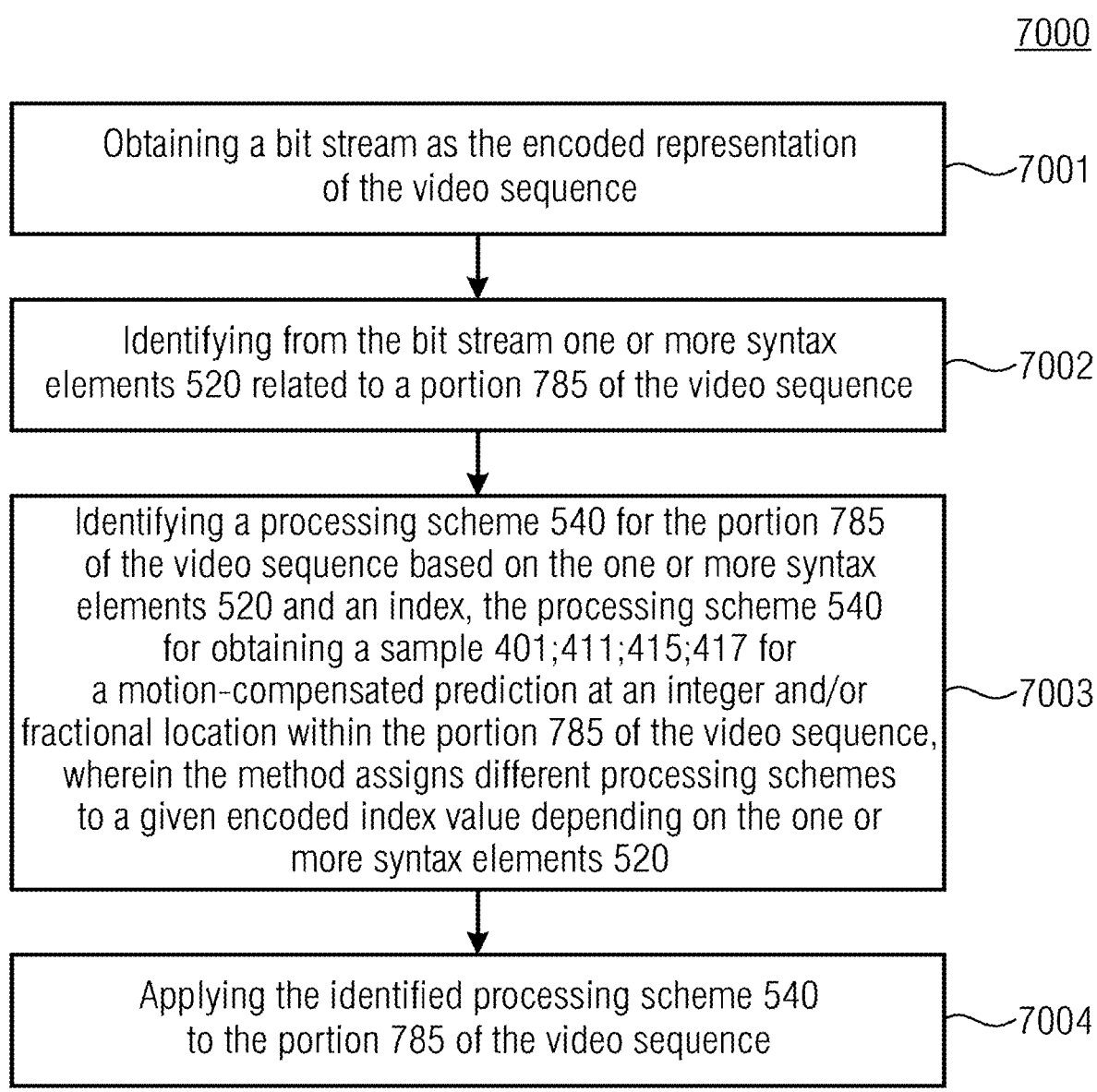
FIG. 11 shows a flowchart of a method for hybrid video coding according to another embodiment.

FIG. 11 shows a flow chart of a method 7000 for hybrid video coding according to an embodiment. The method 7000 for providing an output video content on the basis of an encoded representation of a video sequence, the method 7000 comprises a step 7001 of obtaining a bit stream as the encoded representation of the video sequence. A step 7002 comprises identifying from the bit stream one or more syntax elements 520 related to a portion 785 of the video sequence. A step 7003 comprises identifying a processing scheme 540 for the portion 785 of the video sequence based on the one or more syntax elements 520 and an index, the processing scheme 540 for obtaining a sample 401; 411; 415; 417 for a motion-compensated prediction at an integer and/or fractional location within the portion 785 of the video sequence, wherein the method assigns different processing schemes to a given encoded index value depending on the one or more syntax elements 520. A step 7004 comprises applying the identified processing scheme 540 to the portion 785 of the video sequence.

Figure 12:
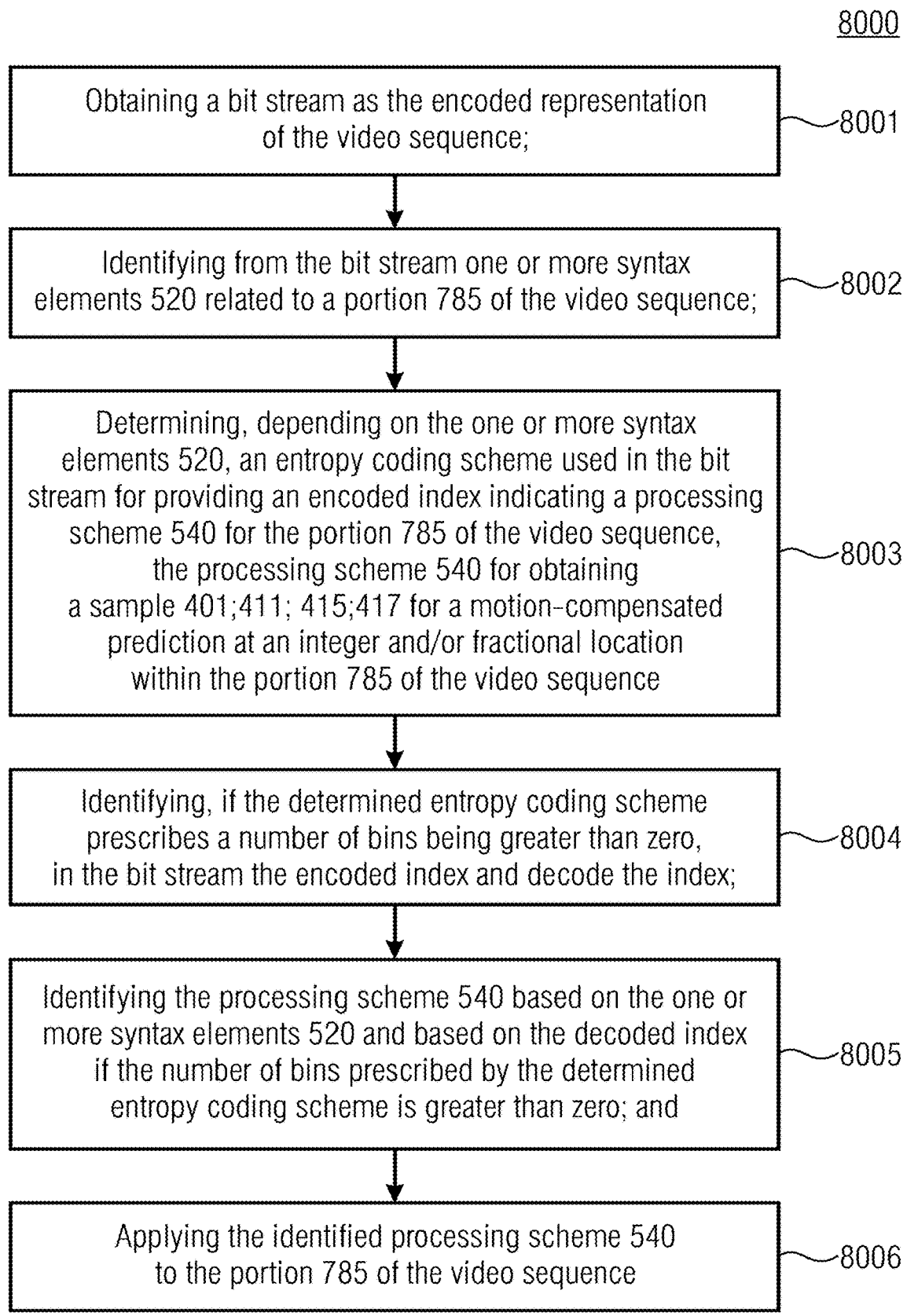
FIG. 12 shows a flowchart of a method for hybrid video coding according to another embodiment.

FIG. 12 shows a flow chart of a method 8000 for hybrid video coding according to an embodiment. The method 8000 for providing an output video content on the basis of an encoded representation of a video sequence, the method 8000 comprises a step 8001 of obtaining a bit stream as the encoded representation of the video sequence. A step 8002 comprises identifying from the bit stream one or more syntax elements 520 related to a portion 785 of the video sequence. A step 8003 comprises determining, depending on the one or more syntax elements 520, an entropy coding scheme used in the bit stream for providing an encoded index indicating a processing scheme 540 for the portion 785 of the video sequence, the processing scheme 540 for obtaining a sample 401; 411; 415; 417 for a motion-compensated prediction at an integer and/or fractional location within the portion 785 of the video sequence. A step 8004 comprises identifying, if the determined entropy coding scheme prescribes a number of bins being greater than zero, in the bit stream the encoded index and decode the index. A step 8005 comprises identifying the processing scheme 540 based on the one or more syntax elements 520 and based on the decoded index if the number of bins prescribed by the determined entropy coding scheme is greater than zero. A step 8006 comprises applying the identified processing scheme 540 to the portion 785 of the video sequence.

Figure 14:
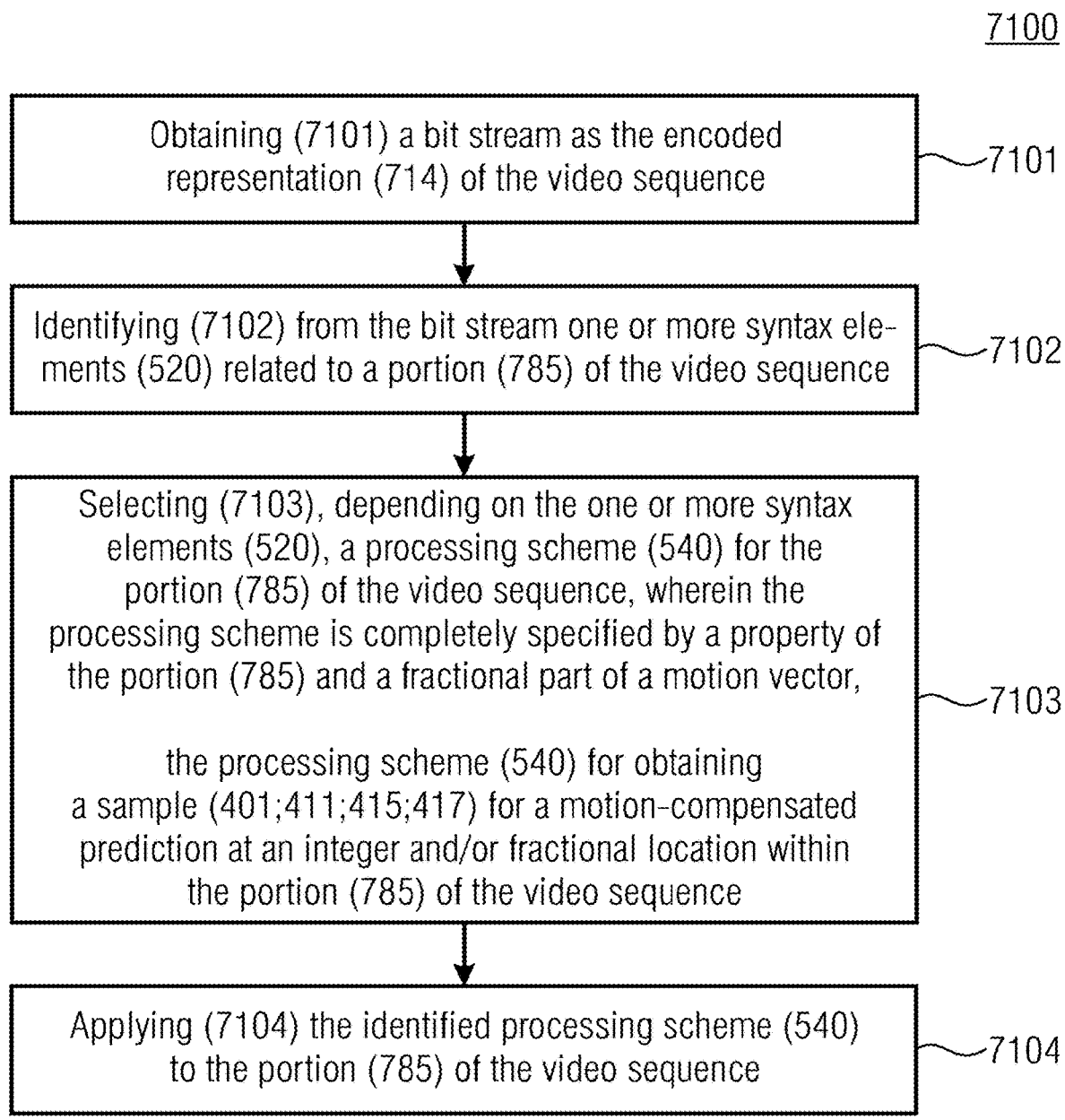
FIG. 14 shows a flowchart of a method for hybrid video coding according to another embodiment.

FIG. 14 shows a flow chart of a method 7100 for hybrid video coding according to an embodiment. The method 7100 is for providing an output video content 712 on the basis of an encoded representation 1314 of a video sequence, the method 7100 comprises: obtaining 7101 a bit stream as the encoded representation 714 of the video sequence; identifying 7102 from the bit stream one or more syntax elements 520 related to a portion 785 of the video sequence; selecting 7103, depending on the one or more syntax elements 520, a processing scheme 540 for the portion 785 of the video sequence, wherein the processing scheme is completely specified by a property of the portion 785 and a fractional part of a motion vector, the processing scheme 540 for obtaining a sample 401; 411; 415; 417 for a motion-compensated prediction at an integer and/or fractional location within the portion 785 of the video sequence; applying 7104 the identified processing scheme 540 to the portion 785 of the video sequence.

Figure 15:
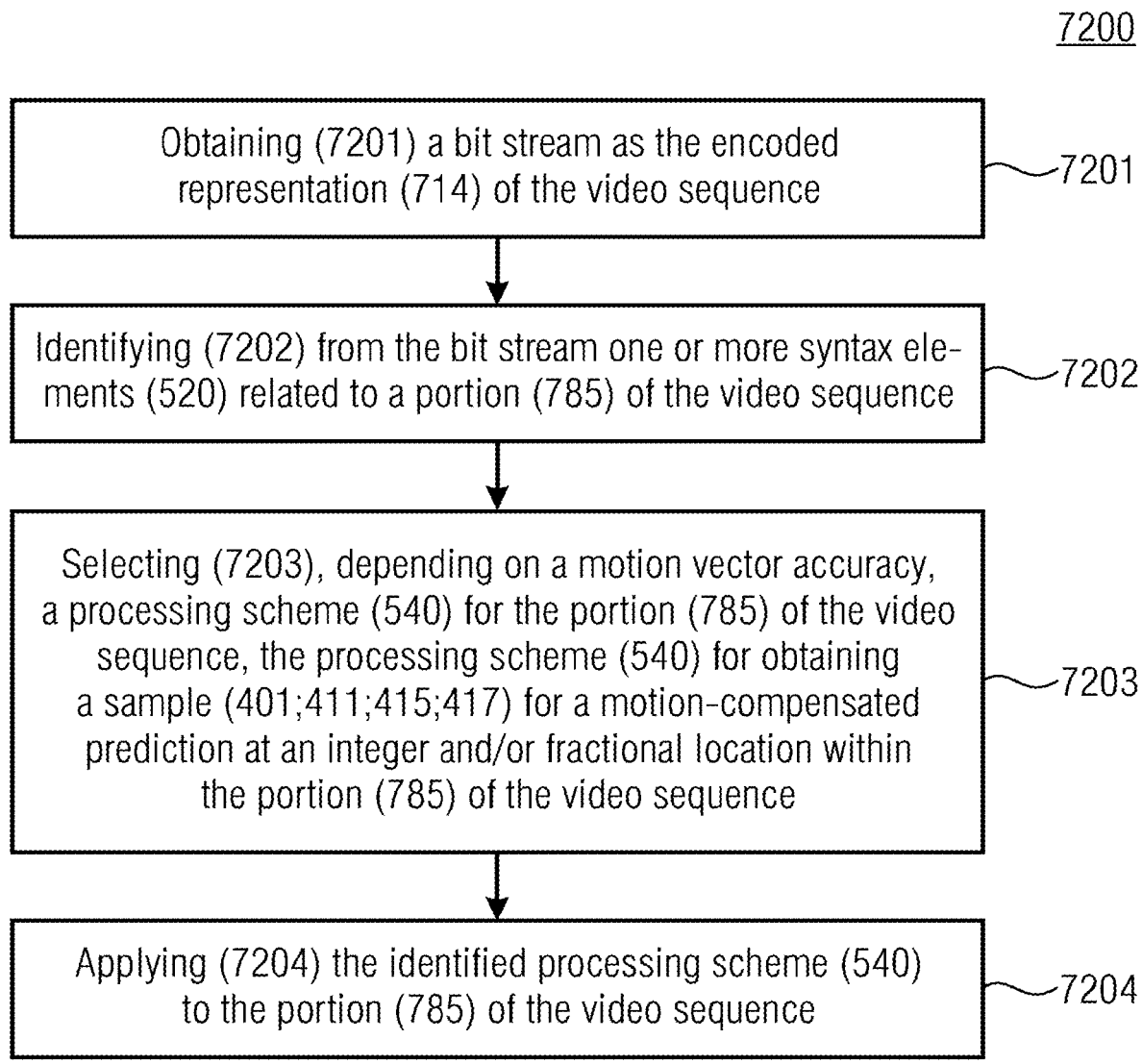
FIG. 15 shows a flowchart of a method for hybrid video coding according to another embodiment.

FIG. 15 shows a flow chart of a method 7200 for hybrid video coding according to an embodiment. The method 7200 is for providing an output video content 712 on the basis of an encoded representation 1314 of a video sequence, the method 7200 comprises: obtaining 7201 a bit stream as the encoded representation 714 of the video sequence; identifying 7202 from the bit stream one or more syntax elements 520 related to a portion 785 of the video sequence; selecting 7203, depending on a motion vector accuracy, a processing scheme 540 for the portion 785 of the video sequence, the processing scheme 540 for obtaining a sample 401; 411; 415; 417 for a motion-compensated prediction at an integer and/or fractional location within the portion 785 of the video sequence; applying 7204 the identified processing scheme 540 to the portion 785 of the video sequence.

Figure 16:
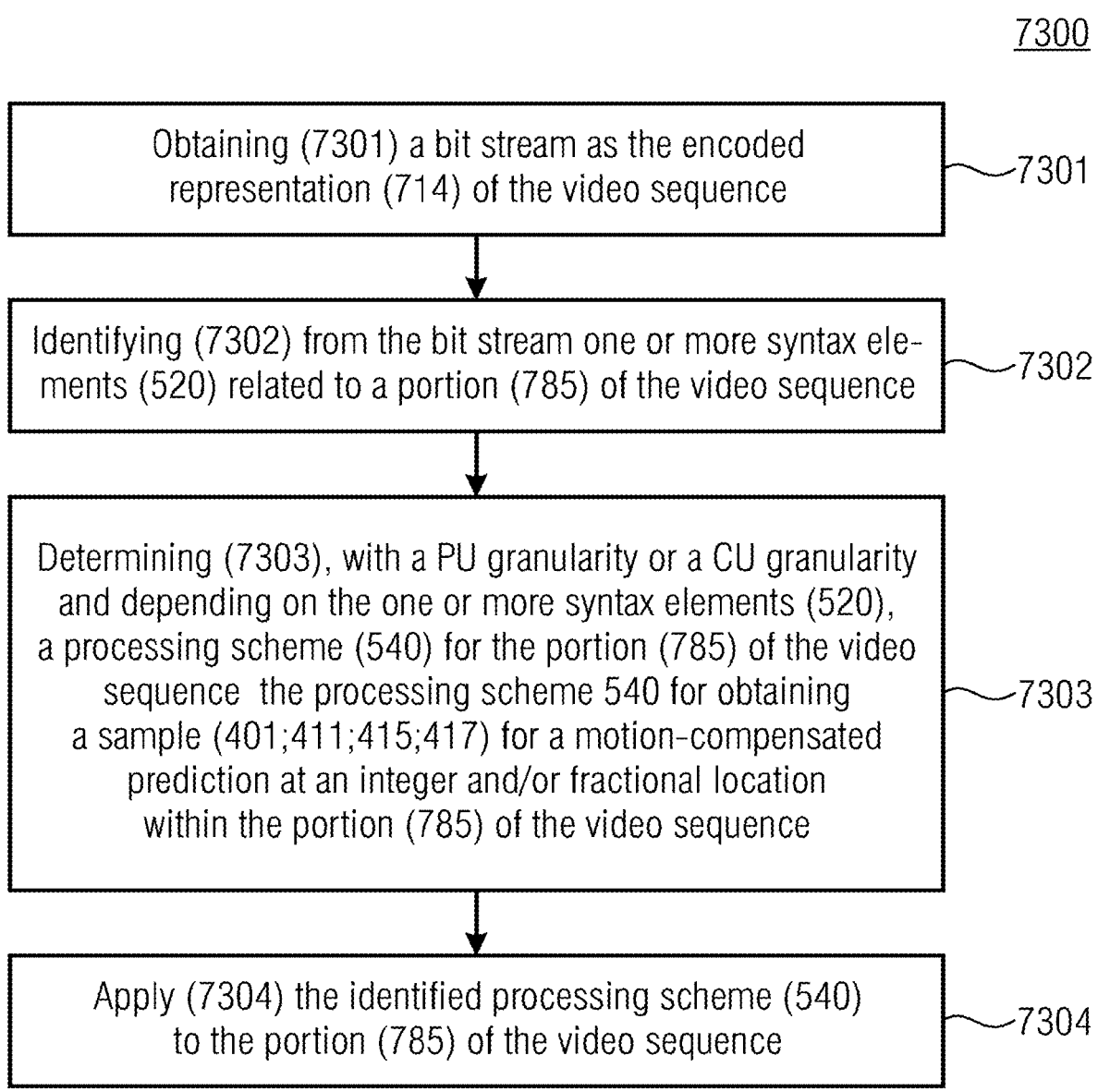
FIG. 16 shows a flowchart of a method for hybrid video coding according to another embodiment.

FIG. 16 shows a flow chart of a method 7300 for hybrid video coding according to an embodiment. The method 7300 is for providing an output video content 712 on the basis of an encoded representation 1314 of a video sequence, the method 7300 comprises: obtaining 7301 a bit stream as the encoded representation 714 of the video sequence; identifying 7302 from the bit stream one or more syntax elements 520 related to a portion 785 of the video sequence; determining 7303, with a PU granularity or a CU granularity and depending on the one or more syntax elements 520, a processing scheme 540 for the portion 785 of the video sequence, the processing scheme 540 for obtaining a sample 401; 411; 415; 417 for a motion-compensated prediction at an integer and/or fractional location within the portion 785 of the video sequence; apply 7304 the identified processing scheme 540 to the portion 785 of the video sequence.

FIG. 17 shows a flow chart of a method 1310 for hybrid video coding according to an embodiment. The method 1310 for providing an encoded representation 1314 of a video sequence on the basis of an input video content 512, the method 1310 comprises: determining 1311 one or more syntax elements 520 related to a portion 585 of the video sequence; selecting 1312 a processing scheme 540 to be applied to the portion 585 of the video sequence based on a property described by the one or more syntax elements 520, wherein the processing scheme is completely specified by the property of the portion 585 and a fractional part of a motion vector, the processing scheme 540 for obtaining a sample 401; 411; 415; 417 for a motion-compensated prediction at an integer and/or fractional location within the portion 585 of the video sequence; providing 1313, as the encoded representation 1314 of the video sequence, a bit stream comprising the one or more syntax elements 520.

Figure 18:
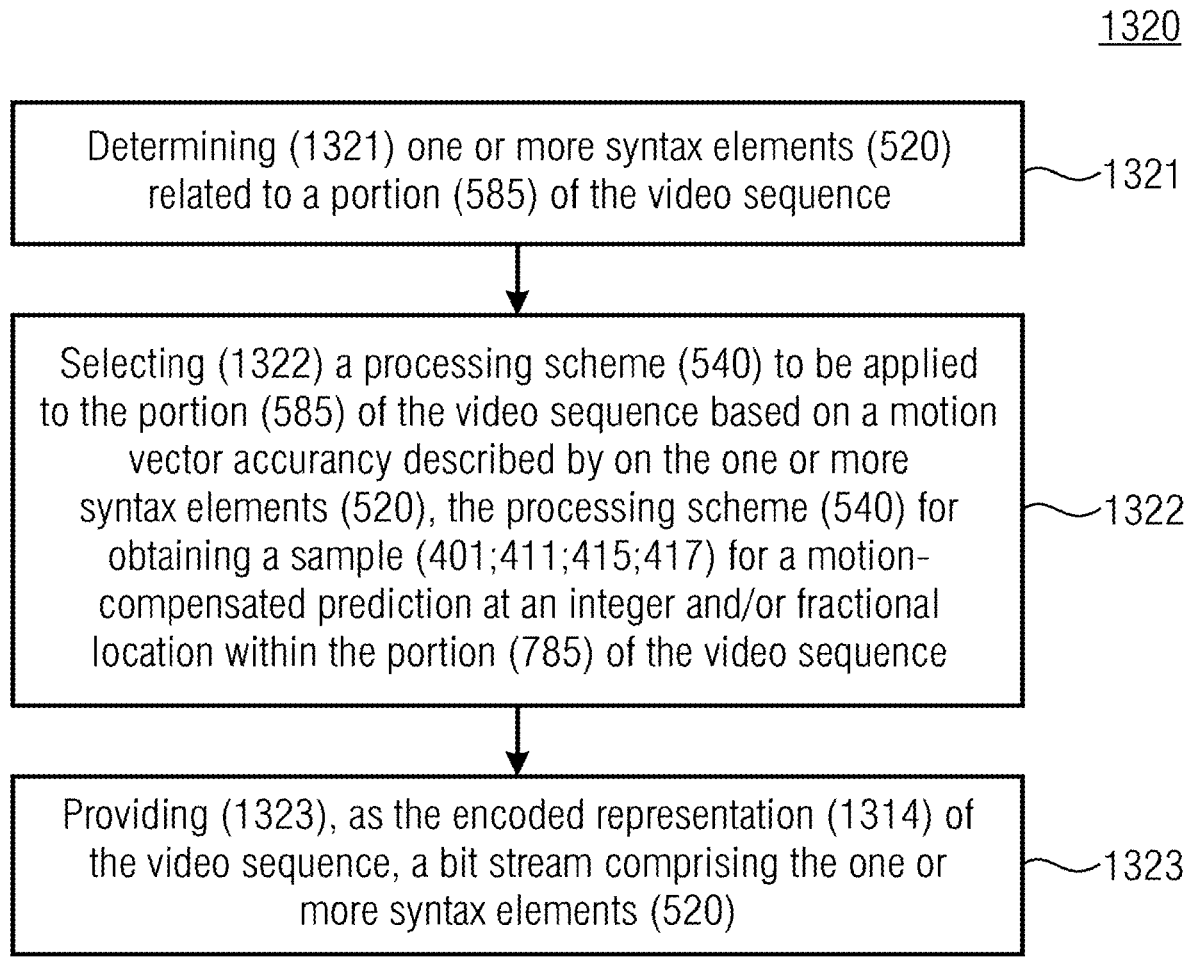
FIG. 18 shows a flowchart of a method for hybrid video coding according to another embodiment.

FIG. 18 shows a flow chart of a method 1320 for hybrid video coding according to an embodiment. The method 1320 is for providing an encoded representation 1314 of a video sequence on the basis of an input video content 512, the method 1320 comprises: determining 1321 one or more syntax elements 520 related to a portion 585 of the video sequence; selecting 1322 a processing scheme 540 to be applied to the portion 585 of the video sequence based on a motion vector accuracy described by the one or more syntax elements 520, the processing scheme 540 for obtaining a sample 401; 411; 415; 417 for a motion-compensated prediction at an integer and/or fractional location within the portion 785 of the video sequence; providing 1323, as the encoded representation 1314 of the video sequence, a bit stream comprising the one or more syntax elements 520.

Figure 19:
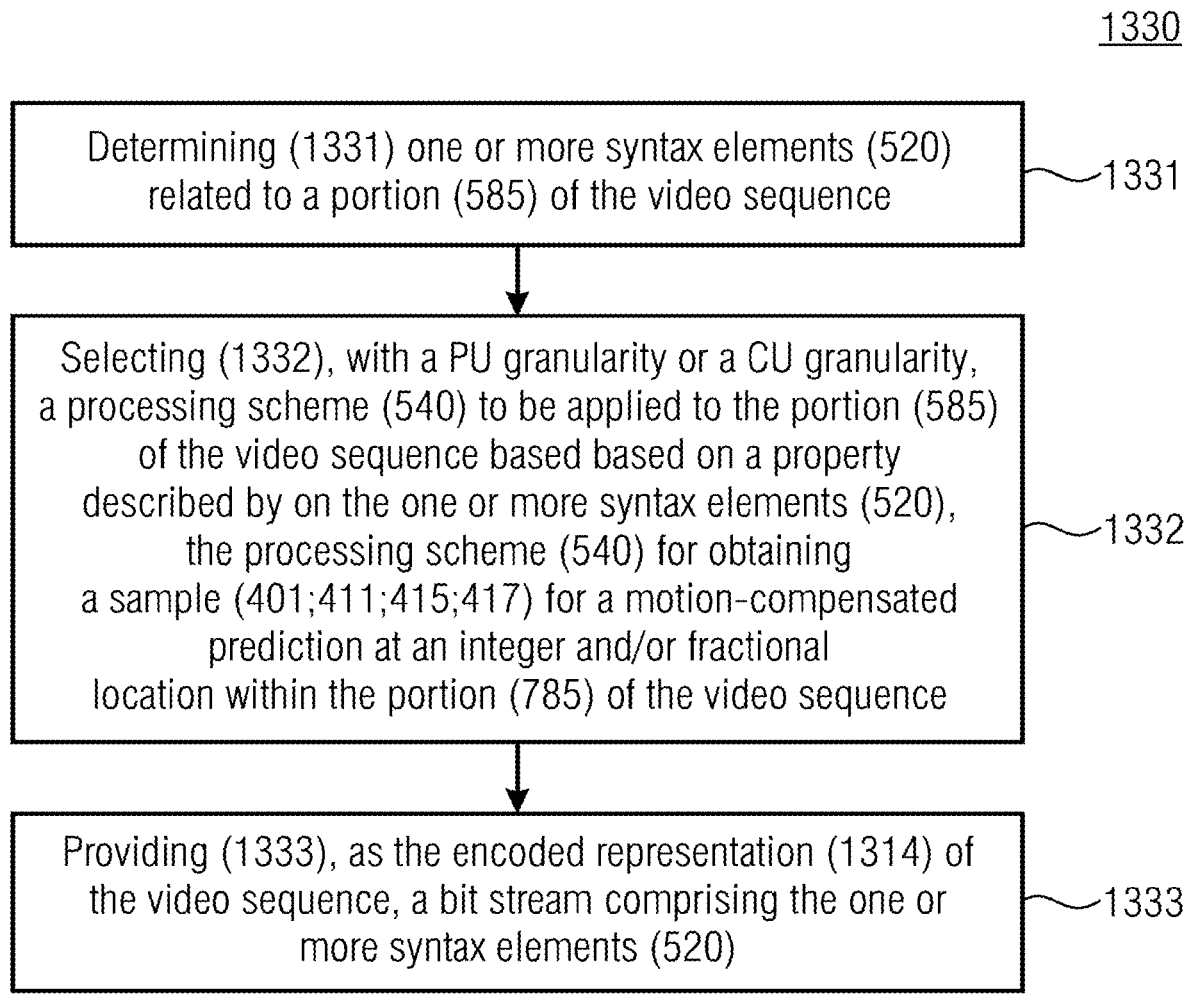
FIG. 19 shows a flowchart of a method for hybrid video coding according to another embodiment.

FIG. 19 shows a flow chart of a method 1330 for hybrid video coding according to an embodiment. The method 1330 is for providing an encoded representation 1314 of a video sequence on the basis of an input video content 512, the method 1330 comprises: determining 1331 one or more syntax elements 520 related to a portion 585 of the video sequence; selecting 1332, with a PU granularity or a CU granularity, a processing scheme 540 to be applied to the portion 585 of the video sequence based on a property described by the one or more syntax elements 520, the processing scheme 540 for obtaining a sample 401; 411; 415; 417 for a motion-compensated prediction at an integer and/or fractional location within the portion 785 of the video sequence; providing 1333, as the encoded representation 1314 of the video sequence, a bit stream comprising the one or more syntax elements 520.

6. Further Embodiments

In many or possibly all current video coding standards, including the current VVC draft [5], the interpolation filters are fixed for each fractional sample position. ("fractional sample position" here refers to the relative location in between the four surrounding FPEL or integer positions.). The embodiments of the present invention allows to use different interpolation filters (e.g. processing schemes) for the same fractional sample position in different parts (e.g. portions) of the video sequence. The previously mentioned approaches for switched interpolation filtering (see section "Background of the invention") have the drawback that they allow a switching among different interpolation filters only at a coarse granularity (i.e., slice level), and that the selection may be explicitly signaled, possibly by transmitting the individual FIR filter coefficients (as for AIF and its variants).

Allowing a switching of the interpolation filter at a fine granularity (e.g., PU/CU, or CTU level) allows to better adapt to local image characteristics (e.g., besides the high precision HEVC interpolation filters, it may be beneficial to use filters with different characteristic, e.g. filters with stronger low pass characteristics for attenuating high-frequency noise components). However, explicit signaling of the used interpolation filter for each PU may be too expensive in terms of the bit-rate that may be used. Therefore, the embodiments of the present invention avoid this signaling overhead by limiting the interpolation filters that are available for a given part or region of the video sequence (e.g., PU/CU, CTU, slice, frame etc.) according to properties of this part or region (a portion of the video sequence) which are also known to the decoder (e.g. because they are indicated by the one or more syntax elements 520, which may be part of the encoded representation 514, 614, 1314). In case that only one interpolation filter remains available, no further signaling is necessary. In case that more than one remains available, it may only be transmitted which of the available interpolation filters is used. (Note, that here and in the following, "interpolation filtering" is meant in the broader sense of any signal processing that is applied to obtain the reference sample at a given, possibly fractional sample, location and may also include a filtering of the FPEL position.)

According to the embodiments of the invention, a change of the interpolation filter used may only be possible when the current block has certain properties (which are given by the values of other decoded syntax elements). At this, two cases may be distinguished:

Case 1: For a given property of a block (as determined by other syntax elements), only one specific set of interpolation filters is supported. Here, the term "set of interpolation filters" refers to the fact that the filter actually used does also depend on the sub-sample location (as in conventional video coding with sub-sample accuracy). Then, the property determines the set of interpolation filters used and the fractional part of the motion vectors determines the actual filter (or a horizontal and vertical filter if the filtering is specified by separable filters). Since the interpolation filter is completely specified by the property of the block and the fractional part of the motion vector, no additional syntax element is transmitted in this case.

Case 2: Multiple sets of interpolation filters are supported for a given property of a block. In this case, a set of interpolation filters may be selected by coding a corresponding syntax element (e.g., an index into a list a supported sets). The interpolation filter used (out of the selected set) may be again determined by the fractional part of the motion vectors.

Note that both cases may be supported in the same picture. That means for blocks that have a first property, a fixed set of interpolation filters may be used (this set may be the same as the conventional set of interpolation filters or it may deviate from the conventional set). And for blocks with a second property, multiple sets of interpolation filters may be supported and the filter chosen is determined by a transmitted filter index (or any other means). Additionally, block may have a third property, in which case other sets of interpolation filters (either one or multiple) may be used.

These properties of a part or region of the video sequence (a portion of the video sequence) which may be used for limiting the available interpolation filters include:
- MV accuracy (e.g., QPEL, HPEL, FPEL etc.), i.e., different sets of interpolation filter might be supported for different motion vector accuracies
- Fractional sample position
- Block size or, more generally, block shape
- Number of prediction hypotheses (i.e., 1 for uni-prediction, 2 for bi-prediction etc.), e.g. additional smoothing filters only for uni-prediction
- Prediction mode (e.g., translational inter, affine inter, translational merge, affine merge, combined inter/intra)
- Availability of a coded residual signal (e.g., the coded block flag as in HEVC)
- Spectral properties of the coded residual signal
- Reference picture signal (reference block defined by motion data), e.g.
  - Block edges from collocated PUs inside reference block
  - High or low frequency characteristics of the reference signal
- Loop filter data, e.g.
  - Edge offset or band offset classification from sample adaptive offset filter (SAO)
  - Deblocking filter decisions and boundary strengths
- MV lengths, e.g. only enable additional smoothing filters for long MVs or for a specific direction A combination of two or more of these properties (e.g., MV accuracy and fractional sample position) is also possible (see above).

In one embodiment of this invention, the available interpolation filters may be directly linked to the MV accuracy. In particular, additional or different interpolation filters (with respect to the HEVC or VVC interpolation filters), may only be available for blocks which are encoded using a specific MV accuracy (e.g, HPEL) and only be applied e.g. for the HPEL position. The signaling of the MV accuracy may in this case use a scheme similar to the AMVR of VVC (see Sec. 6.1.2). If only one interpolation filter (i.e., replacing the corresponding HEVC or VVC interpolation filter) is available, no further signaling is necessary. If more than one interpolation filter is available, only for the blocks using the given MV accuracy, an indication of the used interpolation filter may be signaled, whereas for all other blocks the signaling is unchanged.

In one embodiment of this invention, in case of the merge mode of HEVC or VVC, the used interpolation filter may be inherited from the selected merging candidate. In another embodiment, it may be possible to override the inherited interpolation filter from the merging candidate by explicit signaling.

6.1 Further Embodiment of the Invention

In an embodiment of the invention, the available sets of interpolation filter may be determined by the motion vector accuracy chosen for a block (which is signaled using a dedicated syntax element). For an accuracy of half a luma sample, multiple sets of interpolation filter may be supported, while for all other possible motion vectors accuracies the default set of interpolation filters is used.

6.1.1 Interpolation Filters Sets

In embodiments of the present invention, two additional 1D 6-tap low pass FIR filters may be supported, which may be applied instead of the HEVC 8-tap filter (with coefficients h[i] described above).

6.1.2 Signalization

Extension of the AMVR CU syntax with truncated unary binarization from the current VVC draft by HPEL resolution and adding one CABAC context for the additional bin:
- The index is only present if at least one MVD is greater than zero
- If the index is equal to 0, it indicates QPEL accuracy and HEVC interpolation filters
- If the index is equal to 1, it indicates that all MVDs have HPEL MV accuracy and have to be shifted to QPEL accuracy before being added to the MVPs, which are rounded to HPEL precision.
- If the index is equal to 2 or 3, it indicates FPEL or 4PEL accuracy, respectively, and no interpolation filtering is applied.

TABLE 3

| amvr mode | bin string | ctx 0 | 1 | 2 |
|---|---|---|---|---|
| 0 (QPEL) | 0 | 0, 1, 2 | | |
| 1 (HPEL) | 10 | 0, 1, 2 | 3 | |
| 2 (FPEL) | 110 | 0, 1, 2 | 3 | 4 |
| 3 (4PEL) | 111 | 0, 1, 2 | 3 | 4 |

The context for the first bin, which switches between QPEL and the other accuracies, may be selected among three context depending on the value of AMVR mode of the neighboring block to the left and above the current block. If both neighboring blocks have QPEL AMVR mode, the context is 0, otherwise if only one neighboring block is not using QPEL AMVR mode, the context is 1 and otherwise (both neighboring blocks are not using QPEL AMVR mode), the context is 2.

In case the AMVR mode indicates HPEL accuracy (amvr mode=2), the interpolation filter may be explicitly signaled by one syntax element (if_idx) per CU:
- If the if_idx is equal to 0, it indicates that the filter coefficients h[i] of the HEVC interpolation filter are used for generating the HPEL positions;
- If the if_idx is equal to 1, it indicates that the filter coefficients h[i] of the Flat Top filter (see Tab. 2 in section 3) are used for generating the HPEL positions
- If the if_idx is equal to 2, it indicates that the filter coefficients h[i] of the Gauss filter (see Tab. 2 in section 3) are used for generating the HPEL positions When a CU is coded in merge mode and a merge candidate is generated by copying the motion vector(s) from a neighboring block without modifying the motion vector(s), the index if_idx is also copied. If if_idx is greater than 0, HPEL positions are filtered using the one of two non-HEVC filters (Flat Top or Gauss).

In this particular embodiment, the interpolation filter may only be modified for HPEL positions. If the motion vectors points to an integer luma sample locations, no interpolation filter is used in all cases. If the motion vectors points to a reference picture location that represents a full-sample x (or y) position and a half-sample y (or x) position, the half-pel filter selected is only applied in vertical (or horizontal direction). Moreover, only the filtering of the luma component is affected, for the chroma components, the conventional chroma interpolation filters are used in all cases.

Possible modifications of the embodiment described may include the following aspects:

- The sets of interpolation filters for the HPEL accuracy also include modified filters for the full-sample positions. That means, a stronger low-pass filtering in horizontal (or vertical) direction may also be applied if the half-sample accurate motion vector points to a full-sample location in x (or y) direction.
- A filtering of reference samples may also be applied if a motion vector accuracy of full-luma samples or 4-luma samples is selected. At this, either a single filter or multiple filters may be supported.
- The adaptive filter selection is extended to the chroma components.
- The selected filter further depend on whether uni- or bi-prediction is used.

7. Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Yuri Vatis, Bernd Edler, Dieu Thanh Nguyen, Jörn Ostermann, "Two-dimensional non-separable Adaptive Wiener Interpolation Filter for H.264/AVC", ITU-T SG 16/Q.6 Doc. VCEG-Z17, Busan, South Korea, April 2005.

[2] S. Wittmann, T. Wedi, "Separable Adaptive Interpolation Filter," document COM16-C219, ITU-T, June 2007.

[3] M. Karczewicz, Y. Ye, and P. Chen, "Switched interpolation filter with offset," document COM16-C463, ITU-T, Apr. 2008.

[4] Y. Ye and M. Karczewicz, "Enhanced Adaptive Interpolation Filter," document COM16-C464, ITU-T, Apr. 2008.

[5] B. Bross, J. Chen, S. Liu (editors), "Versatile Video Coding (Draft 4)," document JVET-M1001, January 2019.

The invention claimed is:

1. A video encoder configured to:
encode syntax elements comprising an indication of an adaptive motion vector resolution (AMVR) mode and an indication of whether an inter prediction mode is translational or affine for a coding block of a picture;
select, depending on the indicated AMVR mode and the indication of whether the inter prediction mode is translational or affine, a finite impulse response (FIR) interpolation filter from a plurality of FIR interpolation filters for obtaining a sample corresponding to a half-sample position of a reference picture of the coding block, the plurality of FIR interpolation filters comprising a first interpolation filter with 6 nonzero coefficients and a second interpolation filter with 8 nonzero coefficients, the second interpolation filter having a greater edge preserving property than the first interpolation filter;
apply the selected FIR interpolation filter to samples of the reference picture to obtain the sample corresponding to the half-sample position; and
predict a sample of the coding block using the sample corresponding to the half-sample position.

2. The video encoder of claim 1, wherein the first interpolation filter has coefficients of 3, 9, 20, 20, 9, 3.

3. The video encoder of claim 1, wherein the second interpolation filter has coefficients of −1, 4, −11, 40, 40, −11, 4, −1.

4. The video encoder of claim 1, wherein the plurality of FIR interpolation filters comprises more than one filter with 6 nonzero coefficients.

5. A video decoder configured to:
decode from a video bit stream syntax elements, syntax elements comprising an indication of an adaptive motion vector resolution (AMVR) mode and an indication of whether an inter prediction mode is translational or affine for a coding block of a picture;
select, depending on the indicated AMVR mode and the indication of whether the inter prediction mode is translational or affine, a finite impulse response (FIR) interpolation filter from a plurality of FIR interpolation filters for obtaining a sample corresponding to a half-sample position of a reference picture of the coding block, the plurality of FIR interpolation filters comprising a first interpolation filter with 6 nonzero coefficients and a second interpolation filter with 8 nonzero coefficients, the second interpolation filter having a higher edge preserving property than the first interpolation filter;
apply the selected FIR interpolation filter to samples of the reference picture to obtain the sample corresponding to the half-sample position; and
predict a sample of the coding block using the sample corresponding to the half-sample position.

6. The video decoder of claim 5, wherein the first interpolation filter has coefficients of 3, 9, 20, 20, 9, 3.

7. The video decoder of claim 5, wherein the second interpolation filter has coefficients of −1, 4, −11, 40, 40, −11, 4, −1.

8. The video decoder of claim 5, wherein the plurality of FIR interpolation filters comprises more than one filter with 6 nonzero coefficients.

9. The video decoder of claim 5, wherein none of the syntax elements is explicitly dedicated for indicating the selected FIR interpolation filter.

10. The video decoder of claim 5, wherein the video decoder is configured to select an FIR interpolation filter individually for different coding units of the picture.

11. A method of video encoding, the method comprising:
encoding syntax elements comprising an indication of an adaptive motion vector resolution (AMVR) mode and an indication of whether an inter prediction mode is translational or affine for a coding block of a picture;
selecting, depending on the indicated AMVR mode and the indication of whether the inter prediction mode is translational or affine, a finite impulse response (FIR) interpolation filter from a plurality of FIR interpolation filters for obtaining a sample corresponding to a half-sample position of a reference picture of the coding block, the plurality of FIR interpolation filters comprising a first interpolation filter with 6 nonzero coefficients and a second interpolation filter with 8 nonzero coefficients, the second interpolation filter having a greater edge preserving property than the first interpolation filter;
applying the selected FIR interpolation filter to samples of the reference picture to obtain the sample corresponding to the half-sample position; and
predicting a sample of the coding block using the sample corresponding to the half-sample position.

12. The method of claim 11, wherein the first interpolation filter has coefficients of 3, 9, 20, 20, 9, 3.

13. The method of claim 11, wherein the second interpolation filter has coefficients of −1, 4, −11, 40, 40, −11, 4, −1.

14. The method of claim 11, wherein the plurality of FIR interpolation filters comprises more than one filter with 6 nonzero coefficients.

15. A method of video decoding, the method comprising:
decoding from a video bit stream syntax elements, syntax elements comprising an indication of an adaptive motion vector resolution (AMVR) mode and an indication of whether an inter prediction mode is translational or affine for a coding block of a picture;
selecting, depending on the indicated AMVR mode and the indication of whether the inter prediction mode is translational or affine, a finite impulse response (FIR) interpolation filter from a plurality of FIR interpolation filters for obtaining a sample corresponding to a half-sample position of a reference picture of the coding block, the plurality of FIR interpolation filters comprising a first interpolation filter with 6 nonzero coefficients and a second interpolation filter with 8 nonzero coefficients, the second interpolation filter having a higher edge preserving property than the first interpolation filter;
applying the selected FIR interpolation filter to samples of the reference picture to obtain the sample corresponding to the half-sample position; and
predicting a sample of the coding block using the sample corresponding to the half-sample position.

16. The method of claim 15, wherein the first interpolation filter has coefficients of 3, 9, 20, 20, 9, 3.

17. The method of claim 15, wherein the second interpolation filter has coefficients of −1, 4, −11, 40, 40, −11, 4, −1.

18. The method of claim 15, wherein the plurality of FIR interpolation filters comprises more than one filter with 6 nonzero coefficients.

19. The method of claim 15, wherein none of the syntax elements is explicitly dedicated for indicating the selected FIR interpolation filter.

20. The method of claim 15, wherein the method further comprises selecting an FIR interpolation filter individually for different coding units of the picture.

* * * * *